(12) United States Patent  (10) Patent No.: US 7,761,900 B2
Crayford  (45) Date of Patent: Jul. 20, 2010

(54) DISTRIBUTION OF CONTENT AND ADVERTISEMENT

(75) Inventor: Aaron Crayford, Cloverdale, CA (US)

(73) Assignee: Clarendon Foundation, Inc., Murray, UT (US)

( * ) Notice: Subject to any disclaimer, the term of this patent is extended or adjusted under 35 U.S.C. 154(b) by 0 days.

(21) Appl. No.: 11/830,824

(22) Filed: Jul. 30, 2007

(65) Prior Publication Data

US 2008/0034393 A1  Feb. 7, 2008

Related U.S. Application Data

(60) Provisional application No. 60/835,081, filed on Aug. 2, 2006, provisional application No. 60/852,910, filed on Oct. 17, 2006.

(51) Int. Cl.
H04N 7/173 (2006.01)
G06F 15/173 (2006.01)

(52) U.S. Cl. .............. 725/87; 725/86; 725/91; 725/92; 725/96; 725/97; 725/98; 709/223; 709/224

(58) Field of Classification Search ............ 725/86–91; 709/223–224
See application file for complete search history.

(56) References Cited

U.S. PATENT DOCUMENTS

| | | | | |
|---|---|---|---|---|
| 5,793,366 | A * | 8/1998 | Mano et al. ................. | 715/839 |
| 5,883,621 | A * | 3/1999 | Iwamura ...................... | 725/37 |
| 5,892,915 | A * | 4/1999 | Duso et al. .................. | 709/219 |
| 6,006,257 | A | 12/1999 | Slezak | |
| 6,008,333 | A * | 12/1999 | Vosika et al. ............... | 536/17.4 |
| 6,182,094 | B1 * | 1/2001 | Humpleman et al. ........ | 715/234 |
| 6,378,130 | B1 * | 4/2002 | Adams ........................ | 725/95 |
| 6,438,596 | B1 * | 8/2002 | Ueno et al. .................. | 709/226 |
| 6,473,797 | B1 * | 10/2002 | Hirasawa ..................... | 709/224 |
| 6,665,714 | B1 * | 12/2003 | Blumenau et al. ........... | 709/222 |
| 6,801,576 | B1 * | 10/2004 | Haldeman et al. ....... | 375/240.29 |
| 6,839,747 | B1 * | 1/2005 | Blumenau et al. ........... | 709/223 |
| 6,868,266 | B2 * | 3/2005 | Yen .......................... | 455/404.2 |
| 6,944,654 | B1 * | 9/2005 | Murphy et al. .............. | 709/223 |
| 7,031,709 | B2 * | 4/2006 | Watanabe et al. ........... | 455/436 |
| 7,080,400 | B1 * | 7/2006 | Navar ......................... | 725/139 |
| 7,100,192 | B1 * | 8/2006 | Igawa et al. ................. | 725/112 |
| 7,523,170 | B1 * | 4/2009 | Allen et al. .................. | 709/217 |
| 7,587,675 | B2 * | 9/2009 | Cunningham et al. ....... | 715/734 |
| 7,596,640 | B2 * | 9/2009 | Sakai .......................... | 710/31 |
| 2002/0040389 | A1 * | 4/2002 | Gerba et al. ................. | 709/219 |
| 2002/0078174 | A1 | 6/2002 | Sim et al. | |
| 2002/0107968 | A1 * | 8/2002 | Horn et al. .................. | 709/230 |
| 2002/0186664 | A1 * | 12/2002 | Gibson et al. ............... | 370/254 |
| 2003/0177504 | A1 * | 9/2003 | Paulo et al. ................. | 725/118 |
| 2003/0204856 | A1 * | 10/2003 | Buxton ....................... | 725/120 |
| 2004/0003397 | A1 | 1/2004 | Boston et al. | |
| 2004/0103437 | A1 * | 5/2004 | Allegrezza et al. ............ | 725/95 |

(Continued)

*Primary Examiner*—Son P Huynh
(74) *Attorney, Agent, or Firm*—Steven L. Nichols; Vancott, Bagley, Cornwall & McCarthy

(57) ABSTRACT

Embodiments of the present disclosure provide a system and method for improved distribution of content on a communication network. The system and method are adapted to receive a video request message from a client, identify a location of the client, identify a location of one or more overlay nodes nearest to the client, identify a location of one or more network servers nearest to the client, generate network organization information, and publish the network organization information to at least the client.

19 Claims, 8 Drawing Sheets

U.S. PATENT DOCUMENTS

2004/0117850 A1* 6/2004 Karaoguz et al. ............ 725/134
2004/0230996 A1 11/2004 Takeuchi et al.
2005/0039213 A1* 2/2005 Matarese et al. .............. 725/95
2005/0289618 A1* 12/2005 Hardin ......................... 725/95
2006/0005224 A1* 1/2006 Dunning et al. ............. 725/115

* cited by examiner

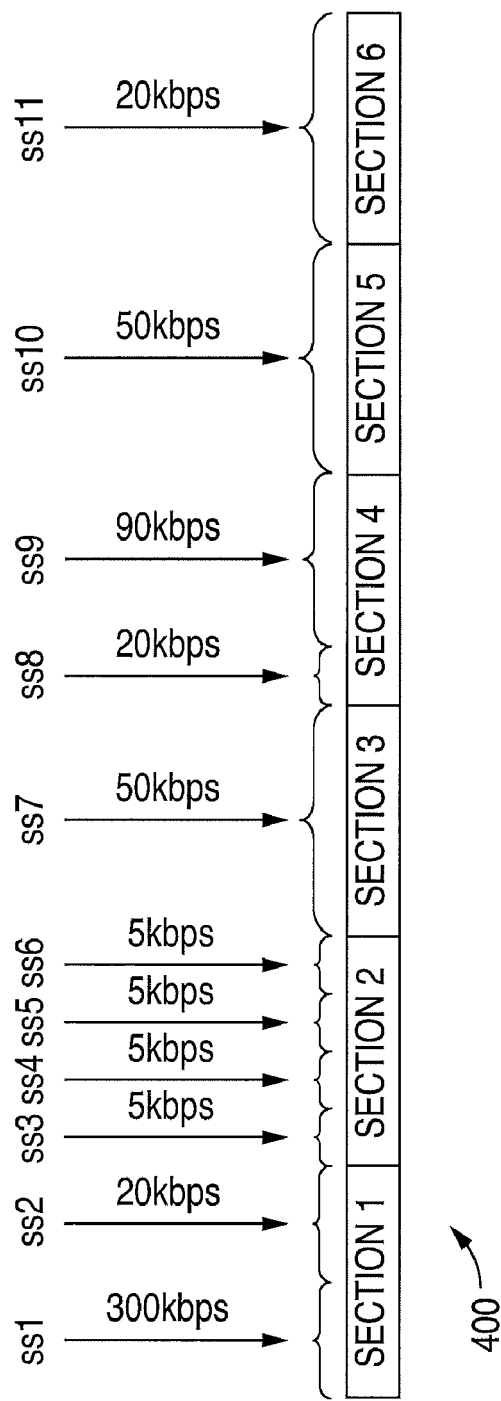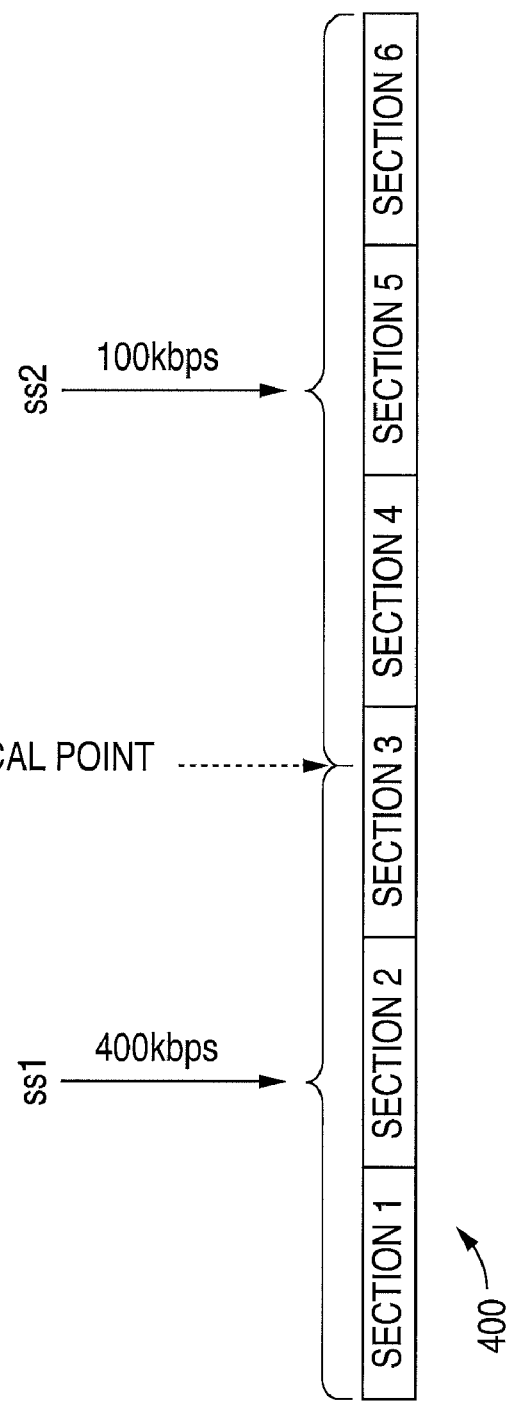

DISTRIBUTION OF CONTENT AND ADVERTISEMENT

CROSS-REFERENCE TO RELATED APPLICATIONS

This application claims the benefit of U.S. Provisional Patent Application No. 60/835,081 filed Aug. 2, 2006 entitled, "MYLIGHT: A METHOD FOR IMPROVING THE DISTRIBUTION OF CONTENT ON THE INTERNET", and U.S. Provisional Patent Application No. 60/852,910 filed Oct. 17, 2006 entitled, "MYLIGHT: A SYSTEM FOR IMPROVING CONTENT DISTRIBUTION AND ADVERTISEMENT", and co-pending U.S. patent application Ser. No. 11/830,823 filed Jul. 30, 2007 entitled, "IMPROVED DISTRIBUTION OF CONTENT ON A NETWORK", which are incorporated herein by reference.

COMPUTER PROGRAM LISTING APPENDIX

The computer program listing appendix attached hereto consists of two (2) identical compact disks, copy 1 and copy 2, each containing a listing of the software code for one embodiment of the components of this invention. The contents of the compact disks are a part of the present disclosure, and are incorporated herein in their entireties.

Each compact disk contains the following files (file name, size in bytes, date and time of creation).

BACKGROUND

In general, a centralized network typically includes a network topology that branches from one or more centralized facilitating servers, whereby data, information and queries are distributed between network users through the one or more centralized facilitating servers. The locations of network users are typically in reference to the centralized server, and the relationships between the network users and the one or few centralized servers provides the overall structure of the network. In conventional centralized networks, a highly centralized server can become a single point of failure for the entire network, and a network centralized around one or a few connection hubs can abruptly fail if a single hub is disabled or removed.

A less centralized network (e.g., decentralized network) can have no single points of failure due to multiple data paths through the network and thus can be relatively less vulnerable to random failures because, if some network paths fail, the remaining network users can still reach each other over other network paths. In general, a decentralized network typically includes a network topology that allows network users to distribute data, information and queries directly through other network users without relying on a central facilitating server. However, determining locations of decentralized network users can be difficult because network paths do not originate from a particular network server and network users can be scattered throughout a region such that network paths follow random patterns.

SUMMARY

Embodiments of the invention overcome the deficiencies of the above prior approaches by providing methods and systems for improved distribution of content on a communication network, such as a decentralized network, a video distribution network and/or the Internet.

Embodiments of the invention provide systems and methods adapted to receive a video request message from a user, identify a location (e.g., longitude and latitude) of the user, identify a location of one or more overlay nodes nearest to the user, generate network organization information, and publish the network organization information to at least the client. In one aspect, the network organization information includes topology and routing information of the network.

Embodiments of the invention provide systems and methods adapted to receive a request for a video from a user on a network, stream a first portion of the requested video to the user from a first node in the network, separate a remaining portion of the requested video into a plurality of subsection portions, search one or more other nodes in the network for the subsection portions of the requested video, and stream one or more of the subsection portions of the requested video to the user from one or more other nodes in the network.

Embodiments of the invention provide systems and methods adapted to receive a video request from a user, stream the requested video to the user, identify one or more interests of the user, obtain an advertisement related to the one or more interests of the user, interrupt the video stream of the requested video at an interrupt point to stream the advertisement to the user, and continue streaming of the requested video to the user.

These and other features and advantages of the invention will be more readily apparent from the detailed description of the embodiments set forth herein taken in conjunction with the accompanying drawings.

BRIEF DESCRIPTION OF THE FIGURES

FIGS. 4A-4B are block diagrams illustrating various implementations of a video subsection algorithm in accordance with embodiments of the invention.

DETAILED DESCRIPTION

As discussed herein, embodiments of the invention disclose systems and methods for improving the distribution of content on a communication network, such as a decentralized network including the Internet as a decentralized network.

Figure 1:
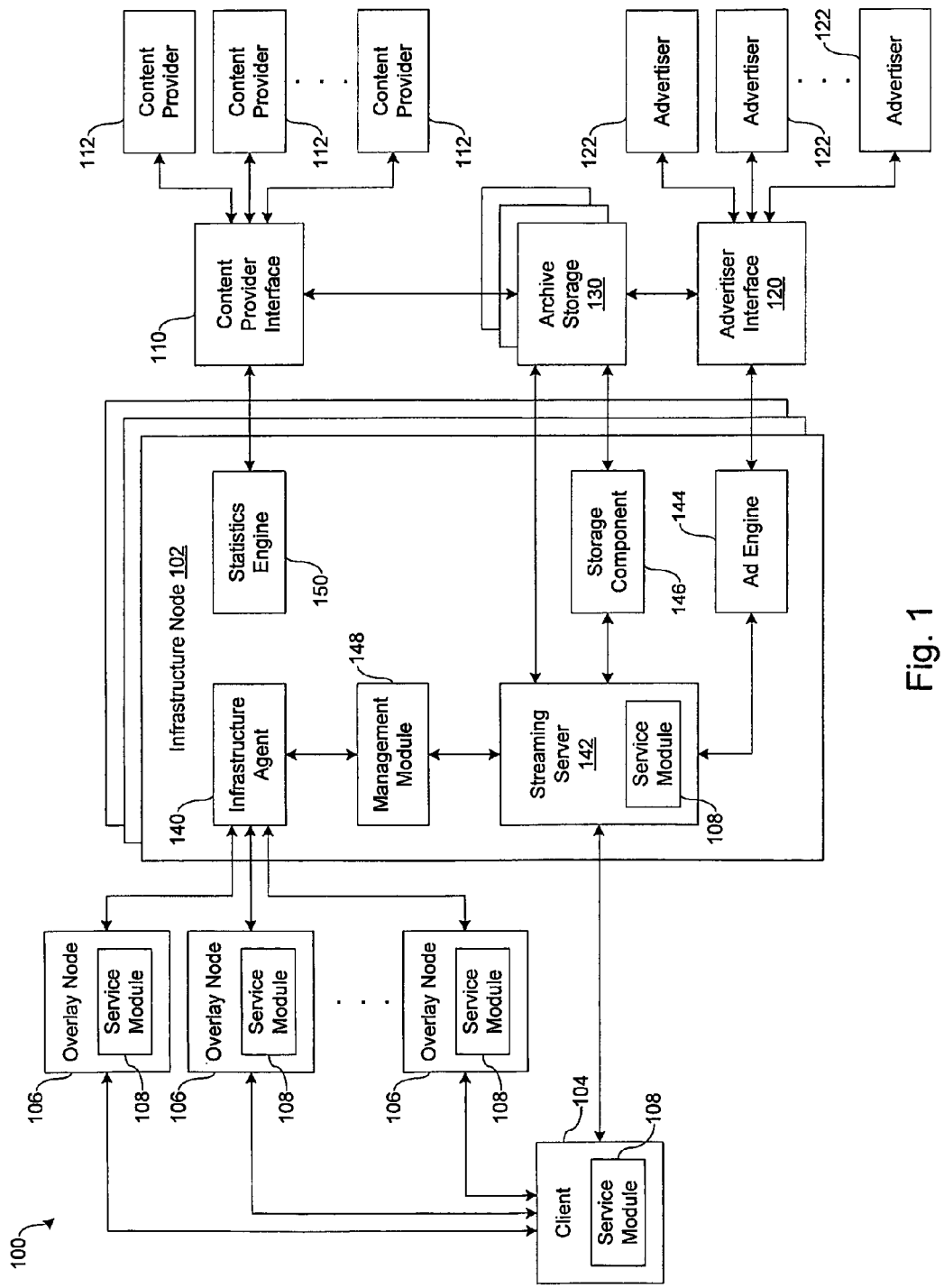
FIG. 1 is block diagram illustrating a the video distribution system and components thereof in accordance with an embodiment of the invention.

FIG. 1 shows an embodiment of a the video distribution system 100 comprising one or more infrastructure nodes 102, a client 104, one or more overlay nodes 106, a content provider interface 110, an advertiser interface 120 and one or more archive storage components 130. It should be appreciated that the video distribution system 100 may also be referred to as a video distribution network without departing from the scope of the embodiments of the systems and methods presented herein.

In one embodiment, the infrastructure node 102 comprises a plurality of components including an infrastructure agent 140, a streaming server 142, an ad engine 144, a storage component 146, a management module 148 and an analytics and statistics engine 150. The infrastructure node 102 comprises a point of presence (POP) in the video distribution system 100 and communicates with the client 104 and overlay nodes 106 via a communications network. In one example, the communications network may comprise a decentralized communications network including the Internet.

It should be appreciated that the infrastructure node 102 may be but one of a plurality of infrastructure nodes 102 in communication with each other, the client 104 and the one or more overlay nodes 106. Each of the infrastructure nodes 102 may be adapted to function as a retention server (RS) comprising high capacity storage facilities for archiving and storing content from the video distribution system 100 and/or as a super node comprising a node in the video distribution system 100 that hosts other nodes, such as the client 104 and/or one or more overlay nodes 106 in the system 100.

In one embodiment, the infrastructure agent 140 comprises an intelligent component that is adapted to communicate with an overlay network comprising one or more overlay nodes 106. In one implementation, the infrastructure agent 140 is used to function as a bootstrapping mechanism if an agent, such as the intelligent client 104, one or more intelligent overlay nodes 106 and/or one or more intelligent infrastructure nodes 102, is unable to locate one or more other agents to connect to. The infrastructure agent 140 may be viewed as a dependable agent for communication in the video distribution system 100. Hence, the infrastructure agent 140 has the ability to spread rumor data and information in the network 100 as an intelligent agent.

In one embodiment, the streaming server 142 comprises a computing device, such as a server, that is adapted to communicate with the client 104 via a communications network, such as the Internet. The streaming server 142 is adapted to communicate with one or more archive storage components 130, which may comprise one or more databases that store data and information, such as video data and information including high definition video data and information. The streaming server 142 may be adapted for high throughput, optimized for high performance and scalable for supporting infrastructure pull from the client 104, one or more overlay nodes 106 and other infrastructure nodes 102 in the video distribution system 100. The streaming server 142 may be adapted to access a media store and/or a media cache to obtain archived or cached video data and information.

In one embodiment, the streaming server 142 may be adapted to periodically write statistics and logs. For example, when an incoming video access request is received, the streaming server 142 takes note of the requesting node, such as the client 104, and how much data was transferred to the requesting node. Within a particular time period, such as every few seconds, the streaming server 142 writes accumulated data and information for this transaction to a database depository, such as the storage component 146, for future queries. One reason for writing transactional data and information every few seconds is to lower the transactions per second of input into the streaming server 142.

In one embodiment, the streaming server 142 has a service module 108 installed thereon and is adapted for communication with nodes of the video distribution system 100 including the client 104, the one or more overlay nodes 106, and one or more other infrastructure nodes 102.

In one embodiment, the service module 108 comprises a software program that is adapted to facilitate, coordinate and mange communication between the client 104, overlay nodes 106 and other infrastructure nodes 102 in the video distribution system 100. When installed on a computing device, the service module 108 allows a user, such as the client 104, to download and view videos from the overlay nodes 106 and other infrastructure nodes 102. As discussed herein, in an attempt to access a video that is available on the video distribution system 100, the client 104 may first download the service module 108 from the streaming server 142 of the infrastructure node 102, and once the service module is installed, the client 104 is adapted to download one or more portions of the video from one or more overlay nodes 106. As with the client 104, each overlay node 106 has an installed service module 108 from the streaming server 142 for facilitating communication with the client 104, other overlay nodes 106 and other infrastructure nodes 102 in the video distribution system 100.

In one implementation, the installed service module 108 allows the infrastructure node 102 to function as an intelligent agent in the video distribution system 100 by allowing the infrastructure node 102 to communicate with other nodes in the system 100, such as the client 104 and the overlay nodes 106, and provide video data and information to the other nodes in the system 100.

In one embodiment, the service module 108 comprises a lightweight OS (operating system) service running in the background (e.g., daemon service) that is adapted to interface with a media player, such as Windows Media Player, DIVX player, or similar player). In the context of software processes, background refers to processes that run with a relatively low priority, require little or no input and generate a small amount of output. In multitasking operating systems, a daemon generally refers to a computer program that runs in the background without direct user control. Daemons may be adapted to perform a variety of tasks and configure hardware. The service module 108 (e.g., daemon process) transforms the client into an intelligent client that is configured to manage one or more algorithms for combining infrastructure pull streaming and overlay streaming from the video distribution system and manages QoS (quality of service) for streaming including performing streaming bitrate management, bandwidth related optimizations, load balancing and hitless failover. The service module 108 may be downloaded from the streaming server 142 of the infrastructure node 102 and installed using a packaged installer and works across NAT (network address translation) and firewalls. In general, NAT is a technique in which the source and/or destination addresses of IP packets are rewritten as they pass through a router or firewall.

In one embodiment, the ad engine 144 comprises a static server that functions as a logic machine to match video content and advertisements together by taking into consideration statistics information, such as demographics, habits, location and tuple information (e.g., distributor, advertiser, content provider). Components of the ad engine 144 are discussed in greater detail herein in reference to FIG. 6.

In one embodiment, the storage component 146 comprises a memory component, such as a cache database, for storing data and information. The storage component 146 may be adapted to utilize a massively scalable clustered file system including the media store, which may comprise a centralized archive physically distributed across the infrastructure nodes 102. In one example, video data and information is stored and archived at the media store, which may be partitioned and located on a per client node basis. The storage component 146 may be adapted to utilize the media cache, which may be collocated as an intelligent cache with one or more streaming servers 142. The storage component 146 may be adapted to utilize algorithms to manage video data and information in the media store and/or the media cache based on frequency, demand, projected/real viewership, analytics and other parameters. The storage component 146 may be adapted for fast indexing and retrieval of video data and information. The storage component 146 may be adapted for on-demand pull from the media store and the media cache and optimized for synchronization across the media store and media cache.

In one embodiment, the management module 148 comprises an interface to alert nodes 102, 104, 106 of the video distribution system 100 of state changes by the rumor mechanism, such as but not limited to high load (e.g., notify to layoff some percent), as discussed in greater detail herein.

In one embodiment, the analytics and statistics engine 150 comprises one or more databases with an front-end application (e.g., web site user interface) that describes the distribution (e.g., nodes that have viewed video content and node demographics) of a piece of media and correlates metadata for users (e.g., customers, clients and/or overlay nodes) of the video distribution system 100.

In one embodiment, the client 104 comprises a user (e.g., end user, node, or similar structure) having a computing device, such as a personal computer, laptop computer, mobile device including a personal digital assistant and/or cell phone, or similar structure. The client 104 may interface with one or more nodes of the video distribution system 100 including one or more infrastructure nodes 102 and one or more overlay nodes 106 via an access module, such as a browser, to access and download content, data and information, including video content, data and information. In one example, the client 104 may surf a communications network, such as the Internet, and may attempt to access a web page having a link to a video that is available on the video distribution system 100. As discussed herein, in an attempt to view the video, the client 104 may be prompted to download and install the service module 108 that allows the user to download and view the video from one or more nodes in the video distribution system 100 with or without the use of a browser. In one aspect, once the service module 108 is installed, the client 104 may be referred to as an intelligent agent, client, user or node.

In one implementation, the installed service module 108 allows the client 104 to function as an intelligent agent in the video distribution system 100 by allowing the client 104 to communicate with other nodes in the system 100, such as the one or more infrastructure nodes 102 and the one or more overlay nodes 106, and provide video data and information to the other nodes in the system 100.

In one embodiment, the overlay nodes 106 (e.g., edge nodes) comprise other clients (e.g., other user nodes) having a computing device, such as a personal computer, laptop computer, or similar structure. The overlay nodes 106 may have the service module 108 installed on their computing device and thus may be in contact with one or more infrastructure nodes 102 in the video distribution system 100. As discussed herein, in an attempt to access a video that is available on the video distribution system 100, the client 104 may download one or more portions of a video from one or more overlay nodes 106. As with the client 104, each overlay node 106 has an installed service module 108 for facilitating communication with the client 104, other overlay nodes 106 and one or more infrastructure nodes 102 on the video distribution system 100. In one aspect, once the service module 108 is installed, the one or mode overlay nodes 106 may be referred to as an intelligent agent, client, user or node.

In one implementation, the installed service module 108 allows the one or more overlay nodes 106 to function as one or more intelligent agents in the video distribution system 100 by allowing the overlay nodes 106 to communicate with other nodes in the system 100, such as the one or more infrastructure nodes 102 and the client 104, and provide video data and information to the other nodes in the system 100.

In one embodiment, the content provider interface 110 comprises a module that allows one or more content providers 112 to access one or more infrastructure nodes 102, and the content provider interface 110 allows the content providers 112 to archive and store videos and related metadata to one or more archive storage components 130.

In one embodiment, the advertiser interface 120 comprises a module that allows one or more advertisers 122 to access one or more infrastructure nodes 102 via the ad engine 144, and the advertiser interface 120 allows the advertisers 122 to archive and store video ads and metadata information to one or more archive storage components 130.

In one embodiment, the archive storage components 130 comprise one or more memory components, such as one or more databases, for archiving and storing data and information, such as video data and information, advertiser data and information, content data and information, or similar data information.

In one embodiment, the video distribution system 100 may comprise an overlay network of client nodes 104, overlay nodes 106 and infrastructure nodes 102 for streaming video and QoS. As discussed herein, an overlay protocol is adapted to use a rumor mechanism for distribution of network and system related performance statistics, server overloads, network congestions, service availability and related updates. The rumor mechanism is described in greater detail herein.

Embodiments of the invention provide systems and methods for improving content distribution by pipelining streams of content, data and information gathered from resources of a the video distribution system.

Embodiments of the invention utilize network resources from users online (storage cache, bandwidth and cpu cycles) and edge distribution servers, such as one or more infrastructure nodes, so that the cost of running and maintaining the video distribution system is reduced while the quality of service (QoS) is improved.

Embodiments of the invention allow users to put their favorite content, such as videos, on their websites or other websites with simple embed and object tags. As such, users are not required to host their own content at their expense, and users do not have to denigrate the quality of their content, including videos, to reduce the file size. The video distribution system presented herein allows users to distribute content and media without the high cost of conventional the video distribution systems.

Figure 2:
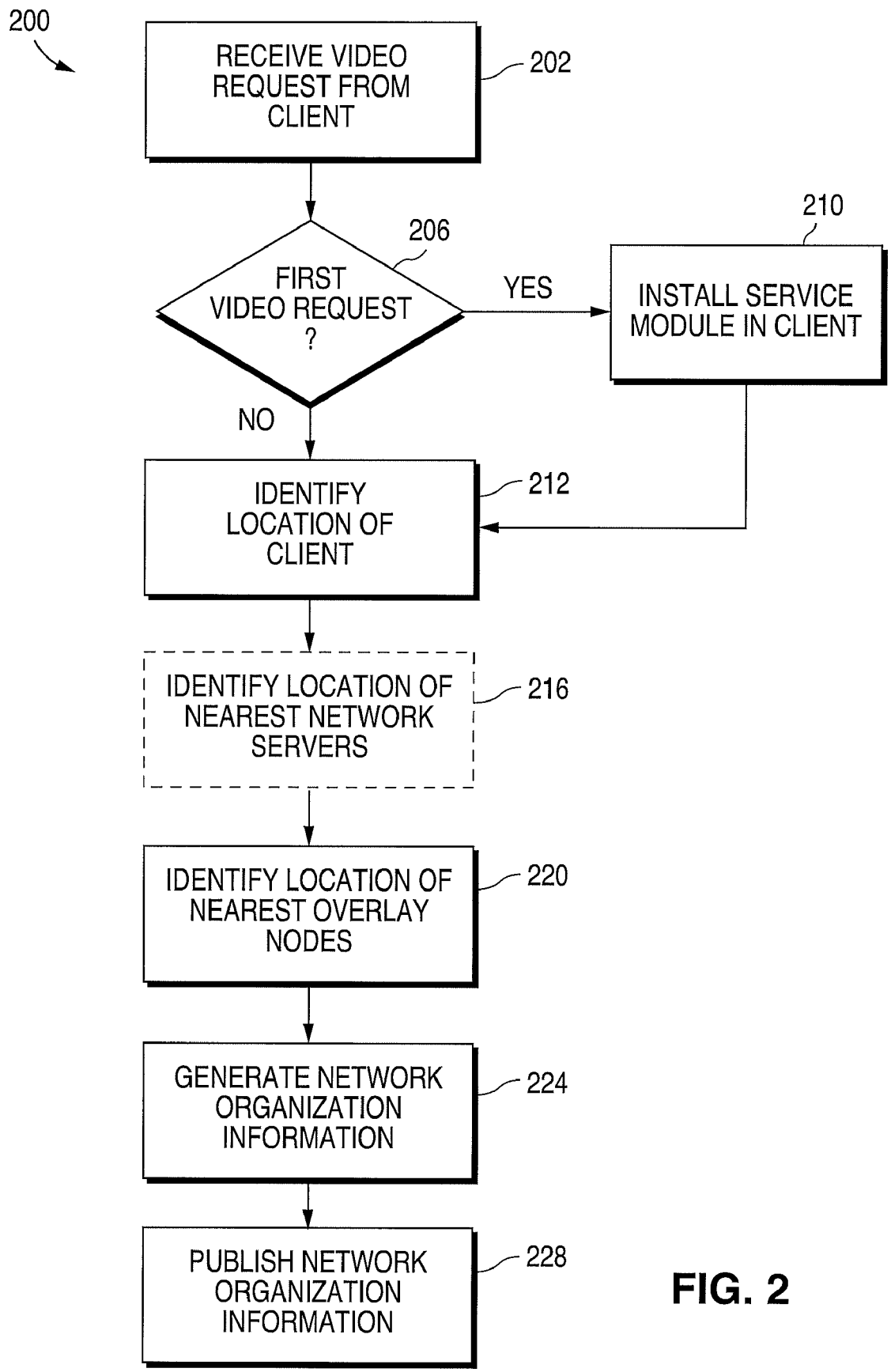
FIG. 2 is a block diagram illustrating a method for publishing network organization information in accordance with an embodiment of the invention.

FIG. 2 shows one embodiment of a method 200 for publishing network organization information including topology and routing information related to the video distribution system 100 in reference to FIG. 1.

The infrastructure node 102 receives a network video request message from the client (e.g., user) 104 attempting to access data and information, such as a video, from the video distribution system 100 (block 202). The infrastructure node 102 determines if the video request message from the client 104 is a first video request message (block 206). If yes, the infrastructure node 102 installs the service module 108 to the client, which runs in the background on the client 104 (block 210). Otherwise, if no, the infrastructure node 102 knows that the client 104 is already part of the video distribution system 100. The infrastructure node 102 attempts to identify a location of the client 104 by querying the client 104 for longitude and latitude information (block 212). Optionally, the infrastructure node 102 identifies locations of the nearest network servers based on location information received from the client 104 (block 216). The network servers are Internet based network servers. For example, if the client 104 is located in New Jersey, then the nearest Internet based network server may be located in New York.

Next, the infrastructure node 102 identifies a location of the nearest overlay nodes 106 in the video distribution system 100 (block 220), wherein the overlay nodes 106 may comprise other clients (e.g., users) in the video distribution system 100 that the client 104 may potentially connect to for accessing data and information, such as a video. For example, the infrastructure node 102 may choose a plurality of direct overlay nodes 106 nearest to the client 104 by determining the distance of the client 104 from each of the nearest overlay nodes 106 and sorting the direct edges nodes (e.g., overlay nodes) from nearest to farthest. Next, the infrastructure node 102 generates organization data and information related to the network topology and/or routing data and information of the video distribution system 100, which may comprise the location of the client 104, the location of the nearest Internet based network servers and the location of nearest overlay nodes 106 (block 224). The infrastructure node 102 then publishes the data and information related to the network organization to the client 104 and/or direct overlay nodes 106 of the client 104 (block 228).

In one embodiment, network organization data and information may include a network node topology and routing map of the video distribution system that indicates the nearest (e.g., closest) overlay nodes, the infrastructure nodes and network servers to the client. The network organization data and information may be generated, sorted and listed in a data structure, such as a list or table, and then provided to the client for local archiving and storage on the client. The network organization data and information allows the client to find the nearest overlay nodes, the infrastructure nodes and network servers in the video distribution system for faster data access and retrieval.

In one embodiment, published parameters include node information, port information and location information. In one example, the data construct may comprise one or more of the following parameters: ip (internet protocol address), port (communication portal number), long (longitudinal number of location), lat (latitudinal number of location), and netspeed (connection speed that may be learned through statistical analysis of ping response times).

In one embodiment, the infrastructure node organizes the video distribution system 100 according to a particular client so as to provide a faster and more efficient way for the client to retrieve data and information from the video distribution system before searching for the data and information. The network organization information (e.g., network topology and routing information) provides the client a list of the nearest one or more overlay nodes so that the client may retrieve data and information from the overlay nodes before retrieving data and information from the Internet based network servers. In one implementation, the infrastructure node may choose 80% of the overlay nodes nearest to the client and 20% of the overlay nodes randomly to increase diversity of the overlay nodes access by the client.

In one implementation, a user (e.g., client) accesses a web page that comprises a tag code for a video or other content on the video distribution system. If the video request message is a first time, then the user is prompted to install a browser plug-in. Once the plug-in is installed on the user computer, then the web browser interprets the tag, which contacts at least one infrastructure node in the video distribution system to start streaming the video in the web browser by utilizing the operating system, browser, and other related functional components of the user. While the video is being streamed (e.g., played) to the user, dynamic targeted advertisements may be fetched by the infrastructure node and viewed by the user. Data retrieval from the video distribution system may be handled by proxy as described in greater detail herein.

In one implementation of method 200, referring to FIGS. 1-2, the client 104 makes a video access request from the video distribution system 100. The infrastructure node 102 determines if the access request from the client 104 is a first access request. If yes, the infrastructure node 102 installs the service module 108 to the client 104, which runs in the background on the client 104. Otherwise, if no, the infrastructure node 102 knows that the client is already part of the video distribution system 100. Next, the client 104 determines its longitude and latitude location information. Next, the client 104 identifies a location of the nearest overlay nodes 106 in the video distribution system 100, wherein the overlay nodes 106 are other clients (e.g., users) in the video distribution system 100 that the client 104 may potentially connect to for accessing data and information, such as a video. For example, the client 104 may choose a plurality of overlay nodes 106 nearest to the client 104 by determining the distance of the client 104 from each of the nearest overlay nodes 106 and sorting the directed edges to overlay nodes 106 from nearest to farthest. Orthogonal to this, the infrastructure node 102 generates data and information related to the network topology and availability of nodes (both the overlay nodes 106 and infrastructure nodes 104) in the video distribution system 100. Next, the infrastructure node 102 then publishes this information related to the network organization to the client 104 and overlay nodes 106 in the network.

In some instances, the infrastructure node 102 may not be able to determine the location of the client 104. In this instance, the infrastructure node 102 may attempt to establish a location of the client 104 by utilizing a ping construct, wherein the infrastructure node 104 pings a plurality of overlay nodes 106 in the video distribution system 100 and chooses the quickest ping response as the pseudo-location for the client 104. In this way, the infrastructure node 102 applies the location (e.g., longitude and latitude) of the nearest overlay node 106 to the client 104. The infrastructure node 102 may change the pseudo-location of the client 104 if another overlay node 106 is determined to be closer to the client 104 than a previous overlay node 106.

In one embodiment, the client 104 may be adapted to learn location information of itself, such as latitude (lat) and longitude (long), from a central server in its first attempt to access a video on the video distribution network 100. The client 104 may then store the longitudinal and latitudinal information to facilitate learning and decision making from other nodes, including infrastructure nodes 102 and/or overlay nodes 106 in the system 100. The (lat, long) location information is 'remembered' (e.g., stored in memory) by the client 104. In one example, the client 104 is an entity (e.g., node) that tries to learn where it is in the video distribution system 100; i.e. the client 104 attempts to 'find itself' (e.g., it own location) in the system 100.

In one embodiment, the infrastructure node 102 does not use a Domain Name Service (DNS) and does not use HTTP redirects, which is a common technique in a traditional content delivery network (CDN). In general, a DNS comprises a distributed data query service used by the Internet for translating hostnames into Internet addresses.

Embodiments of the invention define and implement video streaming technology and algorithms that address the limitations of conventional HTTP-based progressive downloads, the current generation of streaming protocols, and peer-to-peer based video distribution. As discussed in greater detail herein, embodiments of video streaming technology and algorithms utilize a combination of infrastructure video streaming from infrastructure nodes 102, overlay video streaming from one or more overlay nodes 106, intelligent video streaming to the intelligent client 104 having the installed service module 108, QoS (Quality-of-Service) management via the intelligent client 104, and security mechanisms to protect video content. Infrastructure streaming and overlay streaming are video streaming protocols and algorithms used to optimize bitrates and bandwidth required for video streaming to pipeline, prioritize and load balance video streams across multiple infrastructure and overlay nodes and manage streaming QoS. Infrastructure streaming may be driven from centralized infrastructure nodes, while overlay streaming may utilize decentralized overlay nodes for streaming, learning of network-related and service availability information (e.g., network topology, optimized routes, overloaded servers, and/or available data resources) and QoS management.

In one embodiment, the infrastructure node 102 may comprise a high performance HTTP-based streaming server cluster capable of horizontal scalability and high streaming throughput, which may run at more than 6 Gbps per node instance, and an overlay node 106 may run an instance of the intelligent client 104. As described herein, video streaming technology utilizes the intelligent client 104 to run the service module 108 as a lightweight background service on the end user's computer, which is adapted to manage video streaming and the associated QoS. The service module 108 may be downloaded (e.g., approximately a 1 MB file size with a download time of about a few seconds) when an end user, such as the client 104, attempts to download a video from the video distribution system 100 for the first time by accessing an enabled video streaming web site from the infrastructure node 102. The service module 108 may be adapted to be transparent to the end user's post-install to increase the user's experience while lowering the operational cost to the content providers. In one embodiment, the service module 108 functions as a proxy media player and runs in the background of the user's operating system (OS). The service module 108 may be adapted to be agnostic to media formats and media players, which enables algorithms and protocols presented herein to be applicable to multiple different media formats and players. The service module 108 works across NAT and firewall managed end-user computers, may be unnoticeable to a user, may be un-intrusive and may deliver faster streaming videos.

In one embodiment, when an end-user, such as the client 104, requests a video stream from the video distribution system 100, the service module 108 performs an optimal combination algorithm on infrastructure video streaming and overlay video streaming of the video to the end-user to ensure a quick start and a smooth jitter-free viewing experience. The service module 108 pulls the video from its available pool of infrastructure nodes 102 and overlay nodes 106. The service module 108 does not need DNS (domain name service) resolution for access to multiple infrastructure nodes 102 and overlay nodes 106.

Figure 3:
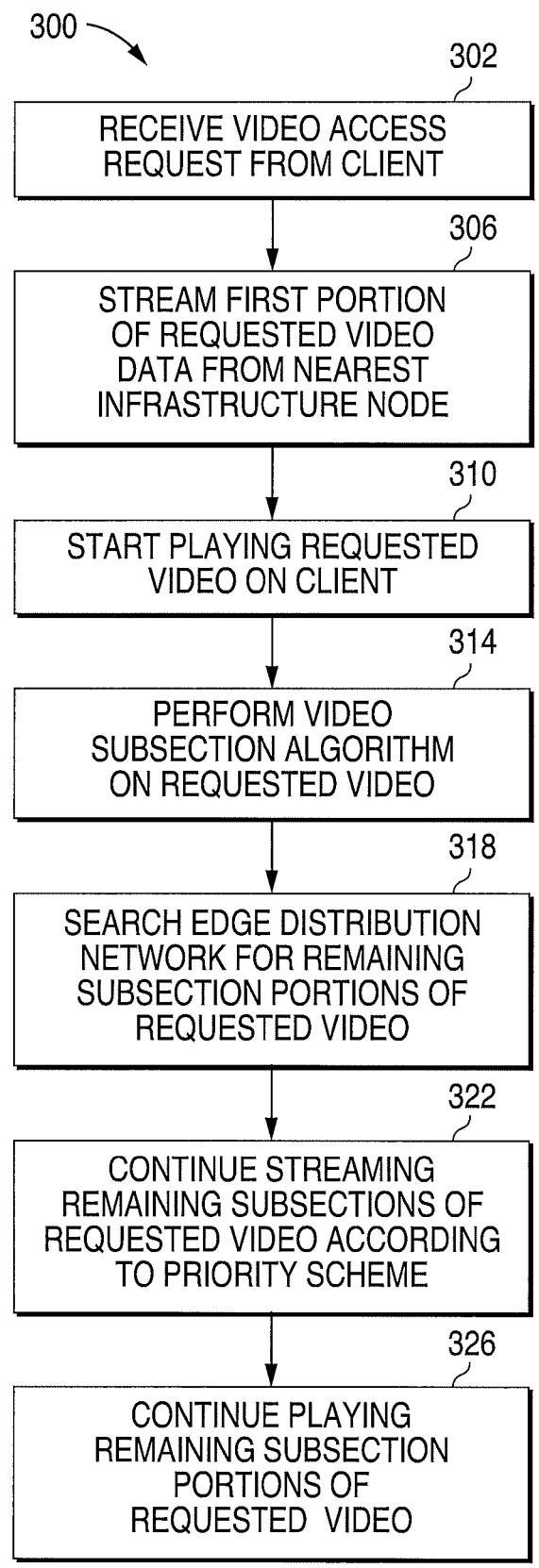
FIG. 3 is a block diagram illustrating a method for streaming video to a client on a network in accordance with an embodiment of the invention.

FIG. 3 shows one embodiment of a method 300 for streaming video to the client 104 on the video distribution system 100 in reference to FIG. 1.

The infrastructure node 102 receives a video request message from the client 104 (block 302). The infrastructure node 102 streams (e.g., uploads) a first portion of the requested video data from the nearest infrastructure node 102 (e.g., retention server) (block 306). The infrastructure node 102 starts playing the requested video on the client 104 (block 310). The infrastructure node 102 performs the video subsection algorithm on the requested video data file (block 314). After performing the video subsection algorithm on the requested video data file, the infrastructure node 102 searches the video distribution system 100 for the remaining subsection portions of the requested video (block 318). Next, the infrastructure node 102 continues streaming (e.g., uploading) the remaining subsection portions of the requested video according to a priority scheme (block 322), and the client 104 continues playing the remaining subsection portions of the requested video in priority order (block 326).

FIG. 4A shows one embodiment of implementing the video subsection algorithm, which creates subsections of the video data file based on the streaming (e.g., upload and/or download) capability of a particular infrastructure node and/or overlay node in the video distribution system. As shown in FIG. 4A, the video data file 400 may be separated into sections (section 1 thru section 6), and these sections may be separated into subsections (ss1 thru ss11) by the video subsection algorithm.

In one implementation, the infrastructure node 102 is adapted to stream a first subsection portion (ss1) of the requested video to the client 104 at a first data rate of 300 kbps. The remaining subsection portions of the requested video may be streamed to the client 104 from various nodes at various rates depending on the data rate capability of a particular infrastructure node 102 and/or overlay node 106 in the video distribution system 100. For example, as shown in FIG. 4A, a second subsection portion (ss2) may be streamed at a data rate of 20 kbps, one or more subsection portions (ss3, ss4, ss5, ss6) may be streamed at a data rate of 5 kbps, another subsection portion (ss7) may be streamed at a data rate of 50 kbps, and so on. The video subsection algorithm allows a video file to be separated (e.g., fragmented) into multiple subsection portions of varying sizes so that these subsection portions may be streamed more quickly to the client 104 from the overlay nodes 106 and/or infrastructure nodes 102 without adversely affecting the quality of service (QoS) of viewing the video by the client 104.

FIG. 4B shows one embodiment of implementing the video subsection algorithm with reference to a critical point (CP) of the video stream. In one example, when a video download is requested by the client 104, the infrastructure node 102 streams a first portion of the video while the service module 108 on the client 104 attempts to download the remaining portions of the video from one or more overlay nodes 106 or other nodes in the video distribution system 100. In one implementation, the streaming algorithm is adapted to specify the critical point based on upload bandwidth capacities of overlay nodes 106.

In one embodiment, as shown in FIG. 4B, the critical point refers to a position 420 in a video data file 400 where a first subsection portion (ss1) may stop streaming and a second subsection portion (ss2) may start streaming based on the bandwidth capability of a particular overlay node 106 and/or infrastructure node 102. The critical point may occur in any position within the video stream. FIG. 4B shows one example, and thus, other critical point positions may be provided depending on the streaming capabilities of the node and the number of subsection portions created by the video subsection algorithm. This feature allows for richer pipelining of the streaming process for the video data file, which translates to video streaming speedup (e.g., faster streaming) for the client 104.

In one implementation, referring to FIGS. 1 and 3-4B, an intelligent client 104 is adapted to send a video access request to the nearest infrastructure node 102. The streaming server 142 on the infrastructure node 102 starts streaming the requested video bits to the intelligent client 104 using a streaming protocol, such as a standard HTTP protocol, which may be referred to as infrastructure streaming. The service module 108 on the intelligent client 104 performs the video subsection algorithm on the requested video. The intelligent client 104 accesses the video distribution system 100 for the remaining subsection portions of the requested video by assigning dynamic priorities to the remaining subsection portions streamed from infrastructure nodes 102 and overlay nodes 106. In one aspect, streaming from the overlay nodes 106 of the video distribution system 100 may be referred to as overlay streaming.

In one embodiment, for a higher level of QoS, the intelligent client 104 maintains an optimal bitrate for the video playback based on the broadband download speed and performs prioritization and optimizations on how the subsection portions of the video is assembled across the available pool of infrastructure nodes 102 and overlay nodes 106 without needing a contiguous download similar to the conventional HTTP-based progressive download. As discussed herein, the intelligent client 104 and intelligent overlay nodes 106 use a learning algorithm to incrementally learn about network topology, route optimizations for access to the infrastructure and overlay nodes, network congestions and service availability conditions. The client 104 may then use this information to find the streaming bits from an available pool of infrastructure nodes 102 and overlay nodes 106 using an optimal least cost algorithm. As the intelligent client 104 aggregates subsection portions of the video across both infrastructure nodes 102 and overlay nodes 106, the client 104 effectively manages the flow to recover from any type of network congestion or service availability condition with seamless failover invisible to the client 104. For example, if multiple infrastructure nodes 102 aggregated in a single data center fail midstream or the bandwidth is overloaded, buffering may not occur for the client 104 due to the use of intelligent agent technology of the service module 108.

In one embodiment, the video streaming technology of the present disclosure distributes streaming load and QoS optimizations across a combination of centralized infrastructure nodes 102 and overlay nodes 106 to thereby lower the cost of distribution for content owners and video distribution sites as compared to conventional centralized video distribution networks. The video streaming technology of the present disclosure may be adapted to balance and distribute a streaming load across multiple nodes of optimal capacity. Therefore, instead of building infrastructure and charging content owners for peak load capacity, the algorithms presented herein lead to optimal infrastructure resources without causing any degradation on the end user experience and overall system capacity.

In one embodiment, the priority scheme provides a way to stream subsection portions of a video data file from overlay nodes 106 first, then from the infrastructure nodes 102 and then from Internet based servers, which may be connected to the video distribution system 100. This priority scheme improves QoS to the user (e.g., the client 104) by providing a more efficient and cost effective way of downloading video data and information from overlay nodes 106 first. If one or more of the overlay nodes 106 do not have a particular data file, then the infrastructure nodes 102 may provide a secondary resource for video data and information. Otherwise, if the overlay nodes 106 and the infrastructure nodes 102 do not have a particular data file, then Internet based servers may be queried to provide particular data files that the overlay nodes 106 and/or the infrastructure nodes 102 may not have stored locally.

In one embodiment, a dynamic priority scheme for video streaming provides a mechanism to stream subsection portions of a video from overlay nodes 106 and streaming servers 142 on infrastructure nodes 102. This may be considered as separating or fragmenting a video stream into multiple substreams (e.g., subsections) with different priorities, which may then be streamed from multiple sources (e.g., overlay nodes 106 an/or infrastructure nodes 102) in the video distribution system 100. The intelligent client 104 having the service module 1008 may utilize the dynamic priority scheme to manage QoS for video streaming.

In one embodiment, the intelligent client 104 may be adapted to stream video using the following algorithm activities.

Referring to FIG. 4B, to a certain critical point on a video playback timeline, the streaming bits may be acquired from the ad engine 144. The critical point may be determined as a function of the video's bitrate, the client's download speed, or both adjusted by a dynamically updateable dampening factor required to maintain a smooth (e.g., jitter free) video experience for the end user. The critical point may be calculated by bitrate (audio+video)*seconds for buffering. The seconds for buffering may be calculated by a playback buffer divided by maxrate possible for the client system+(playback buffer/maxrate*X), where X is an arbitrary dampening factor chosen based on statistics of usage. In one example, the dampening factor (X) may be given an initial value of 15%. However, this value may be increased to a value greater than 15%. The dampening factor may be considered as a parameter that may be updated using the rumor mechanism, as described herein.

The intelligent client 104 may dynamically adjust the critical point based on video performance statistics (e.g., buffering, playback start time, or other similar performance statistics) being collected related to video playback, bitrate and download speed. The algorithm may be adapted to optimize the critical point to be as close to the start of the video as possible to allow for download of the remaining subsection portions of the video from other nodes, such as the overlay nodes 106.

Once the critical point is reached, the intelligent client 104 may be adapted to manage priorities of the remaining subsection portions of the video using a least cost function for the prioritization. In one implementation, the algorithm may attempt to stream higher priority subsection portions of the video first from the overlay nodes 106 to drive the cost of video streaming lower. If the client 104 cannot find the higher priority remaining subsection portions of the video from the overlay nodes 106, then the client 104 may utilize the infrastructure nodes 102 to stream the remaining subsection portions of the video.

It should be appreciated that in reference to the above described algorithm, the size of subsection portions of the video may be variable during streaming and may be dynamically updateable using the rumor mechanism, as described in greater detail herein. For example, the initial size of subsection portions of the video may be 512 Kbs for infrastructure streaming, but as subsections are prioritized and streamed from the overlay nodes 106, the sizes may vary based on subsection availability from the overlay nodes 106 and/or the infrastructure nodes 106. Infrastructure and overlay streaming does not use DNS (domain name service) or HTTP (hyper text transfer protocol) redirects because the IP address and infrastructure updates may be passed from one node to another using the rumor mechanism and stored locally for quick access.

In one implementation, the priority assigned to a subsection portion of a video may be a least cost function of applicable bitrate range for the video that maintains the smooth video experience for the end user, available download speed on the client performing the video playback, availability and distribution topology of the subsection portions in the video distribution system 100, and position of the subsection portions in the timeline of the video. For example, a subsection portion ahead in the video timeline may have higher priority than a subsection portion later in the playback timeline.

In another implementation, the priority assigned to a subsection may be a least cost function that estimates the cost of streaming the subsection portions from multiple available sources (e.g., overlay nodes 106 and infrastructure nodes 102) in the video distribution system 100. This function may be computed based on characteristics, such as bandwidth, computing resources and routing cost, and may be computed dynamically based on topology, location and availability of the overlay nodes 106 and/or the infrastructure nodes 102 in the video distribution system 100. The cost of streaming may be a function of infrastructure bandwidth, which may be calculated at $95^{th}$ percentile of rate, data delivered and computing resource usage.

In one example, the least cost function may be calculated or computed in the following manner. The client 104 may request a video that starts streaming from the infrastructure node 102 with a first cost factor of, for example, 50 attached to it, which may be in some direct or pseudo-monetary form. After the critical point plays back, the client 104 may be able to choose from a number, such as 10, of overlay nodes 106 for retrieving the video data. A number, such as 7, of those overlay nodes 106 may have a cost factor of zero associated therewith along with one of the overlay nodes 106 having a cost factor of 50, one of the overlay nodes 106 having a cost factor of 60, and another one of the overlay nodes having a cost factor of 70. The client 104, having the installed service module 106 and functioning as an intelligent node, would first attempt to acquire video data from the 7 overlay nodes 106 having the associated cost factor of zero. Based on the rate at which the client 104 is acquiring the video data, the client 104 may separate the video file into subsection portions of sizes ranging from about 512 to 2 kb. If the buffer falls under a certain value that could cause starvation, the client 104 may then acquire video data from the next least costly overlay node 106 with the cost factor of 50 associated therewith. If the rate still drops and quality of service is engendered, the client 104 may acquire video data from the overlay node 106 with the cost factor of 60, and so on until the video file streaming process is complete. If buffer starvation is not encountered and QoS is maintained, the client 104 may continue to acquire video data from the one or more overlay nodes 106 having the least cost factor.

In one embodiment, the video subsection algorithm provides a high quality of service (QoS) and low cost (LC) for an optimal user experience. In streaming media with a high QoS and LC, the optimal user experience vs. associated costs may be achieved by first organizing used edges (e.g., overlay nodes 106) from a known pool of overlay nodes 106 by physically closest (longitude, latitude) to the node connecting, such as the client 104 (e.g., user node). In the case of a node, such as the client 104, being unable to acquire location information (e.g., longitude, latitude), the client 104 (e.g., user node) should first connect to overlay nodes 106 at random, ping each overlay node 106, take on the location information (e.g., longitude, latitude) of the overlay node 106 with the lowest latency, and denote the location with a mark as a reminder that the location information is based on a 'fuzzy' decision. The client 104 should continue with normal operation (e.g., staying connected) and, while operating normally, repeat the 'searching for self' until the best possible guess to the actual location (e.g., longitude, latitude) of the client 104 is found. In one aspect, a network map organized in this manner provides a way for video data closest to the requesting node, such as the client 104, to be found first in a search for video data requested from the video distribution network 100. In another aspect, the ability to acquire the data is high due to the high locality of the data.

In one embodiment, when streaming media with a high QoS and LC, the optimal user experience vs. cost may be achieved by acquiring first bytes delivered (FBD) of a media file to some critical point (CP) in the media file, where the CP is defined by a buffer that would allow for a seamless hitless failover (HF). In one aspect, hitless failover may be defined as the ability to recover from error without a human noticeable change in QoS, such as jitter in viewing a downloading video. The CP may be determined by a calculation of bytes-in-file multiplied by a damping factor. In one aspect, the dampening factor may be created by using information about a node's connection speed and physical performance capabilities and by using the location of where video data is obtained through a known server when the server is known by the rumor mechanism, which is discussed in greater detail herein. In some implementations, an optimal method of obtaining FBD (first bytes delivered) does not use DNS (domain name service) redirects or HTTP (hyper text transfer protocol) redirects because IP address and infrastructure updates are passed by the rumor mechanism, which is discussed in greater detail herein.

In one embodiment, once the CP is reached, an algorithm change may occur to a least cost with the optimal QoS algorithm, where cost may be defined as a monetary expenditure burdened by the infrastructure provider of the video streaming service. In one example, a form of the algorithm may be common first from servers, where cost is zero and yields a greatest probability of data acquisition from a non-cost overlay node 106, and rarest first from reliable infrastructure nodes 102 having a cost that may be greater than zero.

In one implementation, the algorithm is as follows given that there are multiple overlay nodes (e.g., edges) 106 with an associated cost (cost, edge, rate, and/or global chance):

With M being defined as the minimal edges required to achieve the QoS needed to maintain the critical rate (CR), which is defined by (min bitrate needed for consistent streaming*dampening factor)+(min bitrate needed for consistent streaming), global chance (GC) being defined as a simple weight to facilitate a decision based on a percentage of global resources (infrastructure loads) such as a global chance of 50 the decision is as follows take a random number mod 100 iff GC<(this number) use the edge to acquire data. This may facilitate a decentralized intelligent load balancing. In some implementations, some edges may not have an associated GC.

Sort all edges by cost, where cost is k=0 is lowest cost,

Using the mapping EDGE→(RATE OF ACQUISITION) acquire data iff EDGE is within GC:

$$(\text{birate for streaming}) < \sum_{K=0}^{N} EDGE_K \leq CR \,\, \forall \,\, \text{parts past the } CP$$

In one embodiment, it should be appreciated that as shown by the pigeon hole principle, an increase in the finish time may be created allowing a time delay that works in favor of facilitating least cost with optimal quality of service (QoS), whereas other traditional content delivery networks and hybrid networks, such as peer-to-peer (p2p) and infrastructure servers, would have more data delivered from more costly edges and/or nodes.

Figure 5:
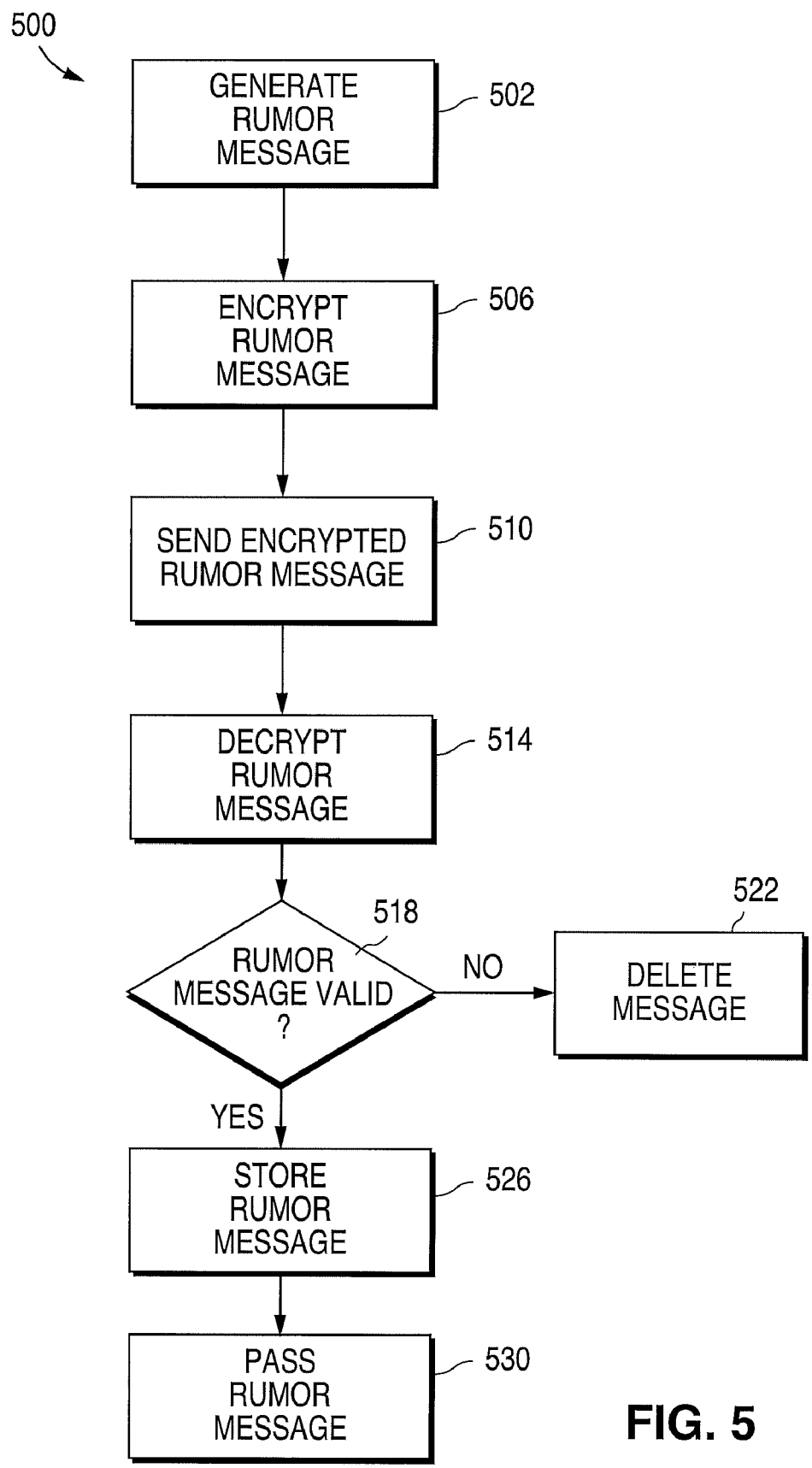
FIG. 5 is a block diagram illustrating a method for distributing network and system related performance statistics of a network in accordance with an embodiment of the invention.

FIG. 5 shows one embodiment of a method 500 for distributing network and system related performance statistics of the video distribution system 100 in reference to FIG. 1. Performance statistics of the video distribution system 100 may include server overloads, network congestions and availability of service updates, which may be passed through the infrastructure nodes and overlay nodes via a rumor mechanism and an overlay network protocol. Method 500 of FIG. 5 provides a protocol construct that allows for secure data usage throughout the video distribution system 100, and method 500 provides a rumor passing algorithm for infrastructure nodes and overlay nodes to validate commands and propagate messages. Some commands may include a delete command, an undelete command, an update command, and a publish command.

In one embodiment, the delete and undelete commands provide access control for the distribution of videos on the video distribution system 100. For example, the infrastructure node may spread a rumor message to overlay nodes to delete particular video from storage and block further distribution thereof on the video distribution system 100. In another example, the infrastructure node may spread a rumor message to overlay nodes to undelete particular video from storage and allow further distribution thereof on the video distribution system 100.

In one embodiment, an update command informs nodes (including infrastructure nodes, clients and/or overlay nodes) of performance statistics and performance states of nodes on the video distribution system 100. For example, if resource contention is high for one or more particular nodes, then the infrastructure node 102 may send a rumor message to overlay nodes 106 to update the performance statistics and states of the overlay nodes 106 so that some of the overlay nodes 106 use a different infrastructure node 102 to access resources. Also, a dampening factor may be passed with the update command, such as a dampening factor of 20% that informs the nodes that a portion should continue downloading from the overloaded infrastructure node 102, but a portion should access a different infrastructure node 102. In another example, the location of one or more nodes may change, and thus, the infrastructure node 102 may send a rumor message to one or more overlay nodes 106 informing them of these network changes. Other passable update information may include the addition and deletion of one or more overlay nodes 106 and/or infrastructure nodes 102 to and from the video distribution system 100, respectively.

In one embodiment, resource conditions or resource contention may be based on bandwidth currently being used by a particular node. For example, if a server's bandwidth is overused, this resource condition may necessitate the creation of a layoff rumor to be sent throughout the network 100. In another example, if a server is down or fails, other nodes may take note of this resource condition and alert other nodes in the network 100 via rumor of network discontinuities.

In one embodiment, a publish command informs nodes (including infrastructure nodes, clients and/or overlay nodes) of the location of other nodes and the location of particular video data files in one of those nodes. The publish command may include parameters for overlay nodes and/or infrastructure nodes, such as IP address, portal number, longitude and latitude.

In one embodiment, referring to FIG. 5, a node (including at least one of an infrastructure node, client and/or overlay node) generates a message (block 502) and asymmetrically signs or encrypts the message (block 506), which may be referred to as a rumor message. The encrypted rumor message is sent (block 510) to one or more overlay nodes and/or infrastructure nodes. The receiver of the encrypted rumor message then uses a public key to decrypt the rumor message (block 514) and check the validity of the rumor message (block 518). If the rumor message is invalid, then the message is deleted (block 522), and the message is not passed to any other node in the network 100. Otherwise, if the message is valid, the receiver of the rumor message stores the decrypted rumor message (block 526) and then passes the message (block 526) to another overlay node and/or infrastructure node that was not the originator of the rumor message. This process may be repeated so as to pass the rumor message to each overlay node and/or infrastructure node in the video distribution system 100.

In one embodiment, the rumor message may be spread throughout the network via fast speed or a slow speed depending on the characteristics of the rumor message. For example, a rumor message may be given a high priority for a fast spread so that each overlay node that receives the rumor message immediately passes it to another overlay node. In another example, a rumor message may be given a low priority for a slower spread so that each node that receives the rumor message may perform other tasks before passing the rumor message to other overlay nodes.

In one embodiment, the method of FIG. 5 may be used by the client, the overlay nodes and/or the infrastructure node to propagate rumor messages throughout the video distribution system and to any overlay nodes that may connect to the network in the future so as to ensure that each and every overlay node receives the rumor message. This method allows for the broadcasting of rumor messages to be relayed through the video distribution system 100. The rumor message may be sent to any node in the system 100 to initiate the process of spreading the rumor message.

Figure 6:
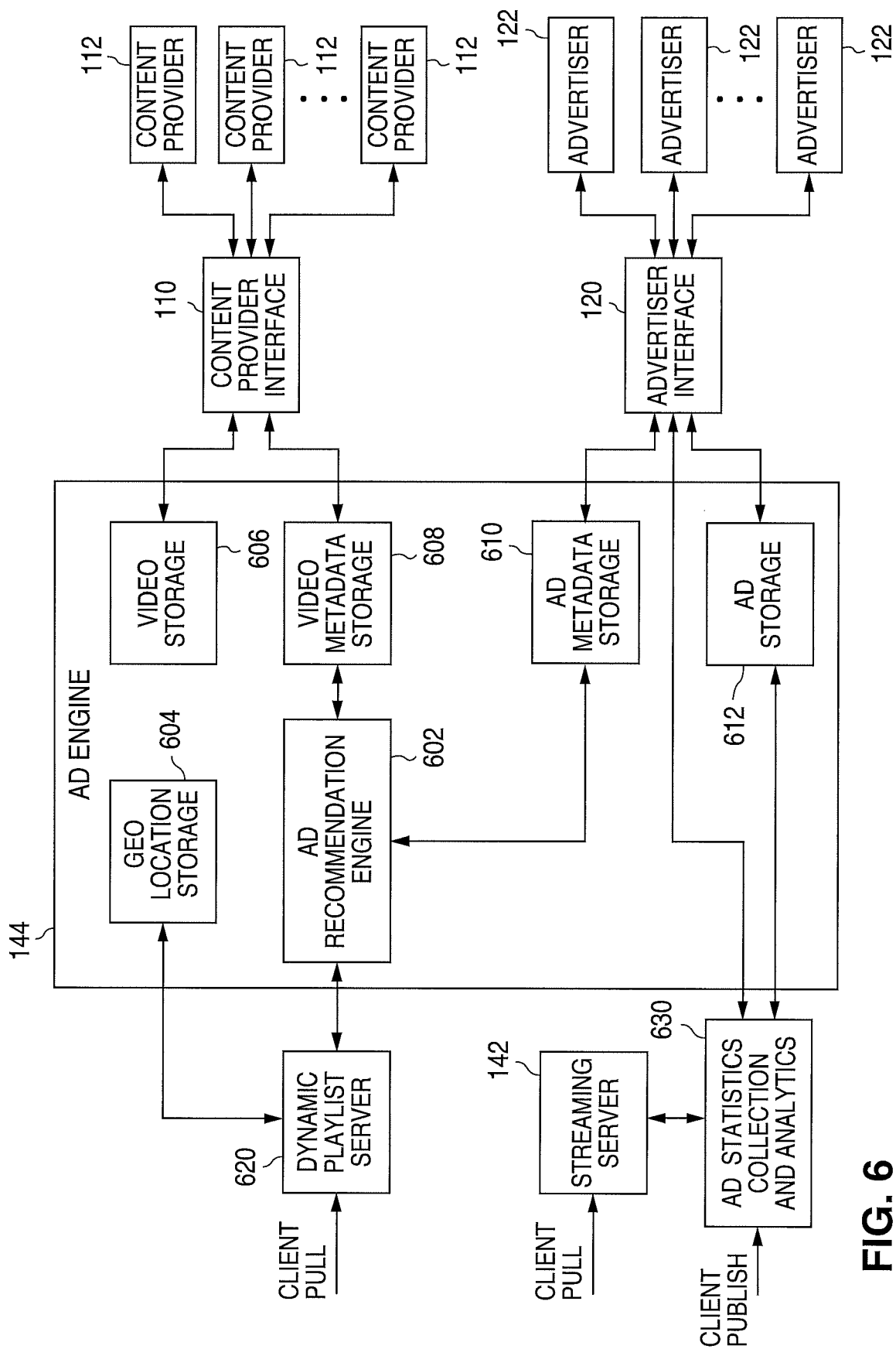
FIG. 6 is a block diagram illustrating an advertisement engine in accordance with an embodiment of the invention

FIG. 6 shows an embodiment of the ad engine 144 (e.g., advertisement engine) as discussed in reference to FIG. 1.

In one embodiment, the ad engine 144 comprises an ad recommendation engine 602, a geo location storage 604, a video storage 606, a video metadata storage 608, an ad metadata storage 610 and an ad storage 612. The ad engine 144 interfaces with a dynamic playlist server 620 and the streaming server 142 of the infrastructure node 102 via an ad statistics collection and analytics component 630. The ad engine 144 interfaces with one or more content providers 112 via content provider interface 110 and with one or more advertisers 122 via advertiser interface 120. It should be appreciated that one or more of these components of the ad engine 144 may be integrated as part of the infrastructure node 102 without departing from the scope of the present disclosure.

In one embodiment, the ad recommendation engine 602 comprises backend logic for matching and/or pairing content, distributors of content and advertisements for distributed video content, data and information. In various implementations, the ad recommendation engine 602 uses contextual means (e.g., what is said and interpreted in the video), metadata (e.g., description of the video), static lists, bidding systems, demographic matching (e.g., who is currently watching) and access control lists (e.g., who may watch what video where and how) for consideration of ad suggestions and/or recommendations.

In one embodiment, the geo location storage 604 comprises a memory component, such as a database, for storing data and information, such as geographic location data and information of overlay nodes, infrastructure nodes, and various other servers within the video distribution system.

In one embodiment, the video storage 606 comprises a memory component, such as a database, for archiving and storing data and information including video data and information provided by one or more content providers 112 via the content provider interface 110, which may include one or more video owners and publishers.

In one embodiment, the video metadata storage 608 comprises a memory component, such as a database, for storing data and information including video metadata and information of videos archived and stored on the video storage. In general, metadata comprises data that is used to describe other data, and data definitions may be referred to as metadata. Some metadata, such as file dates and sizes, may be seen by users, and other metadata may be hidden or embedded and unavailable to computer users who are given access privileges. Some metadata may include information about security or rights management information.

In one embodiment, the ad storage 612 comprises a memory component, such as a database, for archiving and storing data and information including advertising video data and information provided by one or more advertisers 122 via the advertiser interface 120, which may include one or more advertisers, advertisement campaign managers and/or advertisement exchange networks.

In one embodiment, the ad metadata storage 610 comprises a memory component, such as a database, for storing data and information including ad metadata and information of video advertisements archived and stored on the ad storage. As discussed above, some ad metadata may include information about security or rights management information.

In one embodiment, the dynamic playlist server 620 comprises a server that is adapted to use a suggestion and/or recommendation for what is to be played next based on what is currently being played. For example, if the client 104 and/or overlay node 106 is watching a first installment of a video, then the dynamic playlist server is adapted to play the next installment of the video thereafter. The dynamic playlist server 620 provides the ability to statically link data and information together. For example, the client 104 and/or overlay node 106 may request that the next installment of the video should follow the viewing of the current viewed installment of the video.

In one embodiment, the ad statistics collection and analytics component 630 comprises one or more databases with a front-end application (e.g., web site user interface) that describes the distribution (e.g., nodes that have viewed the advertisement content and node demographics) of a piece of advertisement media and correlates advertisement metadata for users (e.g., customers, clients and/or overlay nodes) of the video distribution system 100.

Figure 7:
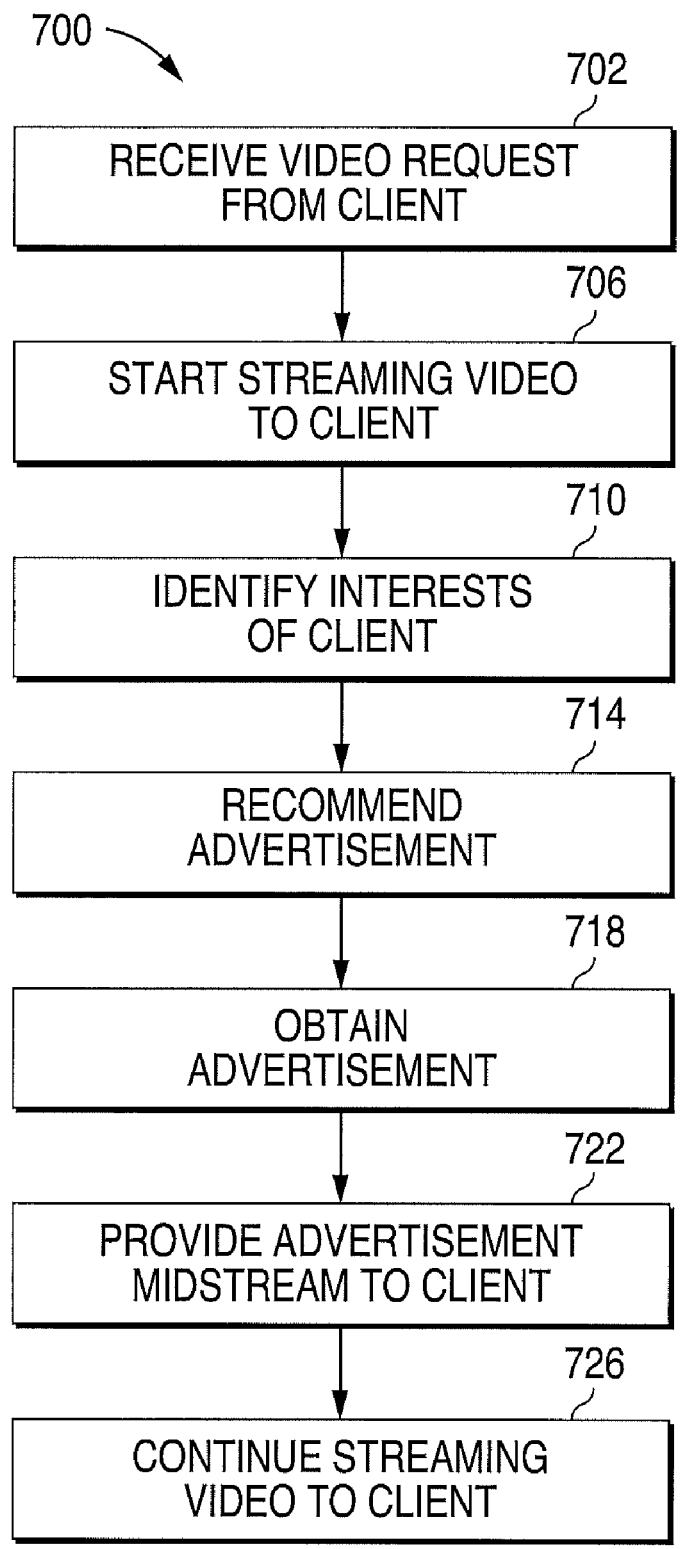
FIG. 7 is a block diagram illustrating a method for providing an advertisement to a user in a network in accordance with an embodiment of the invention.

FIG. 7 shows one embodiment of a method 700 for providing an ad (e.g., video advertisement) to a user (e.g., client) in the video distribution system 100 in reference to FIGS. 1 and 7. The infrastructure node 102 utilizes the ad engine 144 and various other components to provide the advertisement to the client 104.

The infrastructure node 102 receives a video request from the client 104 (block 702). The video request may be viewed via a client resource module, such as a web browser, used by the client 104. The video request may include other types of data requests including audio data and various other types of data and information available on the video distribution system 100. In response to the video request, the infrastructure node 102 starts to stream the requested video to the client 104 (block 706). Next, the infrastructure node 102 identifies interests of the client 104 by accessing the client's resources, such as browser data and information, cookie data and information, or other similar information, from the client 104 (block 710).

In one example, the infrastructure node 102 gathers information from the client 104 via the client's browser cache and cookies folder so as to gather statistics for targeted advertisements. In another example, the infrastructure node 102 may gather statistical information from the client 104 via information related to installed programs and usage thereof under privacy policies and user opt-in.

After identifying the client's interests, the infrastructure node 102 interfaces with the ad recommendation engine 602 for one or more advertisement recommendations based on at least the statistics information gathered from the client 104 (block 714). Next, the infrastructure node 102 obtains one or more advertisements based on at least the ad recommendations received from the ad recommendation engine 602 (block 718).

In one example, advertisements may be obtained from the ad storage 612 via an advertisement index, which may comprise a database of advertisement identification numbers for use in pulling advertisement data from the ad storage 612 and/or from one or more other nodes in the video distribution system 100.

After obtaining one or more advertisements, the infrastructure node 102 provides the advertisements to the client 104 (block 722). In one embodiment, the advertisements may provided midstream during viewing of a requested video, wherein the advertisements may be viewed midstream by the client 104. The advertisements may be positioned between subsection portions of the requested video so that the client views the advertisements and video in an uninterrupted manner. The QoS of the video stream remains high so that the client as viewer has a high quality viewing experience. Next, the video streaming is continued (block 726). It should be appreciated that additional advertisements may be played in between other subsection portions of the video without departing from the scope of the present disclosure.

In one embodiment, a video may be requested by a client at a website provided by the video distribution system. The request is sent to a node, such as an infrastructure node, in the video distribution system that starts to stream (e.g., upload) the requested video and initiates playback. The infrastructure node then queries the ad recommendation engine to lookup a type of advertisement that may be provided to the client, and the ad recommendation engine returns a global unique identifier of the advertisement that may be retrieved and played at a given point specified by the content provider. The advertisement is retrieved from a node of the video distribution system and then played back at the point specified by the content provider. After an ad is played back an event is fired, which sends data that specified the advertisement was played to the ad statistics collection and analytics component. The infrastructure node may allow the data to be visible (e.g., unencrypted) so that the client is aware that no personal data is being sent to an outside agency.

In one embodiment, a pause point may be specified by one or more content providers where an advertisement may be inserted in between video subsection portions. The content of the video may be played until the pause point is reached, and then the advertisement may be streamed seamlessly with the video, which may then be followed by the remaining content of the video. The user experience comprises a combination of the video content and advertisement being played together.

In one embodiment, the advertisement choice may be determined by the ad recommendation engine by collecting statistics about the client from the browser cache, cookie cache, installed programs and usage, website currently viewed, data being requested and various other locally stored data. The ad engine may store a file that is constantly updated from the network, which is adapted to map user demographics to global unique identifiers of advertisements so that advertisements can be identified for retrieval from the network. Other methodologies may be used to fetch advertisements via the ad engine including content, time of day and date. Other types of ads that may be recommended by the ad recommendation engine may include picture or text data.

Figure 8:
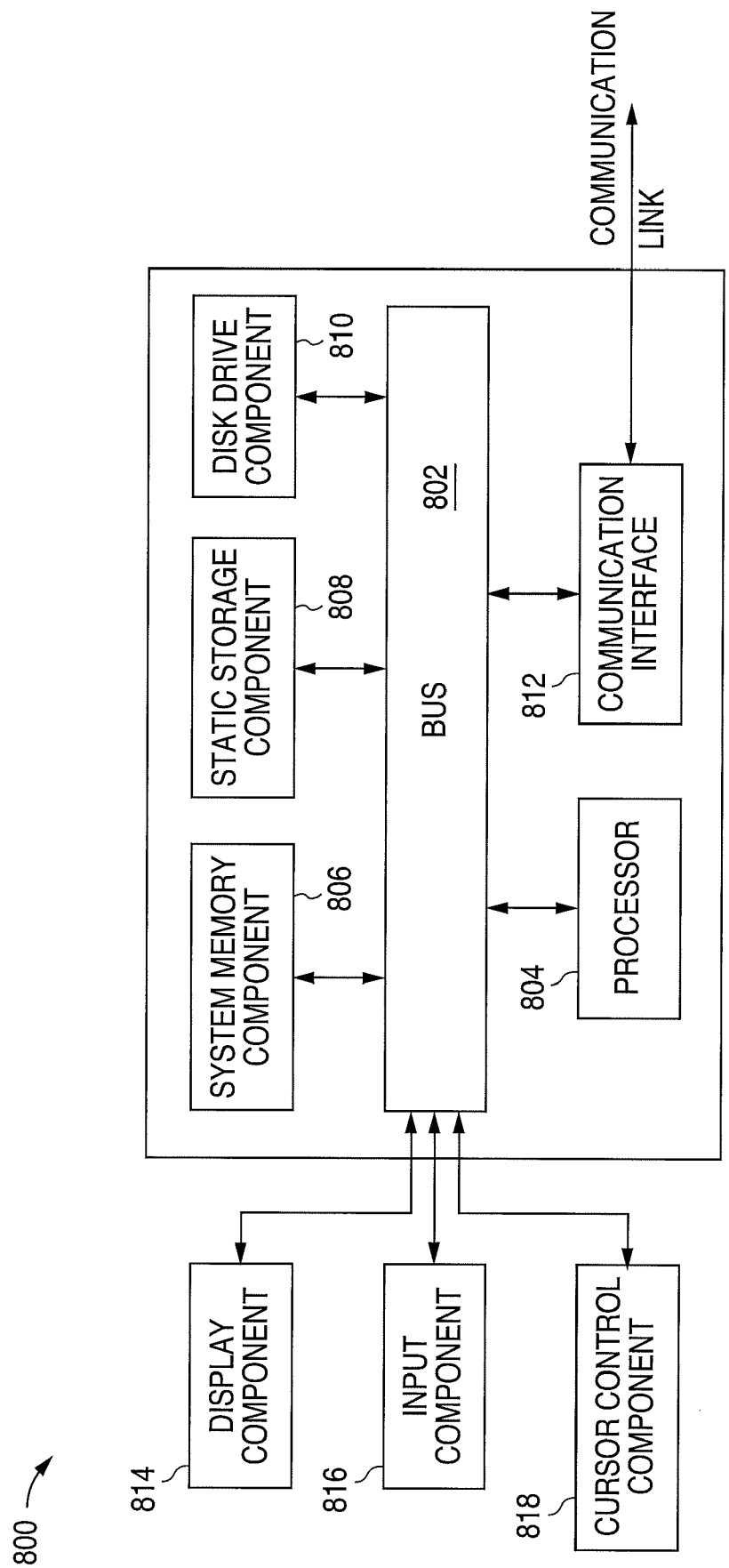
FIG. 8 is a block diagram illustrating a computer system suitable for implementing embodiments of the invention.

FIG. 8 is a block diagram illustrating a computer system 800 suitable for implementing embodiments of the invention including, for example, the client, one or more overlay nodes and one or more streaming servers. Computer system 800 includes a bus 802 or other communication mechanism for communicating information, which interconnects subsystems and components, such as processor 804, system memory component 806 (e.g., RAM), static storage component 808 (e.g., ROM), disk drive component 810 (e.g., magnetic or optical), communication interface 812 (e.g., modem or Ethernet card), display component 814 (e.g., LCD), input component 816 (e.g., keyboard), and cursor control component 818 (e.g., mouse).

In accordance with embodiments of the invention, computer system 800 performs specific operations by processor 804 executing one or more sequences of one or more instructions contained in system memory component 806. Such instructions may be read into system memory component 806 from another computer readable medium, such as static storage component 808 or disk drive component 810. In other embodiments, hard-wired circuitry may be used in place of or in combination with software instructions to implement the invention.

Logic may be encoded in a computer readable medium, which may refer to any medium that participates in providing instructions to processor 804 for execution. Such a medium may take many forms, including but not limited to, non-volatile media, volatile media, and transmission media. In various implementations, non-volatile media includes optical or magnetic disks, such as disk drive component 810, volatile media includes dynamic memory, such as system memory component 806, and transmission media includes coaxial cables, copper wire, and fiber optics, including wires that comprise bus 802. In one example, transmission media may take the form of acoustic or light waves, such as those generated during radio wave and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In various embodiments of the invention, execution of instruction sequences to practice the invention may be performed by computer system 800. In various other embodiments of the invention, a plurality of computer systems 800 coupled by communication link 820 (e.g., LAN, PTSN, or wireless network) may perform instruction sequences to practice the invention in coordination with one another.

Computer system 800 may transmit and receive messages, data, information and instructions, including one or more programs (i.e., application code) through communication link 820 and communication interface 812. Received program code may be executed by processor 804 as received and/or stored in disk drive component 810 or some other non-volatile storage component for execution.

Where applicable, various embodiments of the invention may be implemented using hardware, software, or various combinations of hardware and software. Where applicable, various hardware components and/or software components set forth herein may be combined into composite components comprising software, hardware, and/or both without departing from the scope and functionality of the present disclosure. Where applicable, various hardware components and/or software components set forth herein may be separated into subcomponents having software, hardware, and/or both without departing from the scope and functionality of the present disclosure. Where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, ordering of various steps described herein may be changed, combined into composite steps, and/or separated into sub-steps to provide features described herein.

In view of the present disclosure, it should be appreciated that the invention may be practiced with modification and alteration within the scope of the appended claims. The description presented herein is not intended to be exhaustive or to limit the invention to the precise form disclosed. It should be appreciated that the invention may be practiced with modification and alteration and that the invention may be limited only by the claims and the equivalents thereof.

APPENDIX A

| [File/Folder] | [Date] | [Size in Bytes] |
| --- | --- | --- |
| F:\patent | | |
| build-all.bat | 7/30/2007 12:38 | 1,660 |
| build-all.sh | 7/30/2007 12:38 | 396 |
| F:\patent\adserver | | |
| ad.php | 7/30/2007 12:38 | 1,206 |
| F:\patent\cms | | |
| build.sh | 7/30/2007 12:36 | 1,010 |
| Makefile | 7/30/2007 12:36 | 2,604 |
| F:\patent\cms\conf | | |

APPENDIX A-continued

| [File/Folder] | [Date] | [Size in Bytes] |
|---|---|---|
| database.inc.php | 7/30/2007 12:36 | 290 |
| httpd.conf | 7/30/2007 12:36 | 35,913 |
| php.ini | 7/30/2007 12:36 | 47,513 |
| F:\patent\cms\conf\MCASJ | | |
| F:\patent\cms\conf\MCASJ\etc | | |
| my.cnf | 7/30/2007 12:36 | 349 |
| php.ini | 7/30/2007 12:36 | 46,196 |
| F:\patent\cms\conf\MCASJ\etc\httpd | | |
| F:\patent\cms\conf\MCASJ\etc\httpd\conf | | |
| httpd.conf | 7/30/2007 12:36 | 34,589 |
| httpd.conf.pre_ssl | 7/30/2007 12:36 | 34,085 |
| httpd.conf.save-061407 | 7/30/2007 12:36 | 33,750 |
| magic | 7/30/2007 12:36 | 12,958 |
| F:\patent\cms\conf\MCASJ\etc\httpd\conf.d | | |
| php.conf | 7/30/2007 12:36 | 560 |
| proxy_ajp.conf | 7/30/2007 12:36 | 566 |
| README | 7/30/2007 12:36 | 392 |
| ssl.conf.org | 7/30/2007 12:36 | 9,677 |
| welcome.conf | 7/30/2007 12:36 | 299 |
| F:\patent\cms\db | | |
| db_schema.xml | 7/30/2007 12:36 | 88,950 |
| F:\patent\cms\html | | |
| ad.php | 7/30/2007 12:36 | 1,323 |
| index.php | 7/30/2007 12:36 | 5,447 |
| jittr.php | 7/30/2007 12:36 | 9,956 |
| robots.txt | 7/30/2007 12:36 | 25 |
| SkinOverPlaySeekFullscreen.swf | 7/30/2007 12:36 | 5,952 |
| World.xml | 7/30/2007 12:36 | 659 |
| F:\patent\cms\html\ad | | |
| ad.php | 7/30/2007 12:35 | 1,309 |
| me.php | 7/30/2007 12:35 | 721 |
| o.php | 7/30/2007 12:35 | 418 |
| F:\patent\cms\html\api | | |
| index.php | 7/30/2007 12:36 | 5,872 |
| licence | 7/30/2007 12:36 | 1,121 |
| main.php | 7/30/2007 12:36 | 86,385 |
| upload.pl | 7/30/2007 12:36 | 2,590 |
| F:\patent\cms\html\api\conf | | |
| conf.inc.php | 7/30/2007 12:36 | 726 |
| conf.uploader | 7/30/2007 12:36 | 44 |
| cpui_version.inc.php | 7/30/2007 12:36 | 111 |
| version.inc.php | 7/30/2007 12:36 | 111 |
| F:\patent\cms\html\api\inc | | |
| adLDAP.php | 7/30/2007 12:36 | 3,228 |
| createZip.inc.php | 7/30/2007 12:36 | 4,889 |
| JSON.php | 7/30/2007 12:36 | 34,669 |
| magic | 7/30/2007 12:36 | 421,964 |
| mimetypehandler.class.php | 7/30/2007 12:36 | 931 |
| mime_types.ini | 7/30/2007 12:36 | 4,464 |
| F:\patent\cms\html\api\mstore | | |
| api.php | 7/30/2007 12:36 | 14,050 |
| msheader.php | 7/30/2007 12:36 | 1,130 |
| mstore.ini | 7/30/2007 12:36 | 923 |
| README | 7/30/2007 12:36 | 459 |
| test.php | 7/30/2007 12:36 | 1,083 |
| util.inc.php | 7/30/2007 12:36 | 804 |
| F:\patent\cms\html\css | | |
| css.php | 7/30/2007 12:35 | 187 |
| ext-all.css | 7/30/2007 12:35 | 72,835 |
| jittr.css | 7/30/2007 12:35 | 4,532 |
| F:\patent\cms\html\ext | | |
| connection.js | 7/30/2007 12:36 | 10,524 |
| ext-all-debug.js | 7/30/2007 12:36 | 803,327 |
| ext-all.js | 7/30/2007 12:36 | 465,421 |
| ext-yui-adapter.js | 7/30/2007 12:36 | 10,913 |
| js.list | 7/30/2007 12:36 | 58 |
| states.js | 7/30/2007 12:36 | 1,801 |
| yahoo.js | 7/30/2007 12:36 | 2,808 |
| yui-utilities.js | 7/30/2007 12:36 | 47,327 |
| F:\patent\cms\html\images | | |
| block-bg.gif | 7/30/2007 12:36 | 834 |
| body-grad.png | 7/30/2007 12:36 | 640 |
| headerbar.png | 7/30/2007 12:36 | 242 |
| logo.png | 7/30/2007 12:36 | 10,243 |
| F:\patent\cms\html\images\aero | | |

APPENDIX A-continued

| [File/Folder] | [Date] | [Size in Bytes] |
|---|---|---|
| gradient-bg.gif | 7/30/2007 12:36 | 1,472 |
| s.gif | 7/30/2007 12:36 | 43 |
| F:\patent\cms\html\images\aero\basic-dialog | | |
| aero-close-over.gif | 7/30/2007 12:36 | 1,109 |
| aero-close.gif | 7/30/2007 12:36 | 882 |
| bg-center.gif | 7/30/2007 12:36 | 863 |
| bg-left.gif | 7/30/2007 12:36 | 1,201 |
| bg-right.gif | 7/30/2007 12:36 | 1,202 |
| close.gif | 7/30/2007 12:36 | 350 |
| collapse-over.gif | 7/30/2007 12:36 | 1,030 |
| collapse.gif | 7/30/2007 12:36 | 851 |
| e-handle.gif | 7/30/2007 12:36 | 995 |
| expand-over.gif | 7/30/2007 12:36 | 1,044 |
| expand.gif | 7/30/2007 12:36 | 875 |
| hd-sprite.gif | 7/30/2007 12:36 | 980 |
| s-handle.gif | 7/30/2007 12:36 | 992 |
| se-handle.gif | 7/30/2007 12:36 | 838 |
| w-handle.gif | 7/30/2007 12:36 | 817 |
| F:\patent\cms\html\images\aero\grid | | |
| grid-blue-split.gif | 7/30/2007 12:36 | 817 |
| grid-hrow.gif | 7/30/2007 12:36 | 838 |
| grid-split.gif | 7/30/2007 12:36 | 817 |
| grid-vista-hd.gif | 7/30/2007 12:36 | 829 |
| pspbrwse.jbf | 7/30/2007 12:36 | 6,112 |
| sort-col-bg.gif | 7/30/2007 12:36 | 855 |
| sort_asc.gif | 7/30/2007 12:36 | 830 |
| sort_desc.gif | 7/30/2007 12:36 | 833 |
| F:\patent\cms\html\images\aero\layout | | |
| collapse.gif | 7/30/2007 12:36 | 842 |
| expand.gif | 7/30/2007 12:36 | 842 |
| gradient-bg.gif | 7/30/2007 12:36 | 1,202 |
| ns-collapse.gif | 7/30/2007 12:36 | 842 |
| ns-expand.gif | 7/30/2007 12:36 | 843 |
| panel-close.gif | 7/30/2007 12:36 | 829 |
| panel-title-bg.gif | 7/30/2007 12:36 | 830 |
| panel-title-light-bg.gif | 7/30/2007 12:36 | 833 |
| tab-close-on.gif | 7/30/2007 12:36 | 880 |
| tab-close.gif | 7/30/2007 12:36 | 844 |
| F:\patent\cms\html\images\aero\qtip | | |
| bg.gif | 7/30/2007 12:36 | 1,024 |
| F:\patent\cms\html\images\aero\sizer | | |
| e-handle-dark.gif | 7/30/2007 12:36 | 1,062 |
| e-handle.gif | 7/30/2007 12:36 | 1,586 |
| ne-handle-dark.gif | 7/30/2007 12:36 | 839 |
| ne-handle.gif | 7/30/2007 12:36 | 854 |
| nw-handle-dark.gif | 7/30/2007 12:36 | 839 |
| nw-handle.gif | 7/30/2007 12:36 | 853 |
| s-handle-dark.gif | 7/30/2007 12:36 | 1,060 |
| s-handle.gif | 7/30/2007 12:36 | 1,318 |
| se-handle-dark.gif | 7/30/2007 12:36 | 838 |
| se-handle.gif | 7/30/2007 12:36 | 853 |
| sw-handle-dark.gif | 7/30/2007 12:36 | 839 |
| sw-handle.gif | 7/30/2007 12:36 | 855 |
| F:\patent\cms\html\images\aero\tabs | | |
| tab-btm-inactive-left-bg.gif | 7/30/2007 12:36 | 891 |
| tab-btm-inactive-right-bg.gif | 7/30/2007 12:36 | 1,618 |
| tab-btm-left-bg.gif | 7/30/2007 12:36 | 875 |
| tab-btm-right-bg.gif | 7/30/2007 12:36 | 1,604 |
| tab-sprite.gif | 7/30/2007 12:36 | 3,102 |
| tab-strip-bg.gif | 7/30/2007 12:36 | 826 |
| tab-strip-bg.png | 7/30/2007 12:36 | 259 |
| tab-strip-btm-bg.gif | 7/30/2007 12:36 | 826 |
| F:\patent\cms\html\images\aero\toolbar | | |
| bg.gif | 7/30/2007 12:36 | 904 |
| tb-btn-sprite.gif | 7/30/2007 12:36 | 1,127 |
| F:\patent\cms\html\images\default | | |
| gradient-bg.gif | 7/30/2007 12:36 | 1,472 |
| s.gif | 7/30/2007 12:36 | 43 |
| shadow-c.png | 7/30/2007 12:36 | 182 |
| shadow-lr.png | 7/30/2007 12:36 | 135 |
| shadow.png | 7/30/2007 12:36 | 311 |
| F:\patent\cms\html\images\default\basic-dialog | | |
| btn-arrow.gif | 7/30/2007 12:36 | 870 |
| btn-sprite.gif | 7/30/2007 12:36 | 1,341 |
| close.gif | 7/30/2007 12:36 | 893 |
| collapse.gif | 7/30/2007 12:36 | 865 |
| e-handle.gif | 7/30/2007 12:36 | 995 |

APPENDIX A-continued

| [File/Folder] | [Date] | [Size in Bytes] |
|---|---|---|
| expand.gif | 7/30/2007 12:36 | 884 |
| hd-sprite.gif | 7/30/2007 12:36 | 1,099 |
| progress.gif | 7/30/2007 12:36 | 19,442 |
| progress2.gif | 7/30/2007 12:36 | 14,113 |
| s-handle.gif | 7/30/2007 12:36 | 992 |
| se-handle.gif | 7/30/2007 12:36 | 833 |
| F:\patent\cms\html\images\default\box | | |
| corners-blue.gif | 7/30/2007 12:36 | 1,010 |
| corners.gif | 7/30/2007 12:36 | 1,005 |
| l-blue.gif | 7/30/2007 12:36 | 810 |
| l.gif | 7/30/2007 12:36 | 810 |
| r-blue.gif | 7/30/2007 12:36 | 810 |
| r.gif | 7/30/2007 12:36 | 810 |
| tb-blue.gif | 7/30/2007 12:36 | 851 |
| tb.gif | 7/30/2007 12:36 | 839 |
| F:\patent\cms\html\images\default\dd | | |
| drop-add.gif | 7/30/2007 12:36 | 1,001 |
| drop-no.gif | 7/30/2007 12:36 | 949 |
| drop-yes.gif | 7/30/2007 12:36 | 1,016 |
| F:\patent\cms\html\images\default\form | | |
| date-trigger.gif | 7/30/2007 12:36 | 1,041 |
| error-tip-corners.gif | 7/30/2007 12:36 | 4,183 |
| exclamation.gif | 7/30/2007 12:36 | 995 |
| text-bg.gif | 7/30/2007 12:36 | 819 |
| trigger.gif | 7/30/2007 12:36 | 1,297 |
| F:\patent\cms\html\images\default\grid | | |
| arrow-left-white.gif | 7/30/2007 12:36 | 825 |
| arrow-right-white.gif | 7/30/2007 12:36 | 825 |
| col-move-bottom.gif | 7/30/2007 12:36 | 868 |
| col-move-top.gif | 7/30/2007 12:36 | 869 |
| dirty.gif | 7/30/2007 12:36 | 832 |
| done.gif | 7/30/2007 12:36 | 133 |
| drop-no.gif | 7/30/2007 12:36 | 947 |
| drop-yes.gif | 7/30/2007 12:36 | 860 |
| footer-bg.gif | 7/30/2007 12:36 | 834 |
| grid-blue-hd.gif | 7/30/2007 12:36 | 829 |
| grid-blue-split.gif | 7/30/2007 12:36 | 817 |
| grid-hrow.gif | 7/30/2007 12:36 | 855 |
| grid-loading.gif | 7/30/2007 12:36 | 701 |
| grid-split.gif | 7/30/2007 12:36 | 817 |
| grid-vista-hd.gif | 7/30/2007 12:36 | 829 |
| hd-pop.gif | 7/30/2007 12:36 | 839 |
| hmenu-asc.gif | 7/30/2007 12:36 | 931 |
| hmenu-desc.gif | 7/30/2007 12:36 | 930 |
| hmenu-lock.gif | 7/30/2007 12:36 | 955 |
| hmenu-lock.png | 7/30/2007 12:36 | 648 |
| hmenu-unlock.gif | 7/30/2007 12:36 | 971 |
| hmenu-unlock.png | 7/30/2007 12:36 | 697 |
| invalid_line.gif | 7/30/2007 12:36 | 815 |
| loading.gif | 7/30/2007 12:36 | 771 |
| mso-hd.gif | 7/30/2007 12:36 | 875 |
| nowait.gif | 7/30/2007 12:36 | 884 |
| page-first-disabled.gif | 7/30/2007 12:36 | 925 |
| page-first.gif | 7/30/2007 12:36 | 925 |
| page-last-disabled.gif | 7/30/2007 12:36 | 923 |
| page-last.gif | 7/30/2007 12:36 | 923 |
| page-next-disabled.gif | 7/30/2007 12:36 | 875 |
| page-next.gif | 7/30/2007 12:36 | 875 |
| page-prev-disabled.gif | 7/30/2007 12:36 | 879 |
| page-prev.gif | 7/30/2007 12:36 | 879 |
| pick-button.gif | 7/30/2007 12:36 | 1,036 |
| refresh.gif | 7/30/2007 12:36 | 1,015 |
| sort_asc.gif | 7/30/2007 12:36 | 825 |
| sort_desc.gif | 7/30/2007 12:36 | 826 |
| Thumbs.db | 7/30/2007 12:36 | 33,792 |
| wait.gif | 7/30/2007 12:36 | 1,100 |
| F:\patent\cms\html\images\default\layout | | |
| collapse.gif | 7/30/2007 12:36 | 842 |
| expand.gif | 7/30/2007 12:36 | 842 |
| gradient-bg.gif | 7/30/2007 12:36 | 1,472 |
| ns-collapse.gif | 7/30/2007 12:36 | 842 |
| ns-expand.gif | 7/30/2007 12:36 | 843 |
| panel-close.gif | 7/30/2007 12:36 | 829 |
| panel-title-bg.gif | 7/30/2007 12:36 | 838 |
| panel-title-light-bg.gif | 7/30/2007 12:36 | 835 |
| stick.gif | 7/30/2007 12:36 | 874 |
| stuck.gif | 7/30/2007 12:36 | 92 |

APPENDIX A-continued

| [File/Folder] | [Date] | [Size in Bytes] |
|---|---|---|
| tab-close-on.gif | 7/30/2007 12:36 | 880 |
| tab-close.gif | 7/30/2007 12:36 | 859 |
| F:\patent\cms\html\images\default\menu | | |
| checked.gif | 7/30/2007 12:36 | 982 |
| group-checked.gif | 7/30/2007 12:36 | 891 |
| menu-parent.gif | 7/30/2007 12:36 | 854 |
| menu.gif | 7/30/2007 12:36 | 842 |
| unchecked.gif | 7/30/2007 12:36 | 917 |
| F:\patent\cms\html\images\default\qtip | | |
| bg.gif | 7/30/2007 12:36 | 1,091 |
| close.gif | 7/30/2007 12:36 | 972 |
| tip-sprite.gif | 7/30/2007 12:36 | 4,032 |
| F:\patent\cms\html\images\default\shared | | |
| calendar.gif | 7/30/2007 12:36 | 979 |
| left-btn.gif | 7/30/2007 12:36 | 870 |
| right-btn.gif | 7/30/2007 12:36 | 871 |
| warning.gif | 7/30/2007 12:36 | 960 |
| F:\patent\cms\html\images\default\sizer | | |
| e-handle-dark.gif | 7/30/2007 12:36 | 1,062 |
| e-handle.gif | 7/30/2007 12:36 | 1,586 |
| ne-handle-dark.gif | 7/30/2007 12:36 | 839 |
| ne-handle.gif | 7/30/2007 12:36 | 854 |
| nw-handle-dark.gif | 7/30/2007 12:36 | 839 |
| nw-handle.gif | 7/30/2007 12:36 | 853 |
| s-handle-dark.gif | 7/30/2007 12:36 | 1,060 |
| s-handle.gif | 7/30/2007 12:36 | 1,318 |
| se-handle-dark.gif | 7/30/2007 12:36 | 838 |
| se-handle.gif | 7/30/2007 12:36 | 853 |
| square.gif | 7/30/2007 12:36 | 864 |
| sw-handle-dark.gif | 7/30/2007 12:36 | 839 |
| sw-handle.gif | 7/30/2007 12:36 | 855 |
| F:\patent\cms\html\images\default\tabs | | |
| tab-btm-inactive-left-bg.gif | 7/30/2007 12:36 | 875 |
| tab-btm-inactive-right-bg.gif | 7/30/2007 12:36 | 1,601 |
| tab-btm-left-bg.gif | 7/30/2007 12:36 | 877 |
| tab-btm-right-bg.gif | 7/30/2007 12:36 | 1,606 |
| tab-sprite.gif | 7/30/2007 12:36 | 3,088 |
| F:\patent\cms\html\images\default\toolbar | | |
| btn-arrow-light.gif | 7/30/2007 12:36 | 916 |
| btn-arrow.gif | 7/30/2007 12:36 | 919 |
| btn-over-bg.gif | 7/30/2007 12:36 | 837 |
| gray-bg.gif | 7/30/2007 12:36 | 832 |
| tb-bg.gif | 7/30/2007 12:36 | 862 |
| tb-btn-sprite.gif | 7/30/2007 12:36 | 1,091 |
| F:\patent\cms\html\images\default\tree | | |
| drop-add.gif | 7/30/2007 12:36 | 1,001 |
| drop-between.gif | 7/30/2007 12:36 | 907 |
| drop-no.gif | 7/30/2007 12:36 | 949 |
| drop-over.gif | 7/30/2007 12:36 | 911 |
| drop-under.gif | 7/30/2007 12:36 | 911 |
| drop-yes.gif | 7/30/2007 12:36 | 1,016 |
| elbow-end-minus-nl.gif | 7/30/2007 12:36 | 898 |
| elbow-end-minus.gif | 7/30/2007 12:36 | 905 |
| elbow-end-plus-nl.gif | 7/30/2007 12:36 | 900 |
| elbow-end-plus.gif | 7/30/2007 12:36 | 907 |
| elbow-end.gif | 7/30/2007 12:36 | 844 |
| elbow-line.gif | 7/30/2007 12:36 | 846 |
| elbow-minus-nl.gif | 7/30/2007 12:36 | 898 |
| elbow-minus.gif | 7/30/2007 12:36 | 908 |
| elbow-plus-nl.gif | 7/30/2007 12:36 | 900 |
| elbow-plus.gif | 7/30/2007 12:36 | 910 |
| elbow.gif | 7/30/2007 12:36 | 850 |
| folder-open.gif | 7/30/2007 12:36 | 956 |
| folder.gif | 7/30/2007 12:36 | 952 |
| leaf.gif | 7/30/2007 12:36 | 945 |
| loading.gif | 7/30/2007 12:36 | 771 |
| s.gif | 7/30/2007 12:36 | 43 |
| upload.gif | 7/30/2007 12:36 | 474 |
| F:\patent\cms\html\images\gray | | |
| gradient-bg.gif | 7/30/2007 12:36 | 1,472 |
| s.gif | 7/30/2007 12:36 | 43 |
| F:\patent\cms\html\images\gray\basic-dialog | | |
| close.gif | 7/30/2007 12:36 | 893 |
| collapse.gif | 7/30/2007 12:36 | 900 |
| dlg-bg.gif | 7/30/2007 12:36 | 27,857 |
| e-handle.gif | 7/30/2007 12:36 | 995 |
| expand.gif | 7/30/2007 12:36 | 911 |

APPENDIX A-continued

| [File/Folder] | [Date] | [Size in Bytes] |
|---|---|---|
| hd-sprite.gif | 7/30/2007 12:36 | 1,060 |
| s-handle.gif | 7/30/2007 12:36 | 992 |
| se-handle.gif | 7/30/2007 12:36 | 833 |
| F:\patent\cms\html\images\gray\grid | | |
| grid-hrow.gif | 7/30/2007 12:36 | 825 |
| F:\patent\cms\html\images\gray\layout | | |
| collapse.gif | 7/30/2007 12:36 | 842 |
| expand.gif | 7/30/2007 12:36 | 842 |
| gradient-bg.gif | 7/30/2007 12:36 | 1,202 |
| ns-collapse.gif | 7/30/2007 12:36 | 842 |
| ns-expand.gif | 7/30/2007 12:36 | 843 |
| panel-close.gif | 7/30/2007 12:36 | 829 |
| panel-title-bg.gif | 7/30/2007 12:36 | 838 |
| panel-title-light-bg.gif | 7/30/2007 12:36 | 842 |
| stick.gif | 7/30/2007 12:36 | 874 |
| tab-close-on.gif | 7/30/2007 12:36 | 880 |
| tab-close.gif | 7/30/2007 12:36 | 859 |
| F:\patent\cms\html\images\gray\menu | | |
| checked.gif | 7/30/2007 12:36 | 982 |
| group-checked.gif | 7/30/2007 12:36 | 891 |
| menu-parent.gif | 7/30/2007 12:36 | 846 |
| menu.gif | 7/30/2007 12:36 | 842 |
| unchecked.gif | 7/30/2007 12:36 | 917 |
| F:\patent\cms\html\images\gray\qtip | | |
| bg.gif | 7/30/2007 12:36 | 1,024 |
| tip-sprite.gif | 7/30/2007 12:36 | 4,032 |
| F:\patent\cms\html\images\gray\sizer | | |
| e-handle-dark.gif | 7/30/2007 12:36 | 1,062 |
| e-handle.gif | 7/30/2007 12:36 | 1,586 |
| ne-handle-dark.gif | 7/30/2007 12:36 | 839 |
| ne-handle.gif | 7/30/2007 12:36 | 854 |
| nw-handle-dark.gif | 7/30/2007 12:36 | 839 |
| nw-handle.gif | 7/30/2007 12:36 | 853 |
| s-handle-dark.gif | 7/30/2007 12:36 | 1,060 |
| s-handle.gif | 7/30/2007 12:36 | 1,318 |
| se-handle-dark.gif | 7/30/2007 12:36 | 838 |
| se-handle.gif | 7/30/2007 12:36 | 853 |
| sw-handle-dark.gif | 7/30/2007 12:36 | 839 |
| sw-handle.gif | 7/30/2007 12:36 | 855 |
| F:\patent\cms\html\images\gray\tabs | | |
| tab-btm-inactive-left-bg.gif | 7/30/2007 12:36 | 875 |
| tab-btm-inactive-right-bg.gif | 7/30/2007 12:36 | 1,601 |
| tab-btm-left-bg.gif | 7/30/2007 12:36 | 875 |
| tab-btm-right-bg.gif | 7/30/2007 12:36 | 1,601 |
| tab-sprite.gif | 7/30/2007 12:36 | 3,037 |
| F:\patent\cms\html\images\gray\toolbar | | |
| gray-bg.gif | 7/30/2007 12:36 | 832 |
| tb-btn-sprite.gif | 7/30/2007 12:36 | 963 |
| F:\patent\cms\html\images\toolbar | | |
| clearTrigger.gif | 7/30/2007 12:36 | 720 |
| filemanager.gif | 7/30/2007 12:36 | 128 |
| flv.png | 7/30/2007 12:36 | 1,056 |
| jittr.ico | 7/30/2007 12:36 | 318 |
| jittrIcon.png | 7/30/2007 12:36 | 845 |
| magnifier.png | 7/30/2007 12:36 | 615 |
| save.gif | 7/30/2007 12:36 | 981 |
| wmv.gif | 7/30/2007 12:36 | 1,019 |
| F:\patent\cms\html\images\vista | | |
| gradient-bg.gif | 7/30/2007 12:36 | 1,472 |
| s.gif | 7/30/2007 12:36 | 43 |
| F:\patent\cms\html\images\vista\basic-dialog | | |
| bg-center.gif | 7/30/2007 12:36 | 865 |
| bg-left.gif | 7/30/2007 12:36 | 1,039 |
| bg-right.gif | 7/30/2007 12:36 | 1,039 |
| close.gif | 7/30/2007 12:36 | 350 |
| collapse.gif | 7/30/2007 12:36 | 333 |
| dlg-bg.gif | 7/30/2007 12:36 | 27,857 |
| e-handle.gif | 7/30/2007 12:36 | 995 |
| expand.gif | 7/30/2007 12:36 | 351 |
| hd-sprite.gif | 7/30/2007 12:36 | 462 |
| s-handle.gif | 7/30/2007 12:36 | 992 |
| se-handle.gif | 7/30/2007 12:36 | 833 |
| w-handle.gif | 7/30/2007 12:36 | 817 |
| F:\patent\cms\html\images\vista\grid | | |
| grid-split.gif | 7/30/2007 12:36 | 817 |
| grid-vista-hd.gif | 7/30/2007 12:36 | 829 |
| F:\patent\cms\html\images\vista\layout | | |

APPENDIX A-continued

| [File/Folder] | [Date] | [Size in Bytes] |
|---|---|---|
| collapse.gif | 7/30/2007 12:36 | 842 |
| expand.gif | 7/30/2007 12:36 | 842 |
| gradient-bg.gif | 7/30/2007 12:36 | 1,202 |
| ns-collapse.gif | 7/30/2007 12:36 | 842 |
| ns-expand.gif | 7/30/2007 12:36 | 843 |
| panel-close.gif | 7/30/2007 12:36 | 829 |
| panel-title-bg.gif | 7/30/2007 12:36 | 888 |
| panel-title-light-bg.gif | 7/30/2007 12:36 | 846 |
| stick.gif | 7/30/2007 12:36 | 872 |
| tab-close-on.gif | 7/30/2007 12:36 | 880 |
| tab-close.gif | 7/30/2007 12:36 | 844 |
| F:\patent\cms\html\images\vista\qtip | | |
| bg.gif | 7/30/2007 12:36 | 1,024 |
| tip-sprite.gif | 7/30/2007 12:36 | 4,183 |
| F:\patent\cms\html\images\vista\sizer | | |
| e-handle-dark.gif | 7/30/2007 12:36 | 1,062 |
| e-handle.gif | 7/30/2007 12:36 | 1,586 |
| ne-handle-dark.gif | 7/30/2007 12:36 | 839 |
| ne-handle.gif | 7/30/2007 12:36 | 854 |
| nw-handle-dark.gif | 7/30/2007 12:36 | 839 |
| nw-handle.gif | 7/30/2007 12:36 | 853 |
| s-handle-dark.gif | 7/30/2007 12:36 | 1,060 |
| s-handle.gif | 7/30/2007 12:36 | 1,318 |
| se-handle-dark.gif | 7/30/2007 12:36 | 838 |
| se-handle.gif | 7/30/2007 12:36 | 853 |
| sw-handle-dark.gif | 7/30/2007 12:36 | 839 |
| sw-handle.gif | 7/30/2007 12:36 | 855 |
| F:\patent\cms\html\images\vista\tabs | | |
| tab-btm-inactive-left-bg.gif | 7/30/2007 12:36 | 879 |
| tab-btm-inactive-right-bg.gif | 7/30/2007 12:36 | 1,609 |
| tab-btm-left-bg.gif | 7/30/2007 12:36 | 895 |
| tab-btm-right-bg.gif | 7/30/2007 12:36 | 1,608 |
| tab-sprite.gif | 7/30/2007 12:36 | 3,150 |
| F:\patent\cms\html\images\vista\toolbar | | |
| gray-bg.gif | 7/30/2007 12:36 | 839 |
| tb-btn-sprite.gif | 7/30/2007 12:36 | 1,110 |
| F:\patent\cms\html\install | | |
| ad.gif | 7/30/2007 12:36 | 1,021 |
| admin.gif | 7/30/2007 12:36 | 927 |
| config.png | 7/30/2007 12:36 | 6,387 |
| database.gif | 7/30/2007 12:36 | 733 |
| demo.gif | 7/30/2007 12:36 | 1,092 |
| index.php | 7/30/2007 12:36 | 20,840 |
| utilities.gif | 7/30/2007 12:36 | 629 |
| F:\patent\cms\html\js | | |
| clearableTriggerField.js | 7/30/2007 12:36 | 3,002 |
| custCreate.js | 7/30/2007 12:36 | 6,022 |
| custEdit.js | 7/30/2007 12:36 | 7,552 |
| custmenu.js | 7/30/2007 12:36 | 6,771 |
| FusionCharts.js | 7/30/2007 12:36 | 6,860 |
| FusionChartsWMode.js | 7/30/2007 12:36 | 7,104 |
| jittr.js | 7/30/2007 12:36 | 2,910 |
| jittrMain.js | 7/30/2007 12:36 | 8,609 |
| js.list | 7/30/2007 12:36 | 266 |
| mediaList.js | 7/30/2007 12:36 | 9,761 |
| mediaTree.js | 7/30/2007 12:36 | 9,167 |
| menu.js | 7/30/2007 12:36 | 9,466 |
| playback.swf | 7/30/2007 12:36 | 50,753 |
| PowerMap.js | 7/30/2007 12:36 | 6,748 |
| preview.js | 7/30/2007 12:36 | 9,923 |
| propList.js | 7/30/2007 12:36 | 13,043 |
| server.js | 7/30/2007 12:36 | 1,601 |
| statAreaView.js | 7/30/2007 12:36 | 2,895 |
| statDates.js | 7/30/2007 12:36 | 2,200 |
| statDatespop.js | 7/30/2007 12:36 | 1,822 |
| statSummaryView.js | 7/30/2007 12:36 | 3,650 |
| statVideoView.js | 7/30/2007 12:36 | 3,146 |
| strings.js | 7/30/2007 12:36 | 269 |
| upload.js | 7/30/2007 12:36 | 14,428 |
| userCreate.js | 7/30/2007 12:36 | 2,546 |
| userEdit.js | 7/30/2007 12:36 | 4,031 |
| F:\patent\cms\html\php | | |
| createCustDB.php | 7/30/2007 12:35 | 2,958 |
| dbActions.php | 7/30/2007 12:35 | 12,689 |
| JittrDbScript.php | 7/30/2007 12:35 | 2,821 |
| F:\patent\cms\html\stats | | |
| jittrMysql.php | 7/30/2007 12:36 | 1,679 |

APPENDIX A-continued

| [File/Folder] | [Date] | [Size in Bytes] |
|---|---|---|
| serverStats.php | 7/30/2007 12:36 | 9,431 |
| time.php | 7/30/2007 12:36 | 1,169 |
| totalBytesMonth.php | 7/30/2007 12:36 | 2,286 |
| trafficDay.php | 7/30/2007 12:36 | 2,832 |
| trafficMain.php | 7/30/2007 12:36 | 4,713 |
| videos.php | 7/30/2007 12:36 | 2,228 |
| videosb.php | 7/30/2007 12:36 | 3,458 |
| F:\patent\cms\html\stats\charts | | |
| Area2D.swf | 7/30/2007 12:36 | 58,844 |
| Bar2D.swf | 7/30/2007 12:36 | 57,793 |
| Bubble.swf | 7/30/2007 12:36 | 61,895 |
| Column2D.swf | 7/30/2007 12:36 | 58,616 |
| Column3D.swf | 7/30/2007 12:36 | 58,012 |
| Doughnut2D.swf | 7/30/2007 12:36 | 43,244 |
| Doughnut3D.swf | 7/30/2007 12:36 | 48,114 |
| FI2_Angular.swf | 7/30/2007 12:36 | 15,731 |
| Line.swf | 7/30/2007 12:36 | 58,176 |
| MSArea.swf | 7/30/2007 12:36 | 62,218 |
| MSBar2D.swf | 7/30/2007 12:36 | 61,217 |
| MSBar3D.swf | 7/30/2007 12:36 | 60,462 |
| MSColumn2D.swf | 7/30/2007 12:36 | 61,975 |
| MSColumn3D.swf | 7/30/2007 12:36 | 61,363 |
| MSColumn3DLineDY.swf | 7/30/2007 12:36 | 65,126 |
| MSColumnLine3D.swf | 7/30/2007 12:36 | 63,329 |
| MSCombi2D.swf | 7/30/2007 12:36 | 64,916 |
| MSCombiDY2D.swf | 7/30/2007 12:36 | 67,013 |
| MSLine.swf | 7/30/2007 12:36 | 61,677 |
| MSStackedColumn2D.swf | 7/30/2007 12:36 | 62,685 |
| MSStackedColumn2DLineDY.swf | 7/30/2007 12:36 | 66,919 |
| Pie2D.swf | 7/30/2007 12:36 | 42,813 |
| Pie3D.swf | 7/30/2007 12:36 | 47,354 |
| Scatter.swf | 7/30/2007 12:36 | 61,635 |
| ScrollArea2D.swf | 7/30/2007 12:36 | 66,680 |
| ScrollColumn2D.swf | 7/30/2007 12:36 | 66,251 |
| ScrollCombi2D.swf | 7/30/2007 12:36 | 69,770 |
| ScrollCombiDY2D.swf | 7/30/2007 12:36 | 71,759 |
| ScrollLine2D.swf | 7/30/2007 12:36 | 65,818 |
| ScrollStackedColumn2D.swf | 7/30/2007 12:36 | 66,697 |
| SSGrid.swf | 7/30/2007 12:36 | 33,475 |
| StackedArea2D.swf | 7/30/2007 12:36 | 62,641 |
| StackedBar2D.swf | 7/30/2007 12:36 | 61,535 |
| StackedBar3D.swf | 7/30/2007 12:36 | 61,008 |
| StackedColumn2D.swf | 7/30/2007 12:36 | 62,364 |
| StackedColumn3D.swf | 7/30/2007 12:36 | 61,895 |
| StackedColumn3DLineDY.swf | 7/30/2007 12:36 | 65,780 |
| F:\patent\cms\html\stats\maps | | |
| FCMap_Afghanistan.swf | 7/30/2007 12:36 | 77,287 |
| FCMap_Africa.swf | 7/30/2007 12:35 | 74,980 |
| FCMap_Alabama.swf | 7/30/2007 12:35 | 70,965 |
| FCMap_Alaska.swf | 7/30/2007 12:35 | 56,904 |
| FCMap_Albania.swf | 7/30/2007 12:36 | 48,719 |
| FCMap_Andorra.swf | 7/30/2007 12:35 | 53,205 |
| FCMap_Antigua.swf | 7/30/2007 12:35 | 63,108 |
| FCMap_Argentina.swf | 7/30/2007 12:35 | 64,366 |
| FCMap_Arizona.swf | 7/30/2007 12:36 | 45,970 |
| FCMap_Arkansas.swf | 7/30/2007 12:36 | 68,342 |
| FCMap_Armenia.swf | 7/30/2007 12:35 | 51,571 |
| FCMap_Asia.swf | 7/30/2007 12:35 | 82,054 |
| FCMap_AsiaGeorgia.swf | 7/30/2007 12:35 | 52,663 |
| FCMap_Australia.swf | 7/30/2007 12:35 | 41,853 |
| FCMap_Austria.swf | 7/30/2007 12:36 | 48,524 |
| FCMap_Azerbaijan.swf | 7/30/2007 12:35 | 81,646 |
| FCMap_Bahamas.swf | 7/30/2007 12:35 | 63,183 |
| FCMap_Bahrain.swf | 7/30/2007 12:35 | 46,709 |
| FCMap_Bangladesh.swf | 7/30/2007 12:35 | 63,537 |
| FCMap_Barbados.swf | 7/30/2007 12:36 | 48,404 |
| FCMap_Belarus.swf | 7/30/2007 12:36 | 44,244 |
| FCMap_Belgium.swf | 7/30/2007 12:35 | 45,349 |
| FCMap_Belize.swf | 7/30/2007 12:36 | 43,823 |
| FCMap_Bolivia.swf | 7/30/2007 12:36 | 50,063 |
| FCMap_BosniaHerzegovina.swf | 7/30/2007 12:36 | 52,316 |
| FCMap_Brazil.swf | 7/30/2007 12:36 | 61,532 |
| FCMap_BritishColumbia.swf | 7/30/2007 12:35 | 62,772 |
| FCMap_Bulgaria.swf | 7/30/2007 12:36 | 65,437 |
| FCMap_California.swf | 7/30/2007 12:35 | 67,657 |
| FCMap_Canada.swf | 7/30/2007 12:36 | 71,916 |
| FCMap_CentralAmerica.swf | 7/30/2007 12:35 | 54,070 |

APPENDIX A-continued

| [File/Folder] | [Date] | [Size in Bytes] |
|---|---|---|
| FCMap_CentralEuropeanRegion.swf | 7/30/2007 12:35 | 45,800 |
| FCMap_Chile.swf | 7/30/2007 12:35 | 50,864 |
| FCMap_China.swf | 7/30/2007 12:35 | 61,500 |
| FCMap_Colombia.swf | 7/30/2007 12:35 | 73,312 |
| FCMap_Colorado.swf | 7/30/2007 12:36 | 54,938 |
| FCMap_Connecticut.swf | 7/30/2007 12:35 | 47,713 |
| FCMap_CostaRica.swf | 7/30/2007 12:35 | 52,767 |
| FCMap_Croatia.swf | 7/30/2007 12:36 | 65,567 |
| FCMap_Cuba.swf | 7/30/2007 12:35 | 48,098 |
| FCMap_Cyprus.swf | 7/30/2007 12:35 | 58,667 |
| FCMap_CzechRepublic.swf | 7/30/2007 12:36 | 65,806 |
| FCMap_Delaware.swf | 7/30/2007 12:36 | 40,895 |
| FCMap_Denmark.swf | 7/30/2007 12:35 | 64,965 |
| FCMap_Dominica.swf | 7/30/2007 12:35 | 48,716 |
| FCMap_DominicanRepublic.swf | 7/30/2007 12:36 | 54,018 |
| FCMap_EastEuropeanRegion.swf | 7/30/2007 12:36 | 51,558 |
| FCMap_Ecuador.swf | 7/30/2007 12:36 | 67,990 |
| FCMap_Egypt.swf | 7/30/2007 12:35 | 61,545 |
| FCMap_ElSalvador.swf | 7/30/2007 12:35 | 49,327 |
| FCMap_England.swf | 7/30/2007 12:36 | 66,391 |
| FCMap_EnglandRegion.swf | 7/30/2007 12:36 | 52,617 |
| FCMap_Estonia.swf | 7/30/2007 12:35 | 64,310 |
| FCMap_Europe.swf | 7/30/2007 12:36 | 106,415 |
| FCMap_EuropeRegion.swf | 7/30/2007 12:35 | 82,674 |
| FCMap_Finland.swf | 7/30/2007 12:35 | 48,071 |
| FCMap_Florida.swf | 7/30/2007 12:35 | 58,905 |
| FCMap_France.swf | 7/30/2007 12:35 | 54,344 |
| FCMap_Georgia.swf | 7/30/2007 12:35 | 118,628 |
| FCMap_Germany.swf | 7/30/2007 12:36 | 52,223 |
| FCMap_Greece.swf | 7/30/2007 12:36 | 65,639 |
| FCMap_Greenland.swf | 7/30/2007 12:35 | 42,820 |
| FCMap_Grenada.swf | 7/30/2007 12:36 | 49,239 |
| FCMap_Guatemala.swf | 7/30/2007 12:35 | 68,467 |
| FCMap_Haiti.swf | 7/30/2007 12:35 | 53,791 |
| FCMap_Hawaii.swf | 7/30/2007 12:36 | 43,239 |
| FCMap_Honduras.swf | 7/30/2007 12:35 | 54,912 |
| FCMap_Hungary.swf | 7/30/2007 12:35 | 57,421 |
| FCMap_Iceland.swf | 7/30/2007 12:35 | 71,376 |
| FCMap_Idaho.swf | 7/30/2007 12:35 | 59,064 |
| FCMap_Illinois.swf | 7/30/2007 12:35 | 62,269 |
| FCMap_India.swf | 7/30/2007 12:36 | 64,461 |
| FCMap_Indiana.swf | 7/30/2007 12:36 | 56,392 |
| FCMap_Indonesia.swf | 7/30/2007 12:35 | 76,238 |
| FCMap_Iowa.swf | 7/30/2007 12:35 | 49,163 |
| FCMap_Iraq.swf | 7/30/2007 12:36 | 52,884 |
| FCMap_Ireland.swf | 7/30/2007 12:35 | 78,857 |
| FCMap_Israel.swf | 7/30/2007 12:35 | 43,107 |
| FCMap_Italy.swf | 7/30/2007 12:36 | 49,538 |
| FCMap_Jamaica.swf | 7/30/2007 12:35 | 46,252 |
| FCMap_Japan.swf | 7/30/2007 12:36 | 78,095 |
| FCMap_Kansas.swf | 7/30/2007 12:36 | 48,259 |
| FCMap_Kentucky.swf | 7/30/2007 12:35 | 89,053 |
| FCMap_Kenya.swf | 7/30/2007 12:35 | 47,743 |
| FCMap_Latvia.swf | 7/30/2007 12:35 | 76,988 |
| FCMap_Liechtenstein.swf | 7/30/2007 12:36 | 71,666 |
| FCMap_Lithuania.swf | 7/30/2007 12:35 | 65,682 |
| FCMap_Louisiana.swf | 7/30/2007 12:35 | 73,226 |
| FCMap_Luxembourg.swf | 7/30/2007 12:36 | 95,936 |
| FCMap_Maine.swf | 7/30/2007 12:35 | 57,078 |
| FCMap_Malaysia.swf | 7/30/2007 12:36 | 49,342 |
| FCMap_Maryland.swf | 7/30/2007 12:35 | 55,134 |
| FCMap_Massachusetts.swf | 7/30/2007 12:35 | 52,648 |
| FCMap_Mexico.swf | 7/30/2007 12:35 | 54,660 |
| FCMap_Michigan.swf | 7/30/2007 12:35 | 51,064 |
| FCMap_MiddleEast.swf | 7/30/2007 12:36 | 70,732 |
| FCMap_Minnesota.swf | 7/30/2007 12:35 | 50,004 |
| FCMap_Mississippi.swf | 7/30/2007 12:36 | 55,204 |
| FCMap_Missouri.swf | 7/30/2007 12:35 | 58,890 |
| FCMap_Moldova.swf | 7/30/2007 12:35 | 52,264 |
| FCMap_Montana.swf | 7/30/2007 12:35 | 63,577 |
| FCMap_Montenegro.swf | 7/30/2007 12:35 | 54,589 |
| FCMap_Mozambique.swf | 7/30/2007 12:36 | 46,973 |
| FCMap_Nebraska.swf | 7/30/2007 12:35 | 49,016 |
| FCMap_Netherland.swf | 7/30/2007 12:36 | 55,154 |
| FCMap_Nevada.swf | 7/30/2007 12:35 | 41,454 |
| FCMap_NewHampshire.swf | 7/30/2007 12:35 | 49,165 |
| FCMap_NewJersey.swf | 7/30/2007 12:36 | 53,188 |

APPENDIX A-continued

| [File/Folder] | [Date] | [Size in Bytes] |
|---|---|---|
| FCMap__NewMexico.swf | 7/30/2007 12:35 | 43,097 |
| FCMap__NewYork.swf | 7/30/2007 12:36 | 68,880 |
| FCMap__NewZealand.swf | 7/30/2007 12:35 | 56,315 |
| FCMap__Nicaragua.swf | 7/30/2007 12:35 | 53,137 |
| FCMap__NorthAmerica.swf | 7/30/2007 12:35 | 63,845 |
| FCMap__NorthCarolina.swf | 7/30/2007 12:36 | 80,312 |
| FCMap__NorthDakota.swf | 7/30/2007 12:35 | 47,112 |
| FCMap__NorthEuropeanRegion.swf | 7/30/2007 12:35 | 59,261 |
| FCMap__NorthIreland.swf | 7/30/2007 12:36 | 71,040 |
| FCMap__NorthKorea.swf | 7/30/2007 12:35 | 79,590 |
| FCMap__Norway.swf | 7/30/2007 12:36 | 62,743 |
| FCMap__NorwayRegion.swf | 7/30/2007 12:35 | 69,935 |
| FCMap__Oceania.swf | 7/30/2007 12:35 | 55,664 |
| FCMap__Ohio.swf | 7/30/2007 12:35 | 52,734 |
| FCMap__Oklahoma.swf | 7/30/2007 12:36 | 50,214 |
| FCMap__Ontario.swf | 7/30/2007 12:36 | 65,643 |
| FCMap__Oregon.swf | 7/30/2007 12:35 | 52,505 |
| FCMap__Paraguay.swf | 7/30/2007 12:35 | 55,133 |
| FCMap__Pennsylvania.swf | 7/30/2007 12:36 | 63,738 |
| FCMap__Peru.swf | 7/30/2007 12:36 | 66,971 |
| FCMap__Poland.swf | 7/30/2007 12:36 | 51,686 |
| FCMap__Portugal.swf | 7/30/2007 12:35 | 56,397 |
| FCMap__PuertoRico.swf | 7/30/2007 12:35 | 110,350 |
| FCMap__Quebec.swf | 7/30/2007 12:35 | 53,203 |
| FCMap__RhodeIsland.swf | 7/30/2007 12:35 | 45,247 |
| FCMap__Romania.swf | 7/30/2007 12:36 | 65,764 |
| FCMap__Russia.swf | 7/30/2007 12:36 | 81,566 |
| FCMap__SaintKittsandNevis.swf | 7/30/2007 12:35 | 49,851 |
| FCMap__SaintLucia.swf | 7/30/2007 12:36 | 60,138 |
| FCMap__SaintVincentandtheGrenadines.swf | 7/30/2007 12:35 | 48,513 |
| FCMap__SanMarino.swf | 7/30/2007 12:36 | 48,105 |
| FCMap__Scotland.swf | 7/30/2007 12:36 | 102,807 |
| FCMap__ScotlandRegion.swf | 7/30/2007 12:35 | 68,827 |
| FCMap__Slovakia.swf | 7/30/2007 12:35 | 51,967 |
| FCMap__Slovenia.swf | 7/30/2007 12:35 | 51,215 |
| FCMap__SouthAfrica.swf | 7/30/2007 12:36 | 61,719 |
| FCMap__SouthAmerica.swf | 7/30/2007 12:35 | 47,990 |
| FCMap__SouthCarolina.swf | 7/30/2007 12:35 | 72,395 |
| FCMap__SouthDakota.swf | 7/30/2007 12:35 | 51,145 |
| FCMap__SouthEuropeanRegion.swf | 7/30/2007 12:36 | 55,681 |
| FCMap__SouthKorea.swf | 7/30/2007 12:36 | 94,446 |
| FCMap__Spain.swf | 7/30/2007 12:36 | 77,581 |
| FCMap__SpainProvinces.swf | 7/30/2007 12:35 | 75,516 |
| FCMap__Suriname.swf | 7/30/2007 12:35 | 54,128 |
| FCMap__Sweden.swf | 7/30/2007 12:35 | 53,008 |
| FCMap__Switzerland.swf | 7/30/2007 12:35 | 62,433 |
| FCMap__Taiwan.swf | 7/30/2007 12:36 | 77,790 |
| FCMap__Tennessee.swf | 7/30/2007 12:36 | 71,523 |
| FCMap__Texas.swf | 7/30/2007 12:35 | 87,628 |
| FCMap__Turkey.swf | 7/30/2007 12:36 | 122,679 |
| FCMap__UAE.swf | 7/30/2007 12:36 | 55,660 |
| FCMap__UK.swf | 7/30/2007 12:35 | 54,521 |
| FCMap__Ukraine.swf | 7/30/2007 12:35 | 71,288 |
| FCMap__Uruguay.swf | 7/30/2007 12:35 | 62,203 |
| FCMap__USA.swf | 7/30/2007 12:35 | 69,665 |
| FCMap__USACentralRegion.swf | 7/30/2007 12:36 | 49,819 |
| FCMap__USANorthEastRegion.swf | 7/30/2007 12:35 | 49,548 |
| FCMap__USANorthWestRegion.swf | 7/30/2007 12:36 | 46,436 |
| FCMap__USARegion.swf | 7/30/2007 12:35 | 62,617 |
| FCMap__USASouthEastRegion.swf | 7/30/2007 12:35 | 47,016 |
| FCMap__USASouthWestRegion.swf | 7/30/2007 12:36 | 46,503 |
| FCMap__Utah.swf | 7/30/2007 12:35 | 49,497 |
| FCMap__Venezuela.swf | 7/30/2007 12:35 | 71,998 |
| FCMap__Vermont.swf | 7/30/2007 12:35 | 49,652 |
| FCMap__Virginia.swf | 7/30/2007 12:35 | 80,628 |
| FCMap__Wales.swf | 7/30/2007 12:35 | 45,142 |
| FCMap__Washington.swf | 7/30/2007 12:35 | 69,856 |
| FCMap__WestEuropeanRegion.swf | 7/30/2007 12:35 | 42,195 |
| FCMap__WestVirginia.swf | 7/30/2007 12:36 | 66,865 |
| FCMap__Wisconsin.swf | 7/30/2007 12:35 | 51,143 |
| FCMap__World.swf | 7/30/2007 12:36 | 62,131 |
| FCMap__World8.swf | 7/30/2007 12:36 | 69,161 |
| FCMap__Wyoming.swf | 7/30/2007 12:35 | 42,506 |
| PowerMapsGUI.html | 7/30/2007 12:35 | 28,003 |
| F:\patent\cms\html\stats\maps\Resources | | |
| ColorPicker.html | 7/30/2007 12:35 | 3,379 |
| MarkerForm.html | 7/30/2007 12:35 | 3,210 |

APPENDIX A-continued

| [File/Folder] | [Date] | [Size in Bytes] |
|---|---|---|
| PowerMap.js | 7/30/2007 12:35 | 6,945 |
| PowerMapGUI.js | 7/30/2007 12:35 | 45,503 |
| Style.css | 7/30/2007 12:35 | 1,503 |
| Tabber.css | 7/30/2007 12:35 | 2,545 |
| Tabber.js | 7/30/2007 12:35 | 16,039 |
| TableFunctions.js | 7/30/2007 12:35 | 1,593 |
| F:\patent\cms\html\yahoo | | |
| calendar.js | 7/30/2007 12:35 | 135,259 |
| dom.js | 7/30/2007 12:35 | 34,921 |
| event.js | 7/30/2007 12:35 | 71,155 |
| fonts.css | 7/30/2007 12:35 | 817 |
| reset.css | 7/30/2007 12:35 | 609 |
| F:\patent\cms\html\yahoo\assets | | |
| calendar.css | 7/30/2007 12:35 | 3,557 |
| callt.gif | 7/30/2007 12:35 | 93 |
| calrt.gif | 7/30/2007 12:35 | 94 |
| calx.gif | 7/30/2007 12:35 | 88 |
| F:\patent\cms\rpm | | |
| cpui.spec | 7/30/2007 12:36 | 2,272 |
| release.sh | 7/30/2007 12:36 | 3,786 |
| rpmmacros | 7/30/2007 12:36 | 135 |
| F:\patent\cms\rpm\scripts | | |
| postInstall.sh | 7/30/2007 12:36 | 1,505 |
| F:\patent\cms\schemas | | |
| CustomerSchema.sql | 7/30/2007 12:35 | 9,417 |
| MasterSchema.sql | 7/30/2007 12:35 | 2,298 |
| F:\patent\cms\tools | | |
| F:\patent\cms\tools\packer | | |
| class.JavaScriptPacker.php | 7/30/2007 12:35 | 23,485 |
| jspack.php | 7/30/2007 12:35 | 1,883 |
| F:\patent\docs | | |
| FAQ.txt | 7/30/2007 12:36 | 266 |
| whitelist.txt | 7/30/2007 12:36 | 139 |
| F:\patent\drv | | |
| build.sh | 7/30/2007 12:36 | 984 |
| release.sh | 7/30/2007 12:36 | 4,429 |
| run-tests.sh | 7/30/2007 12:36 | 812 |
| F:\patent\drv\myri10ge | | |
| README | 7/30/2007 12:36 | 48 |
| F:\patent\drv\myri10ge\firmware | | |
| ethp_z8e.dat | 7/30/2007 12:36 | 158,264 |
| ethp_z8e.h | 7/30/2007 12:36 | 325,252 |
| eth_z8e.dat | 7/30/2007 12:36 | 153,280 |
| eth_z8e.h | 7/30/2007 12:36 | 323,589 |
| mcp_gen_header.h | 7/30/2007 12:36 | 2,400 |
| myri10ge_mcp.h | 7/30/2007 12:36 | 7,478 |
| F:\patent\drv\myri10ge\linux | | |
| CHANGES | 7/30/2007 12:36 | 8,058 |
| check_headers.sh | 7/30/2007 12:36 | 2,654 |
| Makefile | 7/30/2007 12:36 | 1,177 |
| make_version | 7/30/2007 12:36 | 753 |
| Module.symvers | 7/30/2007 12:36 | 0 |
| myri10ge.c | 7/30/2007 12:36 | 119,097 |
| myri10ge_bugreport.sh | 7/30/2007 12:36 | 3,474 |
| myri10ge_hal.h | 7/30/2007 12:36 | 9,613 |
| README | 7/30/2007 12:36 | 13,128 |
| VERSION | 7/30/2007 12:36 | 100 |
| F:\patent\drv\release | | |
| F:\patent\drv\rpm | | |
| myri10ge.spec | 7/30/2007 12:36 | 1,623 |
| rpmmacros | 7/30/2007 12:36 | 135 |
| F:\patent\geoloc | | |
| me.php | 7/30/2007 12:37 | 688 |
| F:\patent\httpdz | | |
| build.sh | 7/30/2007 12:38 | 2,003 |
| copyright | 7/30/2007 12:38 | 270 |
| copyright.sh | 7/30/2007 12:38 | 262 |
| release.sh | 7/30/2007 12:38 | 3,637 |
| run-tests.sh | 7/30/2007 12:38 | 812 |
| F:\patent\httpdz\coronet-0.23 | | |
| aclocal.m4 | 7/30/2007 12:38 | 262,337 |
| AUTHORS | 7/30/2007 12:38 | 89 |
| ChangeLog | 7/30/2007 12:38 | 0 |
| config.guess | 7/30/2007 12:38 | 44,208 |
| config.h.in | 7/30/2007 12:38 | 2,941 |
| config.sub | 7/30/2007 12:38 | 32,448 |
| configure | 7/30/2007 12:38 | 701,950 |

APPENDIX A-continued

| [File/Folder] | [Date] | [Size in Bytes] |
|---|---|---|
| configure.in | 7/30/2007 12:38 | 682 |
| COPYING | 7/30/2007 12:38 | 26,430 |
| depcomp | 7/30/2007 12:38 | 15,936 |
| INSTALL | 7/30/2007 12:38 | 9,498 |
| install-sh | 7/30/2007 12:38 | 9,233 |
| ltmain.sh | 7/30/2007 12:38 | 196,719 |
| Makefile.am | 7/30/2007 12:38 | 25 |
| Makefile.in | 7/30/2007 12:38 | 19,293 |
| missing | 7/30/2007 12:38 | 11,014 |
| NEWS | 7/30/2007 12:38 | 0 |
| README | 7/30/2007 12:38 | 0 |
| stamp-h1 | 7/30/2007 12:38 | 23 |
| F:\patent\httpdz\coronet-0.23\autom4te.cache | | |
| output.0 | 7/30/2007 12:38 | 702,726 |
| requests | 7/30/2007 12:38 | 13,460 |
| traces.0 | 7/30/2007 12:38 | 41,883 |
| F:\patent\httpdz\coronet-0.23\man | | |
| coronet-lib.html | 7/30/2007 12:38 | 3,475 |
| coronet.3 | 7/30/2007 12:38 | 16,342 |
| coronet.html | 7/30/2007 12:38 | 22,432 |
| coronet.pdf | 7/30/2007 12:38 | 17,880 |
| coronet.txt | 7/30/2007 12:38 | 19,076 |
| Makefile.am | 7/30/2007 12:38 | 51 |
| Makefile.in | 7/30/2007 12:38 | 10,372 |
| mkpages.sh | 7/30/2007 12:38 | 227 |
| F:\patent\httpdz\coronet-0.23\src | | |
| coronet.c | 7/30/2007 12:38 | 16,081 |
| coronet.h | 7/30/2007 12:38 | 3,414 |
| coronet__lists.h | 7/30/2007 12:38 | 2,522 |
| Makefile.am | 7/30/2007 12:38 | 234 |
| Makefile.in | 7/30/2007 12:38 | 15,248 |
| F:\patent\httpdz\coronet-0.23\test | | |
| cnhttpd.c | 7/30/2007 12:38 | 7,624 |
| cnhttpload.c | 7/30/2007 12:38 | 10,576 |
| Makefile.am | 7/30/2007 12:38 | 453 |
| Makefile.in | 7/30/2007 12:38 | 13,910 |
| README | 7/30/2007 12:38 | 267 |
| F:\patent\httpdz\coronet-0.23\usr | | |
| F:\patent\httpdz\debug | | |
| F:\patent\httpdz\debug\usr | | |
| F:\patent\httpdz\debug\usr\local | | |
| F:\patent\httpdz\debug\usr\local\include | | |
| F:\patent\httpdz\debug\usr\local\lib | | |
| F:\patent\httpdz\debug\usr\local\man | | |
| F:\patent\httpdz\debug\usr\local\man\man3 | | |
| F:\patent\httpdz\debug\usr\local\sbin | | |
| F:\patent\httpdz\debug\usr\local\share | | |
| F:\patent\httpdz\debug\usr\local\share\man | | |
| F:\patent\httpdz\debug\usr\local\share\man\man3 | | |
| F:\patent\httpdz\libpcl-1.6 | | |
| aclocal.m4 | 7/30/2007 12:38 | 262,337 |
| AUTHORS | 7/30/2007 12:38 | 42 |
| ChangeLog | 7/30/2007 12:38 | 198 |
| config.guess | 7/30/2007 12:38 | 43,499 |
| config.h.in | 7/30/2007 12:38 | 2,813 |
| config.sub | 7/30/2007 12:38 | 31,743 |
| configure | 7/30/2007 12:38 | 710,411 |
| configure.in | 7/30/2007 12:38 | 726 |
| COPYING | 7/30/2007 12:38 | 17,992 |
| depcomp | 7/30/2007 12:38 | 15,936 |
| INSTALL | 7/30/2007 12:38 | 9,498 |
| install-sh | 7/30/2007 12:38 | 9,233 |
| ltmain.sh | 7/30/2007 12:38 | 187,039 |
| Makefile.am | 7/30/2007 12:38 | 35 |
| Makefile.in | 7/30/2007 12:38 | 19,338 |
| missing | 7/30/2007 12:38 | 11,014 |
| mkinstalldirs | 7/30/2007 12:38 | 3,474 |
| NEWS | 7/30/2007 12:38 | 0 |
| README | 7/30/2007 12:38 | 0 |
| stamp-h1 | 7/30/2007 12:38 | 23 |
| F:\patent\httpdz\libpcl-1.6\autom4te.cache | | |
| output.0 | 7/30/2007 12:38 | 711,188 |
| requests | 7/30/2007 12:38 | 24,934 |
| traces.0 | 7/30/2007 12:38 | 41,867 |
| F:\patent\httpdz\libpcl-1.6\include | | |
| Makefile.am | 7/30/2007 12:38 | 26 |
| Makefile.in | 7/30/2007 12:38 | 11,411 |

APPENDIX A-continued

| [File/Folder] | [Date] | [Size in Bytes] |
|---|---|---|
| pcl.h | 7/30/2007 12:38 | 1,280 |
| pcl_config.h | 7/30/2007 12:38 | 1,701 |
| F:\patent\httpdz\libpcl-1.6\man | | |
| libpcl.html | 7/30/2007 12:38 | 3,639 |
| Makefile.am | 7/30/2007 12:38 | 47 |
| Makefile.in | 7/30/2007 12:38 | 10,388 |
| mkpages.sh | 7/30/2007 12:38 | 192 |
| pcl.3 | 7/30/2007 12:38 | 7,304 |
| pcl.html | 7/30/2007 12:38 | 8,531 |
| pcl.ps | 7/30/2007 12:38 | 22,511 |
| pcl.txt | 7/30/2007 12:38 | 7,210 |
| F:\patent\httpdz\libpcl-1.6\pcl | | |
| Makefile.am | 7/30/2007 12:38 | 145 |
| Makefile.in | 7/30/2007 12:38 | 14,489 |
| pcl.c | 7/30/2007 12:38 | 12,079 |
| pcl_version.c | 7/30/2007 12:38 | 1,101 |
| F:\patent\httpdz\libpcl-1.6\test | | |
| cobench.c | 7/30/2007 12:38 | 2,428 |
| cothread.c | 7/30/2007 12:38 | 7,431 |
| Makefile.am | 7/30/2007 12:38 | 209 |
| Makefile.in | 7/30/2007 12:38 | 13,343 |
| F:\patent\httpdz\proto | | |
| aclocal.m4 | 7/30/2007 12:38 | 262,337 |
| AUTHORS | 7/30/2007 12:38 | 32 |
| autogen.sh | 7/30/2007 12:38 | 1,444 |
| ChangeLog | 7/30/2007 12:38 | 423 |
| config.guess | 7/30/2007 12:38 | 36 |
| config.h | 7/30/2007 12:38 | 1,581 |
| config.h.in | 7/30/2007 12:38 | 1,447 |
| config.sub | 7/30/2007 12:38 | 34 |
| configure.ac | 7/30/2007 12:38 | 232 |
| COPYING | 7/30/2007 12:38 | 17,992 |
| depcomp | 7/30/2007 12:38 | 12,123 |
| INSTALL | 7/30/2007 12:38 | 7,831 |
| install-sh | 7/30/2007 12:38 | 5,569 |
| libtool | 7/30/2007 12:38 | 227,400 |
| ltmain.sh | 7/30/2007 12:38 | 33 |
| Makefile.am | 7/30/2007 12:38 | 36 |
| missing | 7/30/2007 12:38 | 10,270 |
| mkinstalldirs | 7/30/2007 12:38 | 1,801 |
| NEWS | 7/30/2007 12:38 | 0 |
| README | 7/30/2007 12:38 | 342 |
| stamp-h1 | 7/30/2007 12:38 | 23 |
| F:\patent\httpdz\proto\autom4te.cache | | |
| output.0 | 7/30/2007 12:38 | 685,725 |
| output.1 | 7/30/2007 12:38 | 677,903 |
| requests | 7/30/2007 12:38 | 24,934 |
| traces.0 | 7/30/2007 12:38 | 412,821 |
| traces.1 | 7/30/2007 12:38 | 37,684 |
| F:\patent\httpdz\proto\src | | |
| dz_llist.h | 7/30/2007 12:38 | 2,401 |
| dz_log.c | 7/30/2007 12:38 | 917 |
| dz_log.h | 7/30/2007 12:38 | 143 |
| dz_server.c | 7/30/2007 12:38 | 25,159 |
| Makefile.am | 7/30/2007 12:38 | 273 |
| F:\patent\httpdz\proto\test | | |
| F:\patent\httpdz\release | | |
| httpdz.conf | 7/30/2007 12:38 | 883 |
| postinstall.sh | 7/30/2007 12:38 | 2,670 |
| README | 7/30/2007 12:38 | 2,635 |
| README.netperf | 7/30/2007 12:38 | 1,443 |
| README.terragrid | 7/30/2007 12:38 | 3,354 |
| setup_cluster.sh | 7/30/2007 12:38 | 2,145 |
| setup_network.sh | 7/30/2007 12:38 | 2,605 |
| F:\patent\httpdz\release\etc | | |
| sysctl.conf | 7/30/2007 12:38 | 1,777 |
| F:\patent\httpdz\release\etc\init.d | | |
| rc.httpdz | 7/30/2007 12:38 | 4,564 |
| F:\patent\httpdz\release\usr | | |
| F:\patent\httpdz\release\usr\local | | |
| F:\patent\httpdz\release\usr\local\include | | |
| F:\patent\httpdz\release\usr\local\lib | | |
| F:\patent\httpdz\release\usr\local\man | | |

APPENDIX A-continued

| [File/Folder] | [Date] | [Size in Bytes] |
|---|---|---|
| F:\patent\httpdz\release\usr\local\man\man3 | | |
| F:\patent\httpdz\release\usr\local\sbin | | |
| F:\patent\httpdz\release\usr\local\share | | |
| F:\patent\httpdz\release\usr\local\share\man | | |
| F:\patent\httpdz\release\usr\local\share\man\man3 | | |
| F:\patent\httpdz\rpm | | |
| httpdz.spec | 7/30/2007 12:38 | 3,926 |
| rpmmacros | 7/30/2007 12:38 | 135 |
| F:\patent\httpdz\srv | | |
| dz_log.c | 7/30/2007 12:38 | 1,238 |
| dz_log.h | 7/30/2007 12:38 | 409 |
| dz_mime.c | 7/30/2007 12:38 | 3,752 |
| dz_mime.h | 7/30/2007 12:38 | 420 |
| dz_server.c | 7/30/2007 12:38 | 45,352 |
| dz_server.h | 7/30/2007 12:38 | 4,429 |
| dz_shm.c | 7/30/2007 12:38 | 13,833 |
| dz_version.h | 7/30/2007 12:38 | 953 |
| Makefile | 7/30/2007 12:38 | 1,673 |
| README | 7/30/2007 12:38 | 5,833 |
| F:\patent\httpdz\tools | | |
| F:\patent\iacd | | |
| boost-build.jam | 7/30/2007 12:37 | 335 |
| build.bat | 7/30/2007 12:37 | 28 |
| build.sh | 7/30/2007 12:37 | 18 |
| build.xml | 7/30/2007 12:37 | 1,469 |
| fixlibs.sh | 7/30/2007 12:37 | 975 |
| iacd.sln | 7/30/2007 12:37 | 1,080 |
| iacd.vcproj | 7/30/2007 12:37 | 26,013 |
| Jamfile | 7/30/2007 12:37 | 7,616 |
| Jamrules | 7/30/2007 12:37 | 257 |
| jittrSmall.ico | 7/30/2007 12:37 | 318 |
| project-root.jam | 7/30/2007 12:37 | 475 |
| run-tests.bat | 7/30/2007 12:37 | 996 |
| run-tests.py | 7/30/2007 12:37 | 6,548 |
| run-tests.sh | 7/30/2007 12:37 | 625 |
| F:\patent\iacd\demo | | |
| ClearOverAll.swf | 7/30/2007 12:37 | 5,202 |
| ClearOverPlaySeekMute.swf | 7/30/2007 12:37 | 3,497 |
| flashdemo.rar | 7/30/2007 12:37 | 204,820 |
| flashtest3.swf | 7/30/2007 12:37 | 74,584 |
| getFile.php | 7/30/2007 12:37 | 1,407 |
| index-divx.html | 7/30/2007 12:37 | 3,759 |
| index-flash.html | 7/30/2007 12:37 | 2,188 |
| F:\patent\iacd\extra | | |
| Jamfile | 7/30/2007 12:37 | 2,663 |
| F:\patent\iacd\extra\boost_date_time | | |
| F:\patent\iacd\extra\boost_date_time\gregorian | | |
| date_generators.cpp | 7/30/2007 12:37 | 892 |
| gregorian_types.cpp | 7/30/2007 12:37 | 2,092 |
| greg_month.cpp | 7/30/2007 12:37 | 6,095 |
| greg_names.hpp | 7/30/2007 12:37 | 2,378 |
| greg_weekday.cpp | 7/30/2007 12:37 | 1,353 |
| F:\patent\iacd\extra\boost_date_time\posix_time | | |
| posix_time_types.cpp | 7/30/2007 12:37 | 923 |
| F:\patent\iacd\extra\boost_filesystem | | |
| exception.cpp | 7/30/2007 12:37 | 5,236 |
| operations.cpp | 7/30/2007 12:37 | 47,533 |
| path.cpp | 7/30/2007 12:37 | 4,245 |
| portability.cpp | 7/30/2007 12:37 | 3,550 |
| utf8_codecvt_facet1.cpp | 7/30/2007 12:37 | 598 |
| utf8_codecvt_facet_impl.cpp | 7/30/2007 12:37 | 9,154 |
| F:\patent\iacd\extra\boost_program_options | | |
| cmdline.cpp | 7/30/2007 12:37 | 17,044 |
| config_file.cpp | 7/30/2007 12:37 | 5,859 |
| convert.cpp | 7/30/2007 12:37 | 5,430 |
| options_description.cpp | 7/30/2007 12:37 | 19,191 |
| parsers.cpp | 7/30/2007 12:37 | 6,523 |
| positional_options.cpp | 7/30/2007 12:37 | 1,385 |
| utf8_codecvt_facet.cpp | 7/30/2007 12:37 | 600 |
| utf8_codecvt_facet_impl.cpp | 7/30/2007 12:37 | 9,154 |
| value_semantic.cpp | 7/30/2007 12:37 | 7,780 |
| variables_map.cpp | 7/30/2007 12:37 | 6,186 |
| winmain.cpp | 7/30/2007 12:37 | 3,793 |
| F:\patent\iacd\extra\boost_regex | | |
| cpp_regex_traits.cpp | 7/30/2007 12:37 | 3,209 |
| cregex.cpp | 7/30/2007 12:37 | 16,417 |
| c_regex_traits.cpp | 7/30/2007 12:37 | 6,576 |

APPENDIX A-continued

| [File/Folder] | [Date] | [Size in Bytes] |
|---|---|---|
| fileiter.cpp | 7/30/2007 12:37 | 19,887 |
| icu.cpp | 7/30/2007 12:37 | 20,867 |
| instances.cpp | 7/30/2007 12:37 | 729 |
| posix_api.cpp | 7/30/2007 12:37 | 6,949 |
| regex.cpp | 7/30/2007 12:37 | 5,684 |
| regex_debug.cpp | 7/30/2007 12:37 | 1,579 |
| regex_raw_buffer.cpp | 7/30/2007 12:37 | 1,802 |
| regex_traits_defaults.cpp | 7/30/2007 12:37 | 29,191 |
| static_mutex.cpp | 7/30/2007 12:37 | 3,830 |
| usinstances.cpp | 7/30/2007 12:37 | 2,305 |
| w32_regex_traits.cpp | 7/30/2007 12:37 | 14,749 |
| wc_regex_traits.cpp | 7/30/2007 12:37 | 8,852 |
| wide_posix_api.cpp | 7/30/2007 12:37 | 7,290 |
| winstances.cpp | 7/30/2007 12:37 | 761 |
| F:\patent\iacd\extra\boost_signals | | |
| connection.cpp | 7/30/2007 12:37 | 4,156 |
| named_slot_map.cpp | 7/30/2007 12:37 | 3,493 |
| signal_base.cpp | 7/30/2007 12:37 | 6,876 |
| slot.cpp | 7/30/2007 12:37 | 2,840 |
| trackable.cpp | 7/30/2007 12:37 | 1,840 |
| F:\patent\iacd\extra\boost_thread | | |
| barrier.cpp | 7/30/2007 12:37 | 1,000 |
| condition.cpp | 7/30/2007 12:37 | 18,771 |
| exceptions.cpp | 7/30/2007 12:37 | 2,348 |
| mutex.cpp | 7/30/2007 12:37 | 10,734 |
| mutex.inl | 7/30/2007 12:37 | 3,412 |
| once.cpp | 7/30/2007 12:37 | 5,860 |
| recursive_mutex.cpp | 7/30/2007 12:37 | 22,562 |
| thread.cpp | 7/30/2007 12:37 | 10,362 |
| timeconv.inl | 7/30/2007 12:37 | 3,486 |
| tss.cpp | 7/30/2007 12:37 | 6,596 |
| tss_dll.cpp | 7/30/2007 12:37 | 2,367 |
| tss_hooks.cpp | 7/30/2007 12:37 | 6,511 |
| tss_null.cpp | 7/30/2007 12:37 | 1,444 |
| tss_pe.cpp | 7/30/2007 12:37 | 6,011 |
| xtime.cpp | 7/30/2007 12:37 | 4,834 |
| F:\patent\iacd\extra\boost_thread\mac | | |
| debug_prefix.hpp | 7/30/2007 12:37 | 315 |
| delivery_man.cpp | 7/30/2007 12:37 | 1,388 |
| delivery_man.hpp | 7/30/2007 12:37 | 1,741 |
| dt_scheduler.cpp | 7/30/2007 12:37 | 1,753 |
| dt_scheduler.hpp | 7/30/2007 12:37 | 1,238 |
| execution_context.cpp | 7/30/2007 12:37 | 1,382 |
| execution_context.hpp | 7/30/2007 12:37 | 1,402 |
| init.cpp | 7/30/2007 12:37 | 1,035 |
| init.hpp | 7/30/2007 12:37 | 633 |
| os.cpp | 7/30/2007 12:37 | 1,024 |
| os.hpp | 7/30/2007 12:37 | 705 |
| ot_context.cpp | 7/30/2007 12:37 | 828 |
| ot_context.hpp | 7/30/2007 12:37 | 1,241 |
| package.hpp | 7/30/2007 12:37 | 1,591 |
| periodical.hpp | 7/30/2007 12:37 | 1,851 |
| prefix.hpp | 7/30/2007 12:37 | 331 |
| remote_calls.hpp | 7/30/2007 12:37 | 6,891 |
| remote_call_manager.cpp | 7/30/2007 12:37 | 1,020 |
| remote_call_manager.hpp | 7/30/2007 12:37 | 2,286 |
| safe.cpp | 7/30/2007 12:37 | 6,456 |
| safe.hpp | 7/30/2007 12:37 | 1,170 |
| scoped_critical_region.cpp | 7/30/2007 12:37 | 1,033 |
| scoped_critical_region.hpp | 7/30/2007 12:37 | 1,657 |
| st_scheduler.cpp | 7/30/2007 12:37 | 1,891 |
| st_scheduler.hpp | 7/30/2007 12:37 | 1,491 |
| thread_cleanup.cpp | 7/30/2007 12:37 | 1,062 |
| thread_cleanup.hpp | 7/30/2007 12:37 | 704 |
| F:\patent\iacd\extra\boost_thread\mac\msl_replacements | | |
| assert.cpp | 7/30/2007 12:37 | 991 |
| console_io.cpp | 7/30/2007 12:37 | 3,183 |
| malloc.cpp | 7/30/2007 12:37 | 967 |
| news_and_deletes.cpp | 7/30/2007 12:37 | 1,882 |
| time.cpp | 7/30/2007 12:37 | 3,847 |
| F:\patent\iacd\extra\cryptopp | | |
| aes.h | 7/30/2007 12:37 | 294 |
| algebra.cpp | 7/30/2007 12:37 | 9,413 |
| algebra.h | 7/30/2007 12:37 | 9,207 |
| algparam.cpp | 7/30/2007 12:37 | 1,191 |
| algparam.h | 7/30/2007 12:37 | 12,073 |
| argnames.h | 7/30/2007 12:37 | 4,014 |

APPENDIX A-continued

| [File/Folder] | [Date] | [Size in Bytes] |
|---|---|---|
| asn.cpp | 7/30/2007 12:37 | 13,805 |
| asn.h | 7/30/2007 12:37 | 12,319 |
| basecode.cpp | 7/30/2007 12:37 | 5,865 |
| basecode.h | 7/30/2007 12:37 | 2,649 |
| config.h | 7/30/2007 12:37 | 15,449 |
| cpu.cpp | 7/30/2007 12:37 | 3,559 |
| cpu.h | 7/30/2007 12:37 | 3,234 |
| cryptlib.cpp | 7/30/2007 12:37 | 21,500 |
| cryptlib.h | 7/30/2007 12:37 | 72,861 |
| dll.cpp | 7/30/2007 12:37 | 4,430 |
| dll.h | 7/30/2007 12:37 | 1,682 |
| dsa.cpp | 7/30/2007 12:37 | 2,560 |
| dsa.h | 7/30/2007 12:37 | 1,246 |
| emsa2.cpp | 7/30/2007 12:37 | 1,238 |
| emsa2.h | 7/30/2007 12:37 | 2,074 |
| eprecomp.cpp | 7/30/2007 12:37 | 4,088 |
| eprecomp.h | 7/30/2007 12:37 | 3,136 |
| files.cpp | 7/30/2007 12:37 | 4,873 |
| files.h | 7/30/2007 12:37 | 3,539 |
| filters.cpp | 7/30/2007 12:37 | 29,784 |
| filters.h | 7/30/2007 12:37 | 31,769 |
| fips140.cpp | 7/30/2007 12:37 | 2,385 |
| fips140.h | 7/30/2007 12:37 | 2,425 |
| fltrimpl.h | 7/30/2007 12:37 | 1,838 |
| gf256.cpp | 7/30/2007 12:37 | 626 |
| gf256.h | 7/30/2007 12:37 | 1,273 |
| gfpcrypt.cpp | 7/30/2007 12:37 | 8,676 |
| gfpcrypt.h | 7/30/2007 12:37 | 20,344 |
| hex.cpp | 7/30/2007 12:37 | 1,184 |
| hex.h | 7/30/2007 12:37 | 1,151 |
| hmac.cpp | 7/30/2007 12:37 | 1,881 |
| hmac.h | 7/30/2007 12:37 | 1,891 |
| hrtimer.cpp | 7/30/2007 12:37 | 3,524 |
| hrtimer.h | 7/30/2007 12:37 | 1,810 |
| integer.cpp | 7/30/2007 12:37 | 110,355 |
| integer.h | 7/30/2007 12:37 | 13,857 |
| iterhash.cpp | 7/30/2007 12:37 | 4,264 |
| iterhash.h | 7/30/2007 12:37 | 3,961 |
| misc.cpp | 7/30/2007 12:37 | 2,016 |
| misc.h | 7/30/2007 12:37 | 28,698 |
| modarith.h | 7/30/2007 12:37 | 5,487 |
| modexppc.h | 7/30/2007 12:37 | 1,087 |
| mqueue.cpp | 7/30/2007 12:37 | 4,323 |
| mqueue.h | 7/30/2007 12:37 | 3,443 |
| nbtheory.cpp | 7/30/2007 12:37 | 25,321 |
| nbtheory.h | 7/30/2007 12:37 | 6,882 |
| oaep.cpp | 7/30/2007 12:37 | 3,139 |
| oaep.h | 7/30/2007 12:37 | 1,523 |
| oids.h | 7/30/2007 12:37 | 4,972 |
| osrng.cpp | 7/30/2007 12:37 | 3,635 |
| osrng.h | 7/30/2007 12:37 | 4,516 |
| pch.h | 7/30/2007 12:37 | 209 |
| pkcspad.cpp | 7/30/2007 12:37 | 4,440 |
| pkcspad.h | 7/30/2007 12:37 | 2,980 |
| pssr.cpp | 7/30/2007 12:37 | 5,673 |
| pssr.h | 7/30/2007 12:37 | 2,624 |
| pubkey.cpp | 7/30/2007 12:37 | 7,718 |
| pubkey.h | 7/30/2007 12:37 | 66,347 |
| queue.cpp | 7/30/2007 12:37 | 12,444 |
| queue.h | 7/30/2007 12:37 | 3,995 |
| randpool.cpp | 7/30/2007 12:37 | 1,452 |
| randpool.h | 7/30/2007 12:37 | 1,031 |
| rdtables.cpp | 7/30/2007 12:37 | 33,961 |
| rijndael.cpp | 7/30/2007 12:37 | 18,651 |
| rijndael.h | 7/30/2007 12:37 | 1,664 |
| rng.cpp | 7/30/2007 12:37 | 3,940 |
| rng.h | 7/30/2007 12:37 | 2,217 |
| rsa.cpp | 7/30/2007 12:37 | 9,181 |
| rsa.h | 7/30/2007 12:37 | 6,123 |
| secblock.h | 7/30/2007 12:37 | 13,505 |
| seckey.h | 7/30/2007 12:37 | 7,240 |
| sha.cpp | 7/30/2007 12:37 | 16,879 |
| sha.h | 7/30/2007 12:37 | 2,166 |
| simple.cpp | 7/30/2007 12:37 | 218 |
| simple.h | 7/30/2007 12:37 | 7,330 |
| smartptr.h | 7/30/2007 12:37 | 5,114 |
| square.cpp | 7/30/2007 12:37 | 5,324 |

APPENDIX A-continued

| [File/Folder] | [Date] | [Size in Bytes] |
|---|---|---|
| square.h | 7/30/2007 12:37 | 1,435 |
| squaretb.cpp | 7/30/2007 12:37 | 32,649 |
| stdcpp.h | 7/30/2007 12:37 | 507 |
| trdlocal.cpp | 7/30/2007 12:37 | 1,657 |
| trdlocal.h | 7/30/2007 12:37 | 782 |
| words.h | 7/30/2007 12:37 | 2,018 |
| F:\patent\iacd\extra\test | | |
| compiler_log_formatter.cpp | 7/30/2007 12:37 | 1,045 |
| cpp_main.cpp | 7/30/2007 12:37 | 1,027 |
| exception_safety.cpp | 7/30/2007 12:37 | 893 |
| execution_monitor.cpp | 7/30/2007 12:37 | 1,054 |
| framework.cpp | 7/30/2007 12:37 | 1,012 |
| interaction_based.cpp | 7/30/2007 12:37 | 896 |
| Jamfile | 7/30/2007 12:37 | 1,541 |
| logged_expectations.cpp | 7/30/2007 12:37 | 902 |
| plain_report_formatter.cpp | 7/30/2007 12:37 | 1,051 |
| progress_monitor.cpp | 7/30/2007 12:37 | 1,204 |
| results_collector.cpp | 7/30/2007 12:37 | 1,036 |
| results_reporter.cpp | 7/30/2007 12:37 | 1,033 |
| test_main.cpp | 7/30/2007 12:37 | 1,030 |
| test_tools.cpp | 7/30/2007 12:37 | 1,033 |
| unit_test_log.cpp | 7/30/2007 12:37 | 1,042 |
| unit_test_main.cpp | 7/30/2007 12:37 | 1,045 |
| unit_test_monitor.cpp | 7/30/2007 12:37 | 1,054 |
| unit_test_parameters.cpp | 7/30/2007 12:37 | 1,063 |
| unit_test_suite.cpp | 7/30/2007 12:37 | 1,048 |
| xml_log_formatter.cpp | 7/30/2007 12:37 | 1,030 |
| xml_report_formatter.cpp | 7/30/2007 12:37 | 1,045 |
| F:\patent\iacd\extra\zlib | | |
| adler32.c | 7/30/2007 12:37 | 4,559 |
| compress.c | 7/30/2007 12:37 | 2,489 |
| crc32.c | 7/30/2007 12:37 | 13,193 |
| crc32.h | 7/30/2007 12:37 | 30,568 |
| deflate.c | 7/30/2007 12:37 | 64,163 |
| deflate.h | 7/30/2007 12:37 | 12,114 |
| gzio.c | 7/30/2007 12:37 | 31,103 |
| infback.c | 7/30/2007 12:37 | 22,164 |
| inffast.c | 7/30/2007 12:37 | 12,568 |
| inffast.h | 7/30/2007 12:37 | 407 |
| inffixed.h | 7/30/2007 12:37 | 6,343 |
| inflate.c | 7/30/2007 12:37 | 48,977 |
| inflate.h | 7/30/2007 12:37 | 5,916 |
| inftrees.c | 7/30/2007 12:37 | 13,756 |
| inftrees.h | 7/30/2007 12:37 | 2,373 |
| Jamfile | 7/30/2007 12:37 | 344 |
| trees.c | 7/30/2007 12:37 | 44,027 |
| trees.h | 7/30/2007 12:37 | 8,444 |
| uncompr.c | 7/30/2007 12:37 | 2,087 |
| zconf.h | 7/30/2007 12:37 | 9,544 |
| zconf.in.h | 7/30/2007 12:37 | 9,544 |
| zlib.h | 7/30/2007 12:37 | 66,188 |
| zutil.c | 7/30/2007 12:37 | 7,136 |
| zutil.h | 7/30/2007 12:37 | 6,859 |
| F:\patent\iacd\hnbase | | |
| bind_placeholders.h | 7/30/2007 12:37 | 2,437 |
| config.cpp | 7/30/2007 12:37 | 4,360 |
| config.h | 7/30/2007 12:37 | 8,803 |
| endian.h | 7/30/2007 12:37 | 3,635 |
| event.h | 7/30/2007 12:37 | 20,290 |
| eventbase.cpp | 7/30/2007 12:37 | 2,564 |
| eventbase.h | 7/30/2007 12:37 | 5,543 |
| fwd.h | 7/30/2007 12:37 | 3,391 |
| gettickcount.h | 7/30/2007 12:37 | 3,147 |
| hash.cpp | 7/30/2007 12:37 | 7,629 |
| hash.h | 7/30/2007 12:37 | 17,314 |
| hostinfo.cpp | 7/30/2007 12:37 | 2,276 |
| hostinfo.h | 7/30/2007 12:37 | 3,658 |
| ipv4addr.cpp | 7/30/2007 12:37 | 2,102 |
| ipv4addr.h | 7/30/2007 12:37 | 3,282 |
| Jamfile | 7/30/2007 12:37 | 911 |
| lambda_placeholders.h | 7/30/2007 12:37 | 1,467 |
| log.cpp | 7/30/2007 12:37 | 9,804 |
| log.h | 7/30/2007 12:37 | 16,765 |
| md4transform.cpp | 7/30/2007 12:37 | 6,593 |
| md4transform.h | 7/30/2007 12:37 | 2,745 |
| md5transform.cpp | 7/30/2007 12:37 | 9,317 |
| md5transform.h | 7/30/2007 12:37 | 1,559 |

APPENDIX A-continued

| [File/Folder] | [Date] | [Size in Bytes] |
|---|---|---|
| object.cpp | 7/30/2007 12:37 | 7,374 |
| object.h | 7/30/2007 12:37 | 18,263 |
| osdep.h | 7/30/2007 12:37 | 9,270 |
| pch.h | 7/30/2007 12:37 | 1,439 |
| prefs.cpp | 7/30/2007 12:37 | 1,110 |
| prefs.h | 7/30/2007 12:37 | 1,345 |
| range.h | 7/30/2007 12:37 | 7,580 |
| rangelist.h | 7/30/2007 12:37 | 13,381 |
| schedbase.cpp | 7/30/2007 12:37 | 15,592 |
| schedbase.h | 7/30/2007 12:37 | 10,105 |
| scheduler.h | 7/30/2007 12:37 | 32,671 |
| sha1transform.cpp | 7/30/2007 12:37 | 7,437 |
| sha1transform.h | 7/30/2007 12:37 | 1,726 |
| signals.cpp | 7/30/2007 12:37 | 3,411 |
| sockets.cpp | 7/30/2007 12:37 | 32,966 |
| sockets.h | 7/30/2007 12:37 | 19,335 |
| speedmeter.cpp | 7/30/2007 12:37 | 3,273 |
| speedmeter.h | 7/30/2007 12:37 | 4,393 |
| ssocket.h | 7/30/2007 12:37 | 13,030 |
| timed_callback.cpp | 7/30/2007 12:37 | 1,357 |
| timed_callback.h | 7/30/2007 12:37 | 2,782 |
| trackable.h | 7/30/2007 12:37 | 5,977 |
| tsptrs.cpp | 7/30/2007 12:37 | 940 |
| tsptrs.h | 7/30/2007 12:37 | 1,715 |
| unchain_ptr.h | 7/30/2007 12:37 | 2,641 |
| utils.cpp | 7/30/2007 12:37 | 11,304 |
| utils.h | 7/30/2007 12:37 | 18,901 |
| workthread.cpp | 7/30/2007 12:37 | 2,503 |
| workthread.h | 7/30/2007 12:37 | 6,139 |
| F:\patent\iacd\hnbase\doc | | |
| F:\patent\iacd\hnbase\test | | |
| Jamfile | 7/30/2007 12:37 | 1,275 |
| test-autodisc.cpp | 7/30/2007 12:37 | 772 |
| test-config.cpp | 7/30/2007 12:37 | 4,275 |
| test-event.cpp | 7/30/2007 12:37 | 6,194 |
| test-hash.cpp | 7/30/2007 12:37 | 4,916 |
| test-log.cpp | 7/30/2007 12:37 | 2,018 |
| test-object.cpp | 7/30/2007 12:37 | 5,879 |
| test-range.cpp | 7/30/2007 12:37 | 12,946 |
| test-resolver.cpp | 7/30/2007 12:37 | 1,812 |
| test-sockets.cpp | 7/30/2007 12:37 | 4,556 |
| test-speed.cpp | 7/30/2007 12:37 | 1,434 |
| test-ssocket.cpp | 7/30/2007 12:37 | 3,300 |
| test-timed_callback.cpp | 7/30/2007 12:37 | 2,289 |
| test-trackable.cpp | 7/30/2007 12:37 | 395 |
| test-unchainptr.cpp | 7/30/2007 12:37 | 3,522 |
| test-utils.cpp | 7/30/2007 12:37 | 3,804 |
| test-utils2.cpp | 7/30/2007 12:37 | 2,377 |
| test-utils3.cpp | 7/30/2007 12:37 | 3,322 |
| F:\patent\iacd\hncore | | |
| appmain.cpp | 7/30/2007 12:37 | 24,301 |
| appmain.h | 7/30/2007 12:37 | 12,101 |
| baseclient.cpp | 7/30/2007 12:37 | 4,884 |
| baseclient.h | 7/30/2007 12:37 | 5,513 |
| clientmanager.cpp | 7/30/2007 12:37 | 1,384 |
| clientmanager.h | 7/30/2007 12:37 | 7,547 |
| fileslist.cpp | 7/30/2007 12:37 | 16,236 |
| fileslist.h | 7/30/2007 12:37 | 11,378 |
| fwd.h | 7/30/2007 12:37 | 3,111 |
| hasher.cpp | 7/30/2007 12:37 | 6,347 |
| hasher.h | 7/30/2007 12:37 | 7,026 |
| hashsetmaker.cpp | 7/30/2007 12:37 | 8,293 |
| hashsetmaker.h | 7/30/2007 12:37 | 5,312 |
| httpreq.h | 7/30/2007 12:37 | 6,381 |
| httpreq.ipp | 7/30/2007 12:37 | 6,055 |
| iacd.rc | 7/30/2007 12:37 | 2,687 |
| iothread.cpp | 7/30/2007 12:37 | 1,006 |
| iothread.h | 7/30/2007 12:37 | 1,071 |
| ipfilter.cpp | 7/30/2007 12:37 | 5,125 |
| ipfilter.h | 7/30/2007 12:37 | 2,103 |
| Jamfile | 7/30/2007 12:37 | 1,061 |
| main.cpp | 7/30/2007 12:37 | 1,734 |
| metadata.cpp | 7/30/2007 12:37 | 27,489 |
| metadata.h | 7/30/2007 12:37 | 21,373 |
| metadb.cpp | 7/30/2007 12:37 | 11,911 |
| metadb.h | 7/30/2007 12:37 | 12,106 |
| modules.cpp | 7/30/2007 12:37 | 17,321 |

APPENDIX A-continued

| [File/Folder] | [Date] | [Size in Bytes] |
| --- | --- | --- |
| modules.h | 7/30/2007 12:37 | 13,212 |
| partdata.cpp | 7/30/2007 12:37 | 54,911 |
| partdata.h | 7/30/2007 12:37 | 31,020 |
| partdata_impl.h | 7/30/2007 12:37 | 6,859 |
| pch.cpp | 7/30/2007 12:37 | 957 |
| pch.h | 7/30/2007 12:37 | 1,447 |
| resource.h | 7/30/2007 12:37 | 430 |
| search.cpp | 7/30/2007 12:37 | 3,600 |
| search.h | 7/30/2007 12:37 | 11,762 |
| sharedfile.cpp | 7/30/2007 12:37 | 20,553 |
| sharedfile.h | 7/30/2007 12:37 | 7,826 |
| stats.cpp | 7/30/2007 12:37 | 14,018 |
| stats.h | 7/30/2007 12:37 | 2,764 |
| upnp.cpp | 7/30/2007 12:37 | 12,626 |
| upnp.h | 7/30/2007 12:37 | 5,016 |
| url.cpp | 7/30/2007 12:37 | 1,170 |
| url.h | 7/30/2007 12:37 | 1,899 |
| F:\patent\iacd\hncore\doc | | |
| F:\patent\iacd\hncore\ferret | | |
| common.h | 7/30/2007 12:37 | 159 |
| ferret.cpp | 7/30/2007 12:37 | 18,909 |
| ferret.h | 7/30/2007 12:37 | 3,435 |
| genkeys.cpp | 7/30/2007 12:37 | 1,292 |
| geoloc.h | 7/30/2007 12:37 | 3,705 |
| Jamfile | 7/30/2007 12:37 | 1,149 |
| net.cpp | 7/30/2007 12:37 | 33,634 |
| net.h | 7/30/2007 12:37 | 7,852 |
| newrumor.cpp | 7/30/2007 12:37 | 8,243 |
| peerlist.cpp | 7/30/2007 12:37 | 5,266 |
| peerlist.h | 7/30/2007 12:37 | 3,256 |
| rumor.cpp | 7/30/2007 12:37 | 9,893 |
| rumor.h | 7/30/2007 12:37 | 5,126 |
| rumorsig.cpp | 7/30/2007 12:37 | 1,358 |
| types.h | 7/30/2007 12:37 | 3,402 |
| F:\patent\iacd\hncore\ferret\test | | |
| Jamfile | 7/30/2007 12:37 | 197 |
| test-rumorstorage.cpp | 7/30/2007 12:37 | 2,915 |
| F:\patent\iacd\hncore\gush | | |
| bencoder.cpp | 7/30/2007 12:37 | 2,262 |
| bencoder.h | 7/30/2007 12:37 | 2,713 |
| bget.cpp | 7/30/2007 12:37 | 2,446 |
| buddymgr.cpp | 7/30/2007 12:37 | 9,280 |
| buddymgr.h | 7/30/2007 12:37 | 1,805 |
| client.cpp | 7/30/2007 12:37 | 33,979 |
| client.h | 7/30/2007 12:37 | 7,076 |
| Doxyfile | 7/30/2007 12:37 | 8,023 |
| files.cpp | 7/30/2007 12:37 | 29,795 |
| files.h | 7/30/2007 12:37 | 13,931 |
| gush.cpp | 7/30/2007 12:37 | 26,020 |
| gush.h | 7/30/2007 12:37 | 6,538 |
| Jamfile | 7/30/2007 12:37 | 434 |
| nat.cpp | 7/30/2007 12:37 | 15,616 |
| package.cpp | 7/30/2007 12:37 | 14,599 |
| package.h | 7/30/2007 12:37 | 7,205 |
| packageinfo.cpp | 7/30/2007 12:37 | 9,831 |
| packageinfo.h | 7/30/2007 12:37 | 5,853 |
| protocol.h | 7/30/2007 12:37 | 4,324 |
| tracker.cpp | 7/30/2007 12:37 | 11,517 |
| tracker.h | 7/30/2007 12:37 | 3,296 |
| types.h | 7/30/2007 12:37 | 1,635 |
| F:\patent\iacd\hncore\gush\doc | | |
| torrent.html | 7/30/2007 12:37 | 8,410 |
| torrentfiles.dia | 7/30/2007 12:37 | 3,331 |
| torrentfiles.png | 7/30/2007 12:37 | 61,346 |
| F:\patent\iacd\hncore\gush\test | | |
| Jamfile | 7/30/2007 12:37 | 275 |
| test-bencoder.cpp | 7/30/2007 12:37 | 1,593 |
| test-packageinfo.cpp | 7/30/2007 12:37 | 1,415 |
| F:\patent\iacd\hncore\http | | |
| http.cpp | 7/30/2007 12:37 | 17,223 |
| http.h | 7/30/2007 12:37 | 2,826 |
| Jamfile | 7/30/2007 12:37 | 329 |
| F:\patent\iacd\hncore\http\test | | |
| httpget.cpp | 7/30/2007 12:37 | 880 |
| F:\patent\iacd\hncore\jittr | | |
| avi.cpp | 7/30/2007 12:37 | 18,673 |
| avi.h | 7/30/2007 12:37 | 10,638 |

APPENDIX A-continued

| [File/Folder] | [Date] | [Size in Bytes] |
|---|---|---|
| client.cpp | 7/30/2007 12:37 | 15,873 |
| client.h | 7/30/2007 12:37 | 2,385 |
| filereq.cpp | 7/30/2007 12:37 | 1,456 |
| filereq.h | 7/30/2007 12:37 | 1,233 |
| flv.cpp | 7/30/2007 12:37 | 10,461 |
| flv.h | 7/30/2007 12:37 | 3,438 |
| Jamfile | 7/30/2007 12:37 | 128 |
| jittr.cpp | 7/30/2007 12:37 | 8,624 |
| jittr.h | 7/30/2007 12:37 | 1,585 |
| playlist.cpp | 7/30/2007 12:37 | 8,215 |
| playlist.h | 7/30/2007 12:37 | 3,097 |
| vfile.cpp | 7/30/2007 12:37 | 21,330 |
| vfile.h | 7/30/2007 12:37 | 5,887 |
| wmv.cpp | 7/30/2007 12:37 | 1,441 |
| wmv.h | 7/30/2007 12:37 | 141 |
| F:\patent\iacd\hncore\jittr\test | | |
| avi.cpp | 7/30/2007 12:37 | 24,064 |
| flv.cpp | 7/30/2007 12:37 | 12,609 |
| wmv.cpp | 7/30/2007 12:37 | 4,851 |
| F:\patent\iacd\hncore\kad | | |
| bstrapper.h | 7/30/2007 12:37 | 1,119 |
| config.h | 7/30/2007 12:37 | 4,063 |
| contact.h | 7/30/2007 12:37 | 4,349 |
| contact.ipp | 7/30/2007 12:37 | 1,745 |
| kademlia.h | 7/30/2007 12:37 | 510 |
| kbucket.h | 7/30/2007 12:37 | 4,302 |
| kbucket.ipp | 7/30/2007 12:37 | 8,557 |
| nodefinder.h | 7/30/2007 12:37 | 5,779 |
| nodefinder.ipp | 7/30/2007 12:37 | 9,480 |
| routingzone.h | 7/30/2007 12:37 | 13,720 |
| routingzone.ipp | 7/30/2007 12:37 | 19,438 |
| storage.h | 7/30/2007 12:37 | 4,422 |
| valuefinder.h | 7/30/2007 12:37 | 3,335 |
| valuefinder.ipp | 7/30/2007 12:37 | 4,903 |
| F:\patent\iacd\hncore\kad\test | | |
| Jamfile | 7/30/2007 12:37 | 974 |
| kademlia-real.cpp | 7/30/2007 12:37 | 7,377 |
| signaller_templ.cpp | 7/30/2007 12:37 | 5,600 |
| signaller_templ.h | 7/30/2007 12:37 | 1,536 |
| test-bstrap.cpp | 7/30/2007 12:37 | 4,630 |
| test-kademlia.cpp | 7/30/2007 12:37 | 15,044 |
| test-replcache.cpp | 7/30/2007 12:37 | 3,460 |
| test-republish.cpp | 7/30/2007 12:37 | 6,233 |
| test-timeout.cpp | 7/30/2007 12:37 | 4,574 |
| test-transfer.cpp | 7/30/2007 12:37 | 8,370 |
| F:\patent\iacd\hncore\minimal | | |
| Jamfile | 7/30/2007 12:37 | 48 |
| minimal.cpp | 7/30/2007 12:37 | 2,138 |
| minimal.h | 7/30/2007 12:37 | 1,434 |
| F:\patent\iacd\hncore\test | | |
| Jamfile | 7/30/2007 12:37 | 1,001 |
| test-hasher.cpp | 7/30/2007 12:37 | 6,364 |
| test-httpreq.cpp | 7/30/2007 12:37 | 2,048 |
| test-ipfilter.cpp | 7/30/2007 12:37 | 2,465 |
| test-metadata.cpp | 7/30/2007 12:37 | 22,607 |
| test-partdata.cpp | 7/30/2007 12:37 | 3,675 |
| test-pfwd.cpp | 7/30/2007 12:37 | 4,832 |
| test-url.cpp | 7/30/2007 12:37 | 2,046 |
| test-workthread.cpp | 7/30/2007 12:37 | 2,390 |
| F:\patent\iacd\jm | | |
| build.xml | 7/30/2007 12:37 | 1,417 |
| INTALL.txt | 7/30/2007 12:37 | 94 |
| Jamfile | 7/30/2007 12:37 | 472 |
| jm.rc | 7/30/2007 12:37 | 2,703 |
| jm.sln | 7/30/2007 12:37 | 868 |
| jm.vcproj | 7/30/2007 12:37 | 2,668 |
| README.txt | 7/30/2007 12:37 | 251 |
| resource.h | 7/30/2007 12:37 | 446 |
| F:\patent\iacd\jm\doc | | |
| Project | 7/30/2007 12:37 | 22,952 |
| ~$oject | 7/30/2007 12:37 | 162 |
| F:\patent\iacd\jm\jm | | |
| GetProcessID.cpp | 7/30/2007 12:37 | 4,330 |
| GetProcessID.h | 7/30/2007 12:37 | 134 |
| jmSocket.cpp | 7/30/2007 12:37 | 1,799 |
| jmSocket.h | 7/30/2007 12:37 | 52 |
| main.cpp | 7/30/2007 12:37 | 7,943 |

APPENDIX A-continued

| [File/Folder] | [Date] | [Size in Bytes] |
|---|---|---|
| verify.cpp | 7/30/2007 12:37 | 3,623 |
| verify.h | 7/30/2007 12:37 | 380 |
| F:\patent\iacd\jm\jm\openssl | | |
| aes.h | 7/30/2007 12:37 | 5,372 |
| applink.c | 7/30/2007 12:37 | 2,892 |
| asn1.h | 7/30/2007 12:37 | 46,139 |
| asn1t.h | 7/30/2007 12:37 | 27,838 |
| asn1_mac.h | 7/30/2007 12:37 | 18,956 |
| bio.h | 7/30/2007 12:37 | 30,860 |
| blowfish.h | 7/30/2007 12:37 | 5,073 |
| bn.h | 7/30/2007 12:37 | 32,411 |
| buffer.h | 7/30/2007 12:37 | 4,565 |
| camellia.h | 7/30/2007 12:37 | 5,110 |
| cast.h | 7/30/2007 12:37 | 4,349 |
| comp.h | 7/30/2007 12:37 | 1,601 |
| conf.h | 7/30/2007 12:37 | 9,443 |
| conf_api.h | 7/30/2007 12:37 | 4,080 |
| crypto.h | 7/30/2007 12:37 | 22,121 |
| des.h | 7/30/2007 12:37 | 10,724 |
| des_old.h | 7/30/2007 12:37 | 18,226 |
| dh.h | 7/30/2007 12:37 | 8,372 |
| dsa.h | 7/30/2007 12:37 | 10,474 |
| dso.h | 7/30/2007 12:37 | 16,252 |
| dtls1.h | 7/30/2007 12:37 | 6,183 |
| ebcdic.h | 7/30/2007 12:37 | 540 |
| ec.h | 7/30/2007 12:37 | 21,352 |
| ecdh.h | 7/30/2007 12:37 | 4,609 |
| ecdsa.h | 7/30/2007 12:37 | 10,578 |
| engine.h | 7/30/2007 12:37 | 37,839 |
| err.h | 7/30/2007 12:37 | 12,493 |
| evp.h | 7/30/2007 12:37 | 35,352 |
| e_os2.h | 7/30/2007 12:37 | 9,632 |
| hmac.h | 7/30/2007 12:37 | 4,368 |
| idea.h | 7/30/2007 12:37 | 4,364 |
| krb5_asn.h | 7/30/2007 12:37 | 7,642 |
| kssl.h | 7/30/2007 12:37 | 5,927 |
| lhash.h | 7/30/2007 12:37 | 7,429 |
| md2.h | 7/30/2007 12:37 | 3,897 |
| md4.h | 7/30/2007 12:37 | 4,661 |
| md5.h | 7/30/2007 12:37 | 4,661 |
| objects.h | 7/30/2007 12:37 | 33,396 |
| obj_mac.h | 7/30/2007 12:37 | 113,075 |
| ocsp.h | 7/30/2007 12:37 | 23,863 |
| opensslconf.h | 7/30/2007 12:37 | 6,331 |
| opensslv.h | 7/30/2007 12:37 | 3,751 |
| ossl_typ.h | 7/30/2007 12:37 | 6,446 |
| pem.h | 7/30/2007 12:37 | 28,370 |
| pem2.h | 7/30/2007 12:37 | 2,863 |
| pkcs12.h | 7/30/2007 12:37 | 12,677 |
| pkcs7.h | 7/30/2007 12:37 | 16,333 |
| pqueue.h | 7/30/2007 12:37 | 3,519 |
| pq_compat.h | 7/30/2007 12:37 | 6,142 |
| rand.h | 7/30/2007 12:37 | 5,251 |
| rc2.h | 7/30/2007 12:37 | 4,294 |
| rc4.h | 7/30/2007 12:37 | 3,707 |
| ripemd.h | 7/30/2007 12:37 | 4,284 |
| rsa.h | 7/30/2007 12:37 | 17,353 |
| safestack.h | 7/30/2007 12:37 | 127,361 |
| sha.h | 7/30/2007 12:37 | 7,329 |
| ssl.h | 7/30/2007 12:37 | 79,826 |
| ssl2.h | 7/30/2007 12:37 | 10,716 |
| ssl23.h | 7/30/2007 12:37 | 3,744 |
| ssl3.h | 7/30/2007 12:37 | 22,012 |
| stack.h | 7/30/2007 12:37 | 4,418 |
| store.h | 7/30/2007 12:37 | 26,481 |
| symhacks.h | 7/30/2007 12:37 | 19,456 |
| tls1.h | 7/30/2007 12:37 | 15,233 |
| tmdiff.h | 7/30/2007 12:37 | 4,117 |
| txt_db.h | 7/30/2007 12:37 | 4,300 |
| ui.h | 7/30/2007 12:37 | 16,418 |
| ui_compat.h | 7/30/2007 12:37 | 3,439 |
| x509.h | 7/30/2007 12:37 | 47,946 |
| x509v3.h | 7/30/2007 12:37 | 29,980 |
| x509_vfy.h | 7/30/2007 12:37 | 20,782 |
| F:\patent\iacd\jm\redist | | |
| boost_date_time-vc80-mt-1_34.lib | 7/30/2007 12:37 | 27,120 |
| boost_date_time-vc80-mt-gd-1_34.lib | 7/30/2007 12:37 | 27,278 |

APPENDIX A-continued

| [File/Folder] | [Date] | [Size in Bytes] |
|---|---|---|
| libboost_filesystem-vc80-mt-1_34.lib | 7/30/2007 12:37 | 647,094 |
| libboost_filesystem-vc80-mt-gd-1_34.lib | 7/30/2007 12:37 | 2,147,586 |
| libeay32.lib | 7/30/2007 12:37 | 664,514 |
| ssleay32.lib | 7/30/2007 12:37 | 51,978 |
| F:\patent\iacd\jm\test | | |
| F:\patent\iacd\redist | | |
| Microsoft.VC80.CRT.manifest | 7/30/2007 12:37 | 1,869 |
| Microsoft.VC80.DebugCRT.manifest | 7/30/2007 12:37 | 1,877 |
| msvcm80.dll | 7/30/2007 12:37 | 479,232 |
| msvcm80d.dll | 7/30/2007 12:37 | 1,015,808 |
| msvcp80.dll | 7/30/2007 12:37 | 548,864 |
| msvcp80d.dll | 7/30/2007 12:37 | 1,036,288 |
| msvcr80.dll | 7/30/2007 12:37 | 626,688 |
| msvcr80d.dll | 7/30/2007 12:37 | 1,175,552 |
| F:\patent\iacd\redist\config | | |
| F:\patent\iacd\redist\config\jittr | | |
| nodes.dat | 7/30/2007 12:37 | 896 |
| pop_nodes.dat | 7/30/2007 12:37 | 2,800 |
| pubKeyFile.txt | 7/30/2007 12:37 | 320 |
| F:\patent\iacd\redist\config\webconf | | |
| advanced.html | 7/30/2007 12:37 | 417 |
| cache.html | 7/30/2007 12:37 | 688 |
| index.html | 7/30/2007 12:37 | 7,443 |
| settings.html | 7/30/2007 12:37 | 1,690 |
| F:\patent\iacd\redist\config\webconf\images | | |
| iacd-conf-1_01.png | 7/30/2007 12:37 | 17,057 |
| iacd-conf-1_02.png | 7/30/2007 12:37 | 13,351 |
| iacd-conf-1_03.png | 7/30/2007 12:37 | 11,149 |
| iacd-conf-1_04.png | 7/30/2007 12:37 | 8,146 |
| iacd-conf-1_05-active.png | 7/30/2007 12:37 | 1,735 |
| iacd-conf-1_05.png | 7/30/2007 12:37 | 2,711 |
| iacd-conf-1_06.png | 7/30/2007 12:37 | 430 |
| iacd-conf-1_07-active.png | 7/30/2007 12:37 | 1,453 |
| iacd-conf-1_07.png | 7/30/2007 12:37 | 2,283 |
| iacd-conf-1_08.png | 7/30/2007 12:37 | 437 |
| iacd-conf-1_09-active.png | 7/30/2007 12:37 | 1,758 |
| iacd-conf-1_09.png | 7/30/2007 12:37 | 2,697 |
| iacd-conf-1_10.png | 7/30/2007 12:37 | 2,799 |
| iacd-conf-1_11.png | 7/30/2007 12:37 | 131 |
| iacd-conf-1_12.png | 7/30/2007 12:37 | 128 |
| iacd-conf-1_13.png | 7/30/2007 12:37 | 128 |
| iacd-conf-1_14.png | 7/30/2007 12:37 | 227 |
| iacd-conf-1_16.png | 7/30/2007 12:37 | 12,526 |
| iacd-conf-1_17.png | 7/30/2007 12:37 | 11,541 |
| internal-empty.png | 7/30/2007 12:37 | 1,072 |
| spacer.gif | 7/30/2007 12:37 | 43 |
| F:\patent\iacd\redist\plugins | | |
| F:\patent\iacd\redist\plugins\Microsoft.VC80.CRT | | |
| Microsoft.VC80.CRT.manifest | 7/30/2007 12:37 | 1,887 |
| F:\patent\iacd\redist\plugins\Microsoft.VC80.DebugCRT | | |
| Microsoft.VC80.DebugCRT.manifest | 7/30/2007 12:37 | 1,897 |
| F:\patent\iacd\scripts | | |
| calcp2p.sh | 7/30/2007 12:37 | 795 |
| ijittrd.sh | 7/30/2007 12:37 | 527 |
| init-env.sh | 7/30/2007 12:37 | 204 |
| pkginst.sh | 7/30/2007 12:37 | 580 |
| procwatch.sh | 7/30/2007 12:37 | 186 |
| randomize_upspeeds.sh | 7/30/2007 12:37 | 141 |
| rndwatch.sh | 7/30/2007 12:37 | 4,223 |
| startnodes.sh | 7/30/2007 12:37 | 445 |
| F:\patent\iacd\tools | | |
| F:\patent\iacd\tools\v2 | | |
| boost-build.jam | 7/30/2007 12:37 | 22 |
| bootstrap.jam | 7/30/2007 12:37 | 761 |
| build-system.jam | 7/30/2007 12:37 | 6,429 |
| site-config.jam | 7/30/2007 12:37 | 41 |
| user-config.jam | 7/30/2007 12:37 | 1,614 |
| F:\patent\iacd\tools\v2\build | | |
| alias.jam | 7/30/2007 12:37 | 2,590 |
| build-request.jam | 7/30/2007 12:37 | 9,241 |
| feature.jam | 7/30/2007 12:37 | 35,079 |
| generators.jam | 7/30/2007 12:37 | 39,726 |
| modifiers.jam | 7/30/2007 12:37 | 8,176 |
| project.jam | 7/30/2007 12:37 | 31,158 |
| property-set.jam | 7/30/2007 12:37 | 10,865 |
| property.jam | 7/30/2007 12:37 | 17,970 |
| readme.txt | 7/30/2007 12:37 | 179 |

APPENDIX A-continued

| [File/Folder] | [Date] | [Size in Bytes] |
|---|---|---|
| scanner.jam | 7/30/2007 12:37 | 4,842 |
| targets.jam | 7/30/2007 12:37 | 47,749 |
| toolset.jam | 7/30/2007 12:37 | 12,869 |
| type.jam | 7/30/2007 12:37 | 9,526 |
| version.jam | 7/30/2007 12:37 | 545 |
| virtual-target.jam | 7/30/2007 12:37 | 35,056 |
| F:\patent\iacd\tools\v2\kernel | | |
| boost-build.jam | 7/30/2007 12:37 | 316 |
| bootstrap.jam | 7/30/2007 12:37 | 4,950 |
| class.jam | 7/30/2007 12:37 | 10,352 |
| errors.jam | 7/30/2007 12:37 | 7,220 |
| modules.jam | 7/30/2007 12:37 | 11,507 |
| F:\patent\iacd\tools\v2\options | | |
| help.jam | 7/30/2007 12:37 | 5,321 |
| F:\patent\iacd\tools\v2\tools | | |
| acc.jam | 7/30/2007 12:37 | 2,984 |
| bison.jam | 7/30/2007 12:37 | 842 |
| boostbook-config.jam | 7/30/2007 12:37 | 1,868 |
| boostbook.jam | 7/30/2007 12:37 | 13,674 |
| borland.jam | 7/30/2007 12:37 | 6,994 |
| builtin.jam | 7/30/2007 12:37 | 25,339 |
| common.jam | 7/30/2007 12:37 | 15,693 |
| como-linux.jam | 7/30/2007 12:37 | 3,594 |
| como-win.jam | 7/30/2007 12:37 | 4,587 |
| como.jam | 7/30/2007 12:37 | 787 |
| cw-config.jam | 7/30/2007 12:37 | 1,283 |
| cw.jam | 7/30/2007 12:37 | 6,367 |
| darwin.jam | 7/30/2007 12:37 | 2,654 |
| docutils.jam | 7/30/2007 12:37 | 1,508 |
| doxygen-config.jam | 7/30/2007 12:37 | 1,259 |
| doxygen.jam | 7/30/2007 12:37 | 6,349 |
| fop.jam | 7/30/2007 12:37 | 2,967 |
| fortran.jam | 7/30/2007 12:37 | 1,197 |
| gcc.jam | 7/30/2007 12:37 | 13,753 |
| gettext.jam | 7/30/2007 12:37 | 7,908 |
| gfortran.jam | 7/30/2007 12:37 | 998 |
| hpfortran.jam | 7/30/2007 12:37 | 902 |
| ifort.jam | 7/30/2007 12:37 | 1,493 |
| intel-linux.jam | 7/30/2007 12:37 | 2,479 |
| intel-win.jam | 7/30/2007 12:37 | 3,556 |
| intel.jam | 7/30/2007 12:37 | 791 |
| kylix.jam | 7/30/2007 12:37 | 639 |
| lex.jam | 7/30/2007 12:37 | 818 |
| make.jam | 7/30/2007 12:37 | 2,275 |
| msvc-config.jam | 7/30/2007 12:37 | 1,355 |
| msvc.jam | 7/30/2007 12:37 | 14,700 |
| notfile.jam | 7/30/2007 12:37 | 1,937 |
| package.jam | 7/30/2007 12:37 | 2,911 |
| python-config.jam | 7/30/2007 12:37 | 836 |
| python.jam | 7/30/2007 12:37 | 14,301 |
| qt.jam | 7/30/2007 12:37 | 5,312 |
| qt4.jam | 7/30/2007 12:37 | 5,819 |
| quickbook-config.jam | 7/30/2007 12:37 | 1,257 |
| quickbook.jam | 7/30/2007 12:37 | 10,810 |
| rc.jam | 7/30/2007 12:37 | 4,431 |
| stage.jam | 7/30/2007 12:37 | 16,904 |
| stlport.jam | 7/30/2007 12:37 | 8,540 |
| sun.jam | 7/30/2007 12:37 | 3,827 |
| symlink.jam | 7/30/2007 12:37 | 4,107 |
| testing.jam | 7/30/2007 12:37 | 14,949 |
| unix.jam | 7/30/2007 12:37 | 5,843 |
| vacpp.jam | 7/30/2007 12:37 | 3,498 |
| whale.jam | 7/30/2007 12:37 | 2,923 |
| xlf.jam | 7/30/2007 12:37 | 900 |
| xsltproc-config.jam | 7/30/2007 12:37 | 1,049 |
| xsltproc.jam | 7/30/2007 12:37 | 3,031 |
| F:\patent\iacd\tools\v2\tools\types | | |
| cpp.jam | 7/30/2007 12:37 | 208 |
| exe.jam | 7/30/2007 12:37 | 226 |
| html.jam | 7/30/2007 12:37 | 203 |
| lib.jam | 7/30/2007 12:37 | 631 |
| obj.jam | 7/30/2007 12:37 | 230 |
| register.jam | 7/30/2007 12:37 | 1,243 |
| rsp.jam | 7/30/2007 12:37 | 201 |
| F:\patent\iacd\tools\v2\util | | |
| assert.jam | 7/30/2007 12:37 | 3,165 |
| container.jam | 7/30/2007 12:37 | 8,242 |

APPENDIX A-continued

| [File/Folder] | [Date] | [Size in Bytes] |
|---|---|---|
| doc.jam | 7/30/2007 12:37 | 28,918 |
| hn.jam | 7/30/2007 12:37 | 6,378 |
| indirect.jam | 7/30/2007 12:37 | 2,955 |
| numbers.jam | 7/30/2007 12:37 | 5,318 |
| option.jam | 7/30/2007 12:37 | 456 |
| order.jam | 7/30/2007 12:37 | 5,518 |
| os.jam | 7/30/2007 12:37 | 3,194 |
| path.jam | 7/30/2007 12:37 | 19,532 |
| print.jam | 7/30/2007 12:37 | 14,080 |
| regex.jam | 7/30/2007 12:37 | 5,247 |
| sequence.jam | 7/30/2007 12:37 | 8,478 |
| set.jam | 7/30/2007 12:37 | 1,358 |
| string.jam | 7/30/2007 12:37 | 2,909 |
| utility.jam | 7/30/2007 12:37 | 3,415 |
| wrapper.jam | 7/30/2007 12:37 | 2,664 |
| F:\patent\iacd\util | | |
| gentorrent.cpp | 7/30/2007 12:37 | 2,376 |
| Jamfile | 7/30/2007 12:37 | 1,514 |
| stunt.cpp | 7/30/2007 12:37 | 3,208 |
| stunt2.cpp | 7/30/2007 12:37 | 1,135 |
| wget.cpp | 7/30/2007 12:37 | 2,781 |
| F:\patent\install | | |
| build.xml | 7/30/2007 12:37 | 651 |
| F:\patent\install\nsis-win | | |
| build.xml | 7/30/2007 12:37 | 5,998 |
| INSTALL.txt | 7/30/2007 12:37 | 648 |
| jis.nsi | 7/30/2007 12:37 | 12,457 |
| jisd.nsi | 7/30/2007 12:37 | 12,481 |
| jittr.ico | 7/30/2007 12:37 | 10,734 |
| makensis.exe | 7/30/2007 12:37 | 471,552 |
| README.txt | 7/30/2007 12:37 | 1,133 |
| unjittr.ico | 7/30/2007 12:37 | 10,734 |
| F:\patent\install\nsis-win\debug | | |
| F:\patent\install\nsis-win\doc | | |
| Project | 7/30/2007 12:37 | 19,279 |
| F:\patent\install\nsis-win\help | | |
| F:\patent\install\nsis-win\Include | | |
| Colors.nsh | 7/30/2007 12:37 | 1,858 |
| FileFunc.nsh | 7/30/2007 12:37 | 45,751 |
| Library.nsh | 7/30/2007 12:37 | 19,080 |
| LoadingBar__Icon.exe | 7/30/2007 12:37 | 6,144 |
| LogicLib.nsh | 7/30/2007 12:37 | 28,380 |
| MUI.nsh | 7/30/2007 12:37 | 50 |
| Sections.nsh | 7/30/2007 12:37 | 5,782 |
| StrFunc.nsh | 7/30/2007 12:37 | 47,965 |
| TextFunc.nsh | 7/30/2007 12:37 | 28,017 |
| UpgradeDLL.nsh | 7/30/2007 12:37 | 4,993 |
| VPatchLib.nsh | 7/30/2007 12:37 | 649 |
| WinMessages.nsh | 7/30/2007 12:37 | 23,722 |
| WinVer.nsh | 7/30/2007 12:37 | 4,066 |
| WordFunc.nsh | 7/30/2007 12:37 | 43,589 |
| x64.nsh | 7/30/2007 12:37 | 1,358 |
| F:\patent\install\nsis-win\Plugins | | |
| AdvSplash.dll | 7/30/2007 12:37 | 6,144 |
| Banner.dll | 7/30/2007 12:37 | 4,096 |
| BgImage.dll | 7/30/2007 12:37 | 7,168 |
| Crypto.dll | 7/30/2007 12:37 | 2,886 |
| DcryptDll.dll | 7/30/2007 12:37 | 14,848 |
| Dialer.dll | 7/30/2007 12:37 | 3,584 |
| FindProcDLL.dll | 7/30/2007 12:37 | 3,584 |
| InstallOptions.dll | 7/30/2007 12:37 | 13,824 |
| KillProcDLL.dll | 7/30/2007 12:37 | 4,096 |
| LangDLL.dll | 7/30/2007 12:37 | 5,120 |
| Math.dll | 7/30/2007 12:37 | 15,360 |
| md5dll.dll | 7/30/2007 12:37 | 8,192 |
| messagebox.dll | 7/30/2007 12:37 | 6,144 |
| nsExec.dll | 7/30/2007 12:37 | 6,144 |
| NSISdl.dll | 7/30/2007 12:37 | 12,800 |
| nsisunz.dll | 7/30/2007 12:37 | 81,920 |
| nsSCM.dll | 7/30/2007 12:37 | 5,632 |
| Splash.dll | 7/30/2007 12:37 | 4,096 |
| StartMenu.dll | 7/30/2007 12:37 | 6,656 |
| System.dll | 7/30/2007 12:37 | 10,240 |
| TypeLib.dll | 7/30/2007 12:37 | 3,584 |
| UserInfo.dll | 7/30/2007 12:37 | 4,096 |
| VPatch.dll | 7/30/2007 12:37 | 7,680 |
| F:\patent\install\nsis-win\redist | | |

APPENDIX A-continued

| [File/Folder] | [Date] | [Size in Bytes] |
|---|---|---|
| Jittr.lnk | 7/30/2007 12:37 | 691 |
| jittrSmall.ico | 7/30/2007 12:37 | 318 |
| unjittrSmall.ico | 7/30/2007 12:37 | 318 |
| F:\patent\install\nsis-win\redist\config | | |
| F:\patent\install\nsis-win\redist\config\jittr | | |
| adservers.list | 7/30/2007 12:37 | 11 |
| infras.list | 7/30/2007 12:37 | 100 |
| pop_adservers.list | 7/30/2007 12:37 | 12 |
| pop_infras.list | 7/30/2007 12:37 | 110 |
| F:\patent\install\nsis-win\redist\plugins | | |
| F:\patent\install\nsis-win\redist\plugins\Microsoft.VC80.CRT | | |
| F:\patent\install\nsis-win\release | | |
| F:\patent\install\nsis-win\Stubs | | |
| bzip2 | 7/30/2007 12:37 | 34,304 |
| bzip2_solid | 7/30/2007 12:37 | 34,816 |
| lzma | 7/30/2007 12:37 | 34,304 |
| lzma_solid | 7/30/2007 12:37 | 34,816 |
| uninst | 7/30/2007 12:37 | 766 |
| zlib | 7/30/2007 12:37 | 35,328 |
| zlib_solid | 7/30/2007 12:37 | 36,352 |
| F:\patent\install\nsis-win\test | | |
| F:\patent\install\nsis-win\tools | | |
| jittrprivatekey.pfx | 7/30/2007 12:37 | 3,758 |
| mycredentials.spc | 7/30/2007 12:37 | 6,784 |
| signtool.exe | 7/30/2007 12:37 | 327,360 |
| F:\patent\jittrm | | |
| build.xml | 7/30/2007 12:38 | 1,446 |
| INTALL.txt | 7/30/2007 12:38 | 94 |
| jm.sln | 7/30/2007 12:38 | 871 |
| README.txt | 7/30/2007 12:38 | 251 |
| F:\patent\jittrm\doc | | |
| Project | 7/30/2007 12:38 | 22,952 |
| ~$oject | 7/30/2007 12:38 | 162 |
| F:\patent\jittrm\jm | | |
| GetProcessID.cpp | 7/30/2007 12:38 | 4,330 |
| GetProcessID.h | 7/30/2007 12:38 | 134 |
| jm.vcproj | 7/30/2007 12:38 | 4,435 |
| jmSocket.cpp | 7/30/2007 12:38 | 1,799 |
| jmSocket.h | 7/30/2007 12:38 | 52 |
| main.cpp | 7/30/2007 12:38 | 7,935 |
| verify.cpp | 7/30/2007 12:38 | 3,623 |
| verify.h | 7/30/2007 12:38 | 380 |
| F:\patent\jittrm\jm\openssl | | |
| aes.h | 7/30/2007 12:38 | 5,372 |
| applink.c | 7/30/2007 12:38 | 2,892 |
| asn1.h | 7/30/2007 12:38 | 46,139 |
| asn1t.h | 7/30/2007 12:38 | 27,838 |
| asn1_mac.h | 7/30/2007 12:38 | 18,956 |
| bio.h | 7/30/2007 12:38 | 30,860 |
| blowfish.h | 7/30/2007 12:38 | 5,073 |
| bn.h | 7/30/2007 12:38 | 32,411 |
| buffer.h | 7/30/2007 12:38 | 4,565 |
| camellia.h | 7/30/2007 12:38 | 5,110 |
| cast.h | 7/30/2007 12:38 | 4,349 |
| comp.h | 7/30/2007 12:38 | 1,601 |
| conf.h | 7/30/2007 12:38 | 9,443 |
| conf_api.h | 7/30/2007 12:38 | 4,080 |
| crypto.h | 7/30/2007 12:38 | 22,121 |
| des.h | 7/30/2007 12:38 | 10,724 |
| des_old.h | 7/30/2007 12:38 | 18,226 |
| dh.h | 7/30/2007 12:38 | 8,372 |
| dsa.h | 7/30/2007 12:38 | 10,474 |
| dso.h | 7/30/2007 12:38 | 16,252 |
| dtls1.h | 7/30/2007 12:38 | 6,183 |
| ebcdic.h | 7/30/2007 12:38 | 540 |
| ec.h | 7/30/2007 12:38 | 21,352 |
| ecdh.h | 7/30/2007 12:38 | 4,609 |
| ecdsa.h | 7/30/2007 12:38 | 10,578 |
| engine.h | 7/30/2007 12:38 | 37,839 |
| err.h | 7/30/2007 12:38 | 12,493 |
| evp.h | 7/30/2007 12:38 | 35,352 |
| e_os2.h | 7/30/2007 12:38 | 9,632 |
| hmac.h | 7/30/2007 12:38 | 4,368 |
| idea.h | 7/30/2007 12:38 | 4,364 |
| krb5_asn.h | 7/30/2007 12:38 | 7,642 |
| kssl.h | 7/30/2007 12:38 | 5,927 |
| lhash.h | 7/30/2007 12:38 | 7,429 |

APPENDIX A-continued

| [File/Folder] | [Date] | [Size in Bytes] |
|---|---|---|
| md2.h | 7/30/2007 12:38 | 3,897 |
| md4.h | 7/30/2007 12:38 | 4,661 |
| md5.h | 7/30/2007 12:38 | 4,661 |
| objects.h | 7/30/2007 12:38 | 33,396 |
| obj_mac.h | 7/30/2007 12:38 | 113,075 |
| ocsp.h | 7/30/2007 12:38 | 23,863 |
| opensslconf.h | 7/30/2007 12:38 | 6,331 |
| opensslv.h | 7/30/2007 12:38 | 3,751 |
| ossl_typ.h | 7/30/2007 12:38 | 6,446 |
| pem.h | 7/30/2007 12:38 | 28,370 |
| pem2.h | 7/30/2007 12:38 | 2,863 |
| pkcs12.h | 7/30/2007 12:38 | 12,677 |
| pkcs7.h | 7/30/2007 12:38 | 16,333 |
| pqueue.h | 7/30/2007 12:38 | 3,519 |
| pq_compat.h | 7/30/2007 12:38 | 6,142 |
| rand.h | 7/30/2007 12:38 | 5,251 |
| rc2.h | 7/30/2007 12:38 | 4,294 |
| rc4.h | 7/30/2007 12:38 | 3,707 |
| ripemd.h | 7/30/2007 12:38 | 4,284 |
| rsa.h | 7/30/2007 12:38 | 17,353 |
| safestack.h | 7/30/2007 12:38 | 127,361 |
| sha.h | 7/30/2007 12:38 | 7,329 |
| ssl.h | 7/30/2007 12:38 | 79,826 |
| ssl2.h | 7/30/2007 12:38 | 10,716 |
| ssl23.h | 7/30/2007 12:38 | 3,744 |
| ssl3.h | 7/30/2007 12:38 | 22,012 |
| stack.h | 7/30/2007 12:38 | 4,418 |
| store.h | 7/30/2007 12:38 | 26,481 |
| symhacks.h | 7/30/2007 12:38 | 19,456 |
| tls1.h | 7/30/2007 12:38 | 15,233 |
| tmdiff.h | 7/30/2007 12:38 | 4,117 |
| txt_db.h | 7/30/2007 12:38 | 4,300 |
| ui.h | 7/30/2007 12:38 | 16,418 |
| ui_compat.h | 7/30/2007 12:38 | 3,439 |
| x509.h | 7/30/2007 12:38 | 47,946 |
| x509v3.h | 7/30/2007 12:38 | 29,980 |
| x509_vfy.h | 7/30/2007 12:38 | 20,782 |
| F:\patent\jittrm\redist | | |
| boost_date_time-vc80-mt-1_34.lib | 7/30/2007 12:38 | 27,120 |
| boost_date_time-vc80-mt-gd-1_34.lib | 7/30/2007 12:38 | 27,278 |
| libboost_filesystem-vc80-mt-1_34.lib | 7/30/2007 12:38 | 647,094 |
| libboost_filesystem-vc80-mt-gd-1_34.lib | 7/30/2007 12:38 | 2,147,586 |
| libeay32.lib | 7/30/2007 12:38 | 664,514 |
| ssleay32.lib | 7/30/2007 12:38 | 51,978 |
| F:\patent\jittrm\test | | |
| F:\patent\ks | | |
| ks.sh | 7/30/2007 12:38 | 1,960 |
| F:\patent\mstore | | |
| build.sh | 7/30/2007 12:38 | 885 |
| INSTALL | 7/30/2007 12:38 | 26 |
| README | 7/30/2007 12:38 | 341 |
| F:\patent\mstore\bin | | |
| F:\patent\mstore\conf | | |
| mstore.ini | 7/30/2007 12:38 | 994 |
| F:\patent\mstore\debug | | |
| F:\patent\mstore\doc | | |
| F:\patent\mstore\mi | | |
| build.sh | 7/30/2007 12:38 | 991 |
| mi.py | 7/30/2007 12:38 | 11,278 |
| README | 7/30/2007 12:38 | 218 |
| release.sh | 7/30/2007 12:38 | 3,929 |
| start.sh | 7/30/2007 12:38 | 171 |
| threadpool.py | 7/30/2007 12:38 | 12,755 |
| version.py | 7/30/2007 12:38 | 557 |
| F:\patent\mstore\mi\conf | | |
| mi.ini | 7/30/2007 12:38 | 1,324 |
| F:\patent\mstore\mi\docs | | |
| README | 7/30/2007 12:38 | 124 |
| F:\patent\mstore\mi\etc | | |
| F:\patent\mstore\mi\etc\init.d | | |
| rc.mi | 7/30/2007 12:38 | 1,327 |
| F:\patent\mstore\mi\release | | |
| F:\patent\mstore\mi\rpm | | |
| mi.spec | 7/30/2007 12:38 | 2,708 |
| rpmmacros | 7/30/2007 12:38 | 135 |
| F:\patent\mstore\msapi | | |
| api.php | 7/30/2007 12:38 | 14,100 |

APPENDIX A-continued

| [File/Folder] | [Date] | [Size in Bytes] |
|---|---|---|
| msheader.php | 7/30/2007 12:38 | 1,253 |
| mstore.ini | 7/30/2007 12:38 | 972 |
| README | 7/30/2007 12:38 | 504 |
| test.php | 7/30/2007 12:38 | 1,133 |
| util.inc.php | 7/30/2007 12:38 | 865 |
| F:\patent\mstore\msdb | | |
| msdb.sql | 7/30/2007 12:38 | 561 |
| README | 7/30/2007 12:38 | 208 |
| F:\patent\mstore\redist | | |
| F:\patent\mstore\src | | |
| F:\patent\mstore\syncd | | |
| boost-build.jam | 7/30/2007 12:38 | 346 |
| build.sh | 7/30/2007 12:38 | 966 |
| build.xml | 7/30/2007 12:38 | 1,642 |
| Jamfile | 7/30/2007 12:38 | 4,953 |
| Jamrules | 7/30/2007 12:38 | 256 |
| project-root.jam | 7/30/2007 12:38 | 337 |
| README | 7/30/2007 12:38 | 219 |
| release.sh | 7/30/2007 12:38 | 3,992 |
| F:\patent\mstore\syncd\conf | | |
| setup_cluster.sh | 7/30/2007 12:38 | 3,678 |
| syncd.conf | 7/30/2007 12:38 | 356 |
| syncd.sysconfig | 7/30/2007 12:38 | 387 |
| F:\patent\mstore\syncd\docs | | |
| README | 7/30/2007 12:38 | 7 |
| F:\patent\mstore\syncd\etc | | |
| F:\patent\mstore\syncd\etc\init.d | | |
| rc.syncd | 7/30/2007 12:38 | 1,942 |
| F:\patent\mstore\syncd\extra | | |
| Jamfile | 7/30/2007 12:38 | 2,663 |
| F:\patent\mstore\syncd\extra\boost_date_time | | |
| F:\patent\mstore\syncd\extra\boost_date_time\gregorian | | |
| date_generators.cpp | 7/30/2007 12:37 | 892 |
| gregorian_types.cpp | 7/30/2007 12:37 | 2,092 |
| greg_month.cpp | 7/30/2007 12:37 | 6,095 |
| greg_names.hpp | 7/30/2007 12:37 | 2,378 |
| greg_weekday.cpp | 7/30/2007 12:37 | 1,353 |
| F:\patent\mstore\syncd\extra\boost_date_time\posix_time | | |
| posix_time_types.cpp | 7/30/2007 12:37 | 923 |
| F:\patent\mstore\syncd\extra\boost_filesystem | | |
| exception.cpp | 7/30/2007 12:38 | 5,236 |
| operations.cpp | 7/30/2007 12:38 | 47,533 |
| path.cpp | 7/30/2007 12:38 | 4,245 |
| portability.cpp | 7/30/2007 12:38 | 3,550 |
| utf8_codecvt_facet1.cpp | 7/30/2007 12:38 | 598 |
| utf8_codecvt_facet_impl.cpp | 7/30/2007 12:38 | 9,154 |
| F:\patent\mstore\syncd\extra\boost_program_options | | |
| cmdline.cpp | 7/30/2007 12:38 | 17,044 |
| config_file.cpp | 7/30/2007 12:38 | 5,859 |
| convert.cpp | 7/30/2007 12:38 | 5,430 |
| options_description.cpp | 7/30/2007 12:38 | 19,191 |
| parsers.cpp | 7/30/2007 12:38 | 6,523 |
| positional_options.cpp | 7/30/2007 12:38 | 1,385 |
| utf8_codecvt_facet.cpp | 7/30/2007 12:38 | 600 |
| utf8_codecvt_facet_impl.cpp | 7/30/2007 12:38 | 9,154 |
| value_semantic.cpp | 7/30/2007 12:38 | 7,780 |
| variables_map.cpp | 7/30/2007 12:38 | 6,186 |
| winmain.cpp | 7/30/2007 12:38 | 3,793 |
| F:\patent\mstore\syncd\extra\boost_regex | | |
| cpp_regex_traits.cpp | 7/30/2007 12:37 | 3,209 |
| cregex.cpp | 7/30/2007 12:37 | 16,417 |
| c_regex_traits.cpp | 7/30/2007 12:37 | 6,576 |
| fileiter.cpp | 7/30/2007 12:37 | 19,887 |
| icu.cpp | 7/30/2007 12:37 | 20,867 |
| instances.cpp | 7/30/2007 12:37 | 729 |
| posix_api.cpp | 7/30/2007 12:37 | 6,949 |
| regex.cpp | 7/30/2007 12:37 | 5,684 |
| regex_debug.cpp | 7/30/2007 12:37 | 1,579 |
| regex_raw_buffer.cpp | 7/30/2007 12:37 | 1,802 |
| regex_traits_defaults.cpp | 7/30/2007 12:37 | 29,191 |
| static_mutex.cpp | 7/30/2007 12:37 | 3,830 |
| usinstances.cpp | 7/30/2007 12:37 | 2,305 |
| w32_regex_traits.cpp | 7/30/2007 12:37 | 14,749 |
| wc_regex_traits.cpp | 7/30/2007 12:37 | 8,852 |
| wide_posix_api.cpp | 7/30/2007 12:37 | 7,290 |
| winstances.cpp | 7/30/2007 12:37 | 761 |
| F:\patent\mstore\syncd\extra\boost_signals | | |

APPENDIX A-continued

| [File/Folder] | [Date] | [Size in Bytes] |
|---|---|---|
| connection.cpp | 7/30/2007 12:38 | 4,156 |
| named_slot_map.cpp | 7/30/2007 12:38 | 3,493 |
| signal_base.cpp | 7/30/2007 12:38 | 6,876 |
| slot.cpp | 7/30/2007 12:38 | 2,840 |
| trackable.cpp | 7/30/2007 12:38 | 1,840 |
| F:\patent\mstore\syncd\extra\boost_thread | | |
| barrier.cpp | 7/30/2007 12:38 | 1,000 |
| condition.cpp | 7/30/2007 12:38 | 18,771 |
| exceptions.cpp | 7/30/2007 12:38 | 2,348 |
| mutex.cpp | 7/30/2007 12:38 | 10,734 |
| mutex.inl | 7/30/2007 12:38 | 3,412 |
| once.cpp | 7/30/2007 12:38 | 5,860 |
| recursive_mutex.cpp | 7/30/2007 12:38 | 22,562 |
| thread.cpp | 7/30/2007 12:38 | 10,362 |
| timeconv.inl | 7/30/2007 12:38 | 3,486 |
| tss.cpp | 7/30/2007 12:38 | 6,596 |
| tss_dll.cpp | 7/30/2007 12:38 | 2,367 |
| tss_hooks.cpp | 7/30/2007 12:38 | 6,511 |
| tss_null.cpp | 7/30/2007 12:38 | 1,444 |
| tss_pe.cpp | 7/30/2007 12:38 | 6,011 |
| xtime.cpp | 7/30/2007 12:38 | 4,834 |
| F:\patent\mstore\syncd\extra\boost_thread\mac | | |
| debug_prefix.hpp | 7/30/2007 12:38 | 315 |
| delivery_man.cpp | 7/30/2007 12:38 | 1,388 |
| delivery_man.hpp | 7/30/2007 12:38 | 1,741 |
| dt_scheduler.cpp | 7/30/2007 12:38 | 1,753 |
| dt_scheduler.hpp | 7/30/2007 12:38 | 1,238 |
| execution_context.cpp | 7/30/2007 12:38 | 1,382 |
| execution_context.hpp | 7/30/2007 12:38 | 1,402 |
| init.cpp | 7/30/2007 12:38 | 1,035 |
| init.hpp | 7/30/2007 12:38 | 633 |
| os.cpp | 7/30/2007 12:38 | 1,024 |
| os.hpp | 7/30/2007 12:38 | 705 |
| ot_context.cpp | 7/30/2007 12:38 | 828 |
| ot_context.hpp | 7/30/2007 12:38 | 1,241 |
| package.hpp | 7/30/2007 12:38 | 1,591 |
| periodical.hpp | 7/30/2007 12:38 | 1,851 |
| prefix.hpp | 7/30/2007 12:38 | 331 |
| remote_calls.hpp | 7/30/2007 12:38 | 6,891 |
| remote_call_manager.cpp | 7/30/2007 12:38 | 1,020 |
| remote_call_manager.hpp | 7/30/2007 12:38 | 2,286 |
| safe.cpp | 7/30/2007 12:38 | 6,456 |
| safe.hpp | 7/30/2007 12:38 | 1,170 |
| scoped_critical_region.cpp | 7/30/2007 12:38 | 1,033 |
| scoped_critical_region.hpp | 7/30/2007 12:38 | 1,657 |
| st_scheduler.cpp | 7/30/2007 12:38 | 1,891 |
| st_scheduler.hpp | 7/30/2007 12:38 | 1,491 |
| thread_cleanup.cpp | 7/30/2007 12:38 | 1,062 |
| thread_cleanup.hpp | 7/30/2007 12:38 | 704 |
| F:\patent\mstore\syncd\extra\boost_thread\mac\msl_replacements | | |
| assert.cpp | 7/30/2007 12:38 | 991 |
| console_io.cpp | 7/30/2007 12:38 | 3,183 |
| malloc.cpp | 7/30/2007 12:38 | 967 |
| news_and_deletes.cpp | 7/30/2007 12:38 | 1,882 |
| time.cpp | 7/30/2007 12:38 | 3,847 |
| F:\patent\mstore\syncd\extra\cryptopp | | |
| aes.h | 7/30/2007 12:37 | 294 |
| algebra.cpp | 7/30/2007 12:37 | 9,413 |
| algebra.h | 7/30/2007 12:37 | 9,207 |
| algparam.cpp | 7/30/2007 12:37 | 1,191 |
| algparam.h | 7/30/2007 12:37 | 12,073 |
| argnames.h | 7/30/2007 12:37 | 4,014 |
| asn.cpp | 7/30/2007 12:37 | 13,805 |
| asn.h | 7/30/2007 12:37 | 12,319 |
| basecode.cpp | 7/30/2007 12:37 | 5,865 |
| basecode.h | 7/30/2007 12:37 | 2,649 |
| config.h | 7/30/2007 12:37 | 15,449 |
| cpu.cpp | 7/30/2007 12:37 | 3,559 |
| cpu.h | 7/30/2007 12:37 | 3,234 |
| cryptlib.cpp | 7/30/2007 12:37 | 21,500 |
| cryptlib.h | 7/30/2007 12:37 | 72,861 |
| dll.cpp | 7/30/2007 12:37 | 4,430 |
| dll.h | 7/30/2007 12:37 | 1,682 |
| dsa.cpp | 7/30/2007 12:37 | 2,560 |
| dsa.h | 7/30/2007 12:37 | 1,246 |
| emsa2.cpp | 7/30/2007 12:37 | 1,238 |
| emsa2.h | 7/30/2007 12:37 | 2,074 |

APPENDIX A-continued

| [File/Folder] | [Date] | [Size in Bytes] |
|---|---|---|
| eprecomp.cpp | 7/30/2007 12:37 | 4,088 |
| eprecomp.h | 7/30/2007 12:37 | 3,136 |
| files.cpp | 7/30/2007 12:37 | 4,873 |
| files.h | 7/30/2007 12:37 | 3,539 |
| filters.cpp | 7/30/2007 12:37 | 29,784 |
| filters.h | 7/30/2007 12:37 | 31,769 |
| fips140.cpp | 7/30/2007 12:37 | 2,385 |
| fips140.h | 7/30/2007 12:37 | 2,425 |
| fltrimpl.h | 7/30/2007 12:37 | 1,838 |
| gf256.cpp | 7/30/2007 12:37 | 626 |
| gf256.h | 7/30/2007 12:37 | 1,273 |
| gfpcrypt.cpp | 7/30/2007 12:37 | 8,676 |
| gfpcrypt.h | 7/30/2007 12:37 | 20,344 |
| hex.cpp | 7/30/2007 12:37 | 1,184 |
| hex.h | 7/30/2007 12:37 | 1,151 |
| hmac.cpp | 7/30/2007 12:37 | 1,881 |
| hmac.h | 7/30/2007 12:37 | 1,891 |
| hrtimer.cpp | 7/30/2007 12:37 | 3,524 |
| hrtimer.h | 7/30/2007 12:37 | 1,810 |
| integer.cpp | 7/30/2007 12:37 | 110,355 |
| integer.h | 7/30/2007 12:37 | 13,857 |
| iterhash.cpp | 7/30/2007 12:37 | 4,264 |
| iterhash.h | 7/30/2007 12:37 | 3,961 |
| misc.cpp | 7/30/2007 12:37 | 2,016 |
| misc.h | 7/30/2007 12:37 | 28,698 |
| modarith.h | 7/30/2007 12:37 | 5,487 |
| modexppc.h | 7/30/2007 12:37 | 1,087 |
| mqueue.cpp | 7/30/2007 12:37 | 4,323 |
| mqueue.h | 7/30/2007 12:37 | 3,443 |
| nbtheory.cpp | 7/30/2007 12:37 | 25,321 |
| nbtheory.h | 7/30/2007 12:37 | 6,882 |
| oaep.cpp | 7/30/2007 12:37 | 3,139 |
| oaep.h | 7/30/2007 12:37 | 1,523 |
| oids.h | 7/30/2007 12:37 | 4,972 |
| osrng.cpp | 7/30/2007 12:37 | 3,635 |
| osrng.h | 7/30/2007 12:37 | 4,516 |
| pch.h | 7/30/2007 12:37 | 209 |
| pkcspad.cpp | 7/30/2007 12:37 | 4,440 |
| pkcspad.h | 7/30/2007 12:37 | 2,980 |
| pssr.cpp | 7/30/2007 12:37 | 5,673 |
| pssr.h | 7/30/2007 12:37 | 2,624 |
| pubkey.cpp | 7/30/2007 12:37 | 7,718 |
| pubkey.h | 7/30/2007 12:37 | 66,347 |
| queue.cpp | 7/30/2007 12:37 | 12,444 |
| queue.h | 7/30/2007 12:37 | 3,995 |
| randpool.cpp | 7/30/2007 12:37 | 1,452 |
| randpool.h | 7/30/2007 12:37 | 1,031 |
| rdtables.cpp | 7/30/2007 12:37 | 33,961 |
| rijndael.cpp | 7/30/2007 12:37 | 18,651 |
| rijndael.h | 7/30/2007 12:37 | 1,664 |
| rng.cpp | 7/30/2007 12:37 | 3,940 |
| rng.h | 7/30/2007 12:37 | 2,217 |
| rsa.cpp | 7/30/2007 12:37 | 9,181 |
| rsa.h | 7/30/2007 12:37 | 6,123 |
| secblock.h | 7/30/2007 12:37 | 13,505 |
| seckey.h | 7/30/2007 12:37 | 7,240 |
| sha.cpp | 7/30/2007 12:37 | 16,879 |
| sha.h | 7/30/2007 12:37 | 2,166 |
| simple.cpp | 7/30/2007 12:37 | 218 |
| simple.h | 7/30/2007 12:37 | 7,330 |
| smartptr.h | 7/30/2007 12:37 | 5,114 |
| square.cpp | 7/30/2007 12:37 | 5,324 |
| square.h | 7/30/2007 12:37 | 1,435 |
| squaretb.cpp | 7/30/2007 12:37 | 32,649 |
| stdcpp.h | 7/30/2007 12:37 | 507 |
| trdlocal.cpp | 7/30/2007 12:37 | 1,657 |
| trdlocal.h | 7/30/2007 12:37 | 782 |
| words.h | 7/30/2007 12:37 | 2,018 |
| F:\patent\mstore\syncd\extra\test | | |
| compiler_log_formatter.cpp | 7/30/2007 12:37 | 1,045 |
| cpp_main.cpp | 7/30/2007 12:37 | 1,027 |
| exception_safety.cpp | 7/30/2007 12:37 | 893 |
| execution_monitor.cpp | 7/30/2007 12:37 | 1,054 |
| framework.cpp | 7/30/2007 12:37 | 1,012 |
| interaction_based.cpp | 7/30/2007 12:37 | 896 |
| Jamfile | 7/30/2007 12:37 | 1,541 |
| logged_expectations.cpp | 7/30/2007 12:37 | 902 |

APPENDIX A-continued

| [File/Folder] | [Date] | [Size in Bytes] |
|---|---|---|
| plain_report_formatter.cpp | 7/30/2007 12:37 | 1,051 |
| progress_monitor.cpp | 7/30/2007 12:37 | 1,204 |
| results_collector.cpp | 7/30/2007 12:37 | 1,036 |
| results_reporter.cpp | 7/30/2007 12:37 | 1,033 |
| test_main.cpp | 7/30/2007 12:37 | 1,030 |
| test_tools.cpp | 7/30/2007 12:37 | 1,033 |
| unit_test_log.cpp | 7/30/2007 12:37 | 1,042 |
| unit_test_main.cpp | 7/30/2007 12:37 | 1,045 |
| unit_test_monitor.cpp | 7/30/2007 12:37 | 1,054 |
| unit_test_parameters.cpp | 7/30/2007 12:37 | 1,063 |
| unit_test_suite.cpp | 7/30/2007 12:37 | 1,048 |
| xml_log_formatter.cpp | 7/30/2007 12:37 | 1,030 |
| xml_report_formatter.cpp | 7/30/2007 12:37 | 1,045 |
| F:\patent\mstore\syncd\extra\zlib | | |
| adler32.c | 7/30/2007 12:37 | 4,559 |
| compress.c | 7/30/2007 12:37 | 2,489 |
| crc32.c | 7/30/2007 12:37 | 13,193 |
| crc32.h | 7/30/2007 12:37 | 30,568 |
| deflate.c | 7/30/2007 12:37 | 64,163 |
| deflate.h | 7/30/2007 12:37 | 12,114 |
| gzio.c | 7/30/2007 12:37 | 31,103 |
| infback.c | 7/30/2007 12:37 | 22,164 |
| inffast.c | 7/30/2007 12:37 | 12,568 |
| inffast.h | 7/30/2007 12:37 | 407 |
| inffixed.h | 7/30/2007 12:37 | 6,343 |
| inflate.c | 7/30/2007 12:37 | 48,977 |
| inflate.h | 7/30/2007 12:37 | 5,916 |
| inftrees.c | 7/30/2007 12:37 | 13,756 |
| inftrees.h | 7/30/2007 12:37 | 2,373 |
| Jamfile | 7/30/2007 12:37 | 344 |
| trees.c | 7/30/2007 12:37 | 44,027 |
| trees.h | 7/30/2007 12:37 | 8,444 |
| uncompr.c | 7/30/2007 12:37 | 2,087 |
| zconf.h | 7/30/2007 12:37 | 9,544 |
| zconf.in.h | 7/30/2007 12:37 | 9,544 |
| zlib.h | 7/30/2007 12:37 | 66,188 |
| zutil.c | 7/30/2007 12:37 | 7,136 |
| zutil.h | 7/30/2007 12:37 | 6,859 |
| F:\patent\mstore\syncd\release | | |
| F:\patent\mstore\syncd\rpm | | |
| rpmmacros | 7/30/2007 12:38 | 135 |
| syncd.spec | 7/30/2007 12:38 | 3,917 |
| F:\patent\mstore\syncd\syncd | | |
| conf.cpp | 7/30/2007 12:37 | 2,040 |
| conf.hpp | 7/30/2007 12:37 | 642 |
| connection.cpp | 7/30/2007 12:37 | 1,887 |
| connection.hpp | 7/30/2007 12:37 | 1,502 |
| connection_manager.cpp | 7/30/2007 12:37 | 599 |
| connection_manager.hpp | 7/30/2007 12:37 | 743 |
| customer.cpp | 7/30/2007 12:37 | 680 |
| customer.hpp | 7/30/2007 12:37 | 581 |
| dbdump.cpp | 7/30/2007 12:37 | 8,841 |
| dbdump.hpp | 7/30/2007 12:37 | 1,564 |
| fcopy.cpp | 7/30/2007 12:37 | 5,803 |
| fcopy.hpp | 7/30/2007 12:37 | 1,117 |
| Jamfile | 7/30/2007 12:37 | 800 |
| main.cpp | 7/30/2007 12:37 | 5,434 |
| README | 7/30/2007 12:37 | 219 |
| request.cpp | 7/30/2007 12:37 | 500 |
| request.hpp | 7/30/2007 12:37 | 760 |
| request_q.cpp | 7/30/2007 12:37 | 737 |
| request_q.hpp | 7/30/2007 12:37 | 742 |
| server.cpp | 7/30/2007 12:37 | 3,008 |
| server.hpp | 7/30/2007 12:37 | 1,771 |
| start.sh | 7/30/2007 12:37 | 108 |
| stats.cpp | 7/30/2007 12:37 | 3,104 |
| stats.hpp | 7/30/2007 12:37 | 865 |
| sync.cpp | 7/30/2007 12:37 | 2,012 |
| sync.hpp | 7/30/2007 12:37 | 963 |
| version.h | 7/30/2007 12:37 | 850 |
| F:\patent\player | | |
| build.bat | 7/30/2007 12:37 | 60 |
| F:\patent\player\3rdparty | | |
| F:\patent\player\3rdparty\DirectX | | |
| F:\patent\player\3rdparty\DirectX\include | | |
| dsound.h | 7/30/2007 12:36 | 110,756 |
| F:\patent\player\3rdparty\DirectX\lib | | |

APPENDIX A-continued

| [File/Folder] | [Date] | [Size in Bytes] |
|---|---|---|
| dsound.lib | 7/30/2007 12:36 | 4,042 |
| dxguid.lib | 7/30/2007 12:36 | 566,682 |
| F:\patent\player\3rdparty\libogg-1.1.3 | | |
| aclocal.m4 | 7/30/2007 12:36 | 240,770 |
| AUTHORS | 7/30/2007 12:36 | 66 |
| CHANGES | 7/30/2007 12:36 | 992 |
| compile | 7/30/2007 12:36 | 3,703 |
| config.guess | 7/30/2007 12:36 | 43,830 |
| config.h.in | 7/30/2007 12:36 | 1,816 |
| config.sub | 7/30/2007 12:36 | 31,544 |
| configure | 7/30/2007 12:36 | 729,820 |
| configure.in | 7/30/2007 12:36 | 6,437 |
| COPYING | 7/30/2007 12:36 | 1,466 |
| depcomp | 7/30/2007 12:36 | 15,868 |
| install-sh | 7/30/2007 12:36 | 9,233 |
| libogg.spec | 7/30/2007 12:36 | 2,825 |
| libogg.spec.in | 7/30/2007 12:36 | 2,829 |
| ltmain.sh | 7/30/2007 12:36 | 184,058 |
| Makefile.am | 7/30/2007 12:36 | 952 |
| Makefile.in | 7/30/2007 12:36 | 22,864 |
| missing | 7/30/2007 12:36 | 10,872 |
| ogg-uninstalled.pc.in | 7/30/2007 12:36 | 291 |
| ogg.m4 | 7/30/2007 12:36 | 3,486 |
| ogg.pc.in | 7/30/2007 12:36 | 266 |
| README | 7/30/2007 12:36 | 3,447 |
| F:\patent\player\3rdparty\libogg-1.1.3\debian | | |
| changelog | 7/30/2007 12:36 | 1,691 |
| control | 7/30/2007 12:36 | 713 |
| copyright | 7/30/2007 12:36 | 1,715 |
| libogg-dev.docs | 7/30/2007 12:36 | 36 |
| libogg-dev.install | 7/30/2007 12:36 | 271 |
| libogg0.install | 7/30/2007 12:36 | 31 |
| libogg0.README.Debian | 7/30/2007 12:36 | 160 |
| rules | 7/30/2007 12:36 | 3,296 |
| watch | 7/30/2007 12:36 | 86 |
| F:\patent\player\3rdparty\libogg-1.1.3\doc | | |
| framing.html | 7/30/2007 12:36 | 14,774 |
| index.html | 7/30/2007 12:36 | 1,809 |
| Makefile.am | 7/30/2007 12:36 | 301 |
| Makefile.in | 7/30/2007 12:36 | 15,518 |
| ogg-multiplex.html | 7/30/2007 12:36 | 18,859 |
| oggstream.html | 7/30/2007 12:36 | 8,619 |
| rfc3533.txt | 7/30/2007 12:36 | 32,045 |
| rfc3534.txt | 7/30/2007 12:36 | 10,013 |
| stream.png | 7/30/2007 12:36 | 2,254 |
| vorbisword2.png | 7/30/2007 12:36 | 1,394 |
| white-ogg.png | 7/30/2007 12:36 | 2,652 |
| white-xifish.png | 7/30/2007 12:36 | 965 |
| F:\patent\player\3rdparty\libogg-1.1.3\doc\libogg | | |
| bitpacking.html | 7/30/2007 12:36 | 3,257 |
| datastructures.html | 7/30/2007 12:36 | 1,762 |
| decoding.html | 7/30/2007 12:36 | 3,924 |
| encoding.html | 7/30/2007 12:36 | 2,410 |
| general.html | 7/30/2007 12:36 | 3,581 |
| index.html | 7/30/2007 12:36 | 1,096 |
| Makefile.am | 7/30/2007 12:36 | 1,469 |
| Makefile.in | 7/30/2007 12:36 | 11,278 |
| oggpack_adv.html | 7/30/2007 12:36 | 1,421 |
| oggpack_adv1.html | 7/30/2007 12:36 | 1,326 |
| oggpack_bits.html | 7/30/2007 12:36 | 1,475 |
| oggpack_buffer.html | 7/30/2007 12:36 | 1,543 |
| oggpack_bytes.html | 7/30/2007 12:36 | 1,591 |
| oggpack_get_buffer.html | 7/30/2007 12:36 | 1,465 |
| oggpack_look.html | 7/30/2007 12:36 | 1,675 |
| oggpack_look1.html | 7/30/2007 12:36 | 1,488 |
| oggpack_read.html | 7/30/2007 12:36 | 1,603 |
| oggpack_read1.html | 7/30/2007 12:36 | 1,580 |
| oggpack_readinit.html | 7/30/2007 12:36 | 1,740 |
| oggpack_reset.html | 7/30/2007 12:36 | 1,414 |
| oggpack_write.html | 7/30/2007 12:36 | 1,702 |
| oggpack_writealign.html | 7/30/2007 12:36 | 1,554 |
| oggpack_writeclear.html | 7/30/2007 12:36 | 1,431 |
| oggpack_writecopy.html | 7/30/2007 12:36 | 1,749 |
| oggpack_writeinit.html | 7/30/2007 12:36 | 1,540 |
| oggpack_writetrunc.html | 7/30/2007 12:36 | 1,584 |
| ogg_packet.html | 7/30/2007 12:36 | 2,286 |
| ogg_packet_clear.html | 7/30/2007 12:36 | 1,393 |

APPENDIX A-continued

| [File/Folder] | [Date] | [Size in Bytes] |
|---|---|---|
| ogg_page.html | 7/30/2007 12:36 | 2,139 |
| ogg_page_bos.html | 7/30/2007 12:36 | 1,422 |
| ogg_page_checksum_set.html | 7/30/2007 12:36 | 1,233 |
| ogg_page_continued.html | 7/30/2007 12:36 | 1,454 |
| ogg_page_eos.html | 7/30/2007 12:36 | 1,419 |
| ogg_page_granulepos.html | 7/30/2007 12:36 | 1,598 |
| ogg_page_packets.html | 7/30/2007 12:36 | 1,867 |
| ogg_page_pageno.html | 7/30/2007 12:36 | 1,383 |
| ogg_page_serialno.html | 7/30/2007 12:36 | 1,437 |
| ogg_page_version.html | 7/30/2007 12:36 | 1,558 |
| ogg_stream_clear.html | 7/30/2007 12:36 | 1,396 |
| ogg_stream_destroy.html | 7/30/2007 12:36 | 1,522 |
| ogg_stream_eos.html | 7/30/2007 12:36 | 1,414 |
| ogg_stream_flush.html | 7/30/2007 12:36 | 2,232 |
| ogg_stream_init.html | 7/30/2007 12:36 | 1,757 |
| ogg_stream_packetin.html | 7/30/2007 12:36 | 1,653 |
| ogg_stream_packetout.html | 7/30/2007 12:36 | 2,603 |
| ogg_stream_packetpeek.html | 7/30/2007 12:36 | 2,240 |
| ogg_stream_pagein.html | 7/30/2007 12:36 | 2,190 |
| ogg_stream_pageout.html | 7/30/2007 12:36 | 2,057 |
| ogg_stream_reset.html | 7/30/2007 12:36 | 1,386 |
| ogg_stream_reset_serialno.html | 7/30/2007 12:36 | 1,619 |
| ogg_stream_state.html | 7/30/2007 12:36 | 4,409 |
| ogg_sync_buffer.html | 7/30/2007 12:36 | 2,097 |
| ogg_sync_clear.html | 7/30/2007 12:36 | 1,763 |
| ogg_sync_destroy.html | 7/30/2007 12:36 | 1,458 |
| ogg_sync_init.html | 7/30/2007 12:36 | 1,665 |
| ogg_sync_pageout.html | 7/30/2007 12:36 | 2,521 |
| ogg_sync_pageseek.html | 7/30/2007 12:36 | 2,011 |
| ogg_sync_reset.html | 7/30/2007 12:36 | 1,538 |
| ogg_sync_state.html | 7/30/2007 12:36 | 1,516 |
| ogg_sync_wrote.html | 7/30/2007 12:36 | 2,040 |
| overview.html | 7/30/2007 12:36 | 1,174 |
| reference.html | 7/30/2007 12:36 | 3,921 |
| style.css | 7/30/2007 12:36 | 279 |
| vorbis_comment.html | 7/30/2007 12:36 | 2,169 |
| vorbis_info.html | 7/30/2007 12:36 | 2,404 |
| F:\patent\player\3rdparty\libogg-1.1.3\include | | |
| Makefile.am | 7/30/2007 12:36 | 73 |
| Makefile.in | 7/30/2007 12:36 | 14,233 |
| F:\patent\player\3rdparty\libogg-1.1.3\include\ogg | | |
| config_types.h.in | 7/30/2007 12:36 | 256 |
| Makefile.am | 7/30/2007 12:36 | 175 |
| Makefile.in | 7/30/2007 12:36 | 12,995 |
| ogg.h | 7/30/2007 12:36 | 7,589 |
| os_types.h | 7/30/2007 12:36 | 4,121 |
| F:\patent\player\3rdparty\libogg-1.1.3\macos | | |
| libogg.mcp | 7/30/2007 12:36 | 112,574 |
| libogg.mcp.exp | 7/30/2007 12:36 | 969 |
| F:\patent\player\3rdparty\libogg-1.1.3\macos\compat | | |
| strdup.c | 7/30/2007 12:36 | 305 |
| F:\patent\player\3rdparty\libogg-1.1.3\macos\compat\sys | | |
| types.h | 7/30/2007 12:36 | 422 |
| F:\patent\player\3rdparty\libogg-1.1.3\macosx | | |
| Info.plist | 7/30/2007 12:36 | 991 |
| Ogg_Prefix.pch | 7/30/2007 12:36 | 114 |
| F:\patent\player\3rdparty\libogg-1.1.3\macosx\English.lproj | | |
| InfoPlist.strings | 7/30/2007 12:36 | 136 |
| F:\patent\player\3rdparty\libogg-1.1.3\macosx\Ogg.xcodeproj | | |
| project.pbxproj | 7/30/2007 12:36 | 11,883 |
| F:\patent\player\3rdparty\libogg-1.1.3\src | | |
| bitwise.c | 7/30/2007 12:36 | 20,812 |
| framing.c | 7/30/2007 12:36 | 50,958 |
| Makefile.am | 7/30/2007 12:36 | 656 |
| Makefile.in | 7/30/2007 12:36 | 20,198 |
| F:\patent\player\3rdparty\libogg-1.1.3\win32 | | |
| build_ogg_dynamic.bat | 7/30/2007 12:36 | 463 |
| build_ogg_dynamic_debug.bat | 7/30/2007 12:36 | 461 |
| build_ogg_static.bat | 7/30/2007 12:36 | 460 |
| build_ogg_static_debug.bat | 7/30/2007 12:36 | 458 |
| Makefile.am | 7/30/2007 12:36 | 215 |
| Makefile.in | 7/30/2007 12:36 | 8,952 |
| ogg.def | 7/30/2007 12:36 | 1,221 |
| ogg.dsw | 7/30/2007 12:36 | 740 |

APPENDIX A-continued

| [File/Folder] | [Date] | [Size in Bytes] |
|---|---|---|
| ogg_dynamic.dsp | 7/30/2007 12:36 | 4,698 |
| ogg_static.dsp | 7/30/2007 12:36 | 3,204 |
| F:\patent\player\3rdparty\libogg-1.1.3\win32\VS2003 | | |
| F:\patent\player\3rdparty\libogg-1.1.3\win32\VS2003\libogg | | |
| libogg.vcproj | 7/30/2007 12:36 | 8,023 |
| F:\patent\player\3rdparty\libvorbis-1.1.2 | | |
| acinclude.m4 | 7/30/2007 12:37 | 5,680 |
| aclocal.m4 | 7/30/2007 12:37 | 240,797 |
| AUTHORS | 7/30/2007 12:37 | 65 |
| autogen.sh | 7/30/2007 12:37 | 2,118 |
| config.guess | 7/30/2007 12:37 | 43,830 |
| config.h.in | 7/30/2007 12:37 | 2,235 |
| config.sub | 7/30/2007 12:37 | 31,544 |
| configure | 7/30/2007 12:37 | 710,153 |
| configure.in | 7/30/2007 12:37 | 7,931 |
| COPYING | 7/30/2007 12:37 | 1,470 |
| depcomp | 7/30/2007 12:37 | 15,868 |
| install-sh | 7/30/2007 12:37 | 9,233 |
| libvorbis.spec | 7/30/2007 12:37 | 3,232 |
| libvorbis.spec.in | 7/30/2007 12:37 | 3,236 |
| ltmain.sh | 7/30/2007 12:37 | 184,058 |
| Makefile.am | 7/30/2007 12:37 | 1,189 |
| Makefile.in | 7/30/2007 12:37 | 24,391 |
| missing | 7/30/2007 12:37 | 10,872 |
| README | 7/30/2007 12:37 | 4,818 |
| todo.txt | 7/30/2007 12:37 | 490 |
| vorbis-uninstalled.pc.in | 7/30/2007 12:37 | 308 |
| vorbis.m4 | 7/30/2007 12:37 | 4,356 |
| vorbis.pc.in | 7/30/2007 12:37 | 285 |
| vorbisenc-uninstalled.pc.in | 7/30/2007 12:37 | 374 |
| vorbisenc.pc.in | 7/30/2007 12:37 | 361 |
| vorbisfile-uninstalled.pc.in | 7/30/2007 12:37 | 400 |
| vorbisfile.pc.in | 7/30/2007 12:37 | 387 |
| F:\patent\player\3rdparty\libvorbis-1.1.2\debian | | |
| changelog | 7/30/2007 12:37 | 3,403 |
| control | 7/30/2007 12:37 | 2,258 |
| copyright | 7/30/2007 12:37 | 1,691 |
| libvorbis-dev.docs | 7/30/2007 12:37 | 39 |
| libvorbis-dev.examples | 7/30/2007 12:37 | 27 |
| libvorbis-dev.install | 7/30/2007 12:37 | 592 |
| libvorbis0a.install | 7/30/2007 12:37 | 34 |
| libvorbisenc2.install | 7/30/2007 12:37 | 37 |
| libvorbisfile3.install | 7/30/2007 12:37 | 38 |
| rules | 7/30/2007 12:37 | 3,325 |
| watch | 7/30/2007 12:37 | 92 |
| F:\patent\player\3rdparty\libvorbis-1.1.2\doc | | |
| components.png | 7/30/2007 12:37 | 10,599 |
| draft-kerr-avt-vorbis-rtp-03.txt | 7/30/2007 12:37 | 37,247 |
| eightphase.png | 7/30/2007 12:37 | 11,130 |
| evenlsp.png | 7/30/2007 12:37 | 2,781 |
| floor1-1.png | 7/30/2007 12:37 | 3,668 |
| floor1-2.png | 7/30/2007 12:37 | 3,977 |
| floor1-3.png | 7/30/2007 12:37 | 4,961 |
| floor1-4.png | 7/30/2007 12:37 | 4,441 |
| floor1_inverse_dB_table.html | 7/30/2007 12:37 | 5,575 |
| floorval.png | 7/30/2007 12:37 | 2,845 |
| fourphase.png | 7/30/2007 12:37 | 9,992 |
| framing.html | 7/30/2007 12:37 | 15,178 |
| helper.html | 7/30/2007 12:37 | 5,972 |
| hufftree-under.png | 7/30/2007 12:37 | 1,432 |
| hufftree.png | 7/30/2007 12:37 | 1,457 |
| index.html | 7/30/2007 12:37 | 2,352 |
| lspmap.png | 7/30/2007 12:37 | 4,282 |
| Makefile.am | 7/30/2007 12:37 | 3,824 |
| Makefile.in | 7/30/2007 12:37 | 20,009 |
| oddlsp.png | 7/30/2007 12:37 | 2,142 |
| oggstream.html | 7/30/2007 12:37 | 8,860 |
| programming.html | 7/30/2007 12:37 | 19,371 |
| residue-pack.png | 7/30/2007 12:37 | 35,958 |
| residue2.png | 7/30/2007 12:37 | 21,388 |
| squarepolar.png | 7/30/2007 12:37 | 8,406 |
| stereo.html | 7/30/2007 12:37 | 16,975 |
| stream.png | 7/30/2007 12:37 | 2,254 |
| v-comment.html | 7/30/2007 12:37 | 9,396 |
| vorbis-clip.txt | 7/30/2007 12:37 | 7,021 |
| vorbis-errors.txt | 7/30/2007 12:37 | 2,730 |
| vorbis-fidelity.html | 7/30/2007 12:37 | 6,846 |

APPENDIX A-continued

| [File/Folder] | [Date] | [Size in Bytes] |
|---|---|---|
| vorbis.html | 7/30/2007 12:37 | 8,455 |
| vorbisword2.png | 7/30/2007 12:37 | 1,394 |
| Vorbis_I_spec.html | 7/30/2007 12:37 | 169,910 |
| Vorbis_I_spec.pdf | 7/30/2007 12:37 | 356,787 |
| wait.png | 7/30/2007 12:37 | 455 |
| white-ogg.png | 7/30/2007 12:37 | 1,422 |
| white-xifish.png | 7/30/2007 12:37 | 965 |
| window1.png | 7/30/2007 12:37 | 1,958 |
| window2.png | 7/30/2007 12:37 | 1,882 |
| xifish.pdf | 7/30/2007 12:37 | 1,876 |
| F:\patent\player\3rdparty\libvorbis-1.1.2\doc\vorbisenc | | |
| index.html | 7/30/2007 12:37 | 1,309 |
| Makefile.am | 7/30/2007 12:37 | 300 |
| Makefile.in | 7/30/2007 12:37 | 10,646 |
| overview.html | 7/30/2007 12:37 | 15,851 |
| reference.html | 7/30/2007 12:37 | 1,538 |
| style.css | 7/30/2007 12:37 | 279 |
| vorbis_encode_ctl.html | 7/30/2007 12:37 | 5,676 |
| vorbis_encode_init.html | 7/30/2007 12:37 | 2,723 |
| vorbis_encode_init_vbr.html | 7/30/2007 12:37 | 2,331 |
| vorbis_info.html | 7/30/2007 12:37 | 2,459 |
| F:\patent\player\3rdparty\libvorbis-1.1.2\doc\vorbisfile | | |
| callbacks.html | 7/30/2007 12:37 | 4,317 |
| chainingexample.html | 7/30/2007 12:37 | 4,970 |
| chaining_example_c.html | 7/30/2007 12:37 | 2,855 |
| crosslap.html | 7/30/2007 12:37 | 5,361 |
| datastructures.html | 7/30/2007 12:37 | 2,409 |
| decoding.html | 7/30/2007 12:37 | 2,851 |
| example.html | 7/30/2007 12:37 | 5,230 |
| exampleindex.html | 7/30/2007 12:37 | 1,106 |
| fileinfo.html | 7/30/2007 12:37 | 3,618 |
| index.html | 7/30/2007 12:37 | 1,414 |
| initialization.html | 7/30/2007 12:37 | 4,035 |
| Makefile.am | 7/30/2007 12:37 | 1,225 |
| Makefile.in | 7/30/2007 12:37 | 11,574 |
| OggVorbis_File.html | 7/30/2007 12:37 | 4,070 |
| overview.html | 7/30/2007 12:37 | 1,757 |
| ov_bitrate.html | 7/30/2007 12:37 | 2,512 |
| ov_bitrate_instant.html | 7/30/2007 12:37 | 1,763 |
| ov_callbacks.html | 7/30/2007 12:37 | 2,495 |
| ov_clear.html | 7/30/2007 12:37 | 1,817 |
| ov_comment.html | 7/30/2007 12:37 | 1,880 |
| ov_crosslap.html | 7/30/2007 12:37 | 3,397 |
| ov_info.html | 7/30/2007 12:37 | 1,948 |
| ov_open.html | 7/30/2007 12:37 | 4,592 |
| ov_open_callbacks.html | 7/30/2007 12:37 | 4,478 |
| ov_pcm_seek.html | 7/30/2007 12:37 | 2,204 |
| ov_pcm_seek_lap.html | 7/30/2007 12:37 | 3,311 |
| ov_pcm_seek_page.html | 7/30/2007 12:37 | 2,494 |
| ov_pcm_seek_page_lap.html | 7/30/2007 12:37 | 3,644 |
| ov_pcm_tell.html | 7/30/2007 12:37 | 1,467 |
| ov_pcm_total.html | 7/30/2007 12:37 | 1,794 |
| ov_raw_seek.html | 7/30/2007 12:37 | 2,282 |
| ov_raw_seek_lap.html | 7/30/2007 12:37 | 3,432 |
| ov_raw_tell.html | 7/30/2007 12:37 | 1,812 |
| ov_raw_total.html | 7/30/2007 12:37 | 1,827 |
| ov_read.html | 7/30/2007 12:37 | 4,197 |
| ov_read_float.html | 7/30/2007 12:37 | 2,844 |
| ov_seekable.html | 7/30/2007 12:37 | 1,415 |
| ov_serialnumber.html | 7/30/2007 12:37 | 1,807 |
| ov_streams.html | 7/30/2007 12:37 | 1,456 |
| ov_test.html | 7/30/2007 12:37 | 2,834 |
| ov_test_callbacks.html | 7/30/2007 12:37 | 3,171 |
| ov_test_open.html | 7/30/2007 12:37 | 1,929 |
| ov_time_seek.html | 7/30/2007 12:37 | 2,254 |
| ov_time_seek_lap.html | 7/30/2007 12:37 | 3,307 |
| ov_time_seek_page.html | 7/30/2007 12:37 | 2,459 |
| ov_time_seek_page_lap.html | 7/30/2007 12:37 | 3,675 |
| ov_time_tell.html | 7/30/2007 12:37 | 1,488 |
| ov_time_total.html | 7/30/2007 12:37 | 1,808 |
| reference.html | 7/30/2007 12:37 | 2,873 |
| return.html | 7/30/2007 12:37 | 2,144 |
| seekexample.html | 7/30/2007 12:37 | 3,764 |
| seeking.html | 7/30/2007 12:37 | 4,743 |
| seekingexample.html | 7/30/2007 12:37 | 5,196 |
| seeking_example_c.html | 7/30/2007 12:37 | 1,900 |
| seeking_test_c.html | 7/30/2007 12:37 | 1,900 |

APPENDIX A-continued

| [File/Folder] | [Date] | [Size in Bytes] |
|---|---|---|
| style.css | 7/30/2007 12:37 | 279 |
| threads.html | 7/30/2007 12:37 | 1,552 |
| vorbisfile_example_c.html | 7/30/2007 12:37 | 2,421 |
| vorbis_comment.html | 7/30/2007 12:37 | 2,170 |
| vorbis_info.html | 7/30/2007 12:37 | 2,398 |
| F:\patent\player\3rdparty\libvorbis-1.1.2\doc\xml | | |
| 01-introduction.xml | 7/30/2007 12:37 | 26,444 |
| 02-bitpacking.xml | 7/30/2007 12:37 | 9,213 |
| 03-codebook.xml | 7/30/2007 12:37 | 15,533 |
| 04-codec.xml | 7/30/2007 12:37 | 35,386 |
| 05-comment.xml | 7/30/2007 12:37 | 10,082 |
| 06-floor0.xml | 7/30/2007 12:37 | 10,690 |
| 07-floor1.xml | 7/30/2007 12:37 | 16,099 |
| 08-residue.xml | 7/30/2007 12:37 | 17,294 |
| 09-helper.xml | 7/30/2007 12:37 | 5,770 |
| 10-tables.xml | 7/30/2007 12:37 | 4,666 |
| a1-encapsulation_ogg.xml | 7/30/2007 12:37 | 7,040 |
| a2-encapsulation_rtp.xml | 7/30/2007 12:37 | 1,039 |
| footer.xml | 7/30/2007 12:37 | 1,950 |
| spec-common.xsl | 7/30/2007 12:37 | 916 |
| spec-fo.xsl | 7/30/2007 12:37 | 660 |
| spec-html.xsl | 7/30/2007 12:37 | 258 |
| Vorbis_I_spec.xml | 7/30/2007 12:37 | 1,486 |
| F:\patent\player\3rdparty\libvorbis-1.1.2\examples | | |
| chaining_example.c | 7/30/2007 12:37 | 2,730 |
| decoder_example.c | 7/30/2007 12:37 | 10,188 |
| encoder_example.c | 7/30/2007 12:37 | 8,615 |
| Makefile.am | 7/30/2007 12:37 | 945 |
| Makefile.in | 7/30/2007 12:37 | 17,078 |
| seeking_example.c | 7/30/2007 12:37 | 5,687 |
| vorbisfile_example.c | 7/30/2007 12:37 | 2,968 |
| F:\patent\player\3rdparty\libvorbis-1.1.2\include | | |
| Makefile.am | 7/30/2007 12:37 | 76 |
| Makefile.in | 7/30/2007 12:37 | 14,764 |
| F:\patent\player\3rdparty\libvorbis-1.1.2\include\vorbis | | |
| codec.h | 7/30/2007 12:37 | 8,044 |
| Makefile.am | 7/30/2007 12:37 | 151 |
| Makefile.in | 7/30/2007 12:37 | 12,222 |
| vorbisenc.h | 7/30/2007 12:37 | 3,008 |
| vorbisfile.h | 7/30/2007 12:37 | 5,430 |
| F:\patent\player\3rdparty\libvorbis-1.1.2\lib | | |
| analysis.c | 7/30/2007 12:37 | 3,127 |
| backends.h | 7/30/2007 12:37 | 5,029 |
| barkmel.c | 7/30/2007 12:37 | 2,405 |
| bitrate.c | 7/30/2007 12:37 | 8,396 |
| bitrate.h | 7/30/2007 12:37 | 2,026 |
| block.c | 7/30/2007 12:37 | 27,720 |
| codebook.c | 7/30/2007 12:37 | 16,474 |
| codebook.h | 7/30/2007 12:37 | 5,993 |
| codec_internal.h | 7/30/2007 12:37 | 4,570 |
| envelope.c | 7/30/2007 12:37 | 10,437 |
| envelope.h | 7/30/2007 12:37 | 2,181 |
| floor0.c | 7/30/2007 12:37 | 6,645 |
| floor1.c | 7/30/2007 12:37 | 28,609 |
| highlevel.h | 7/30/2007 12:37 | 1,849 |
| info.c | 7/30/2007 12:37 | 17,190 |
| lookup.c | 7/30/2007 12:37 | 3,292 |
| lookup.h | 7/30/2007 12:37 | 1,313 |
| lookups.pl | 7/30/2007 12:37 | 3,981 |
| lookup_data.h | 7/30/2007 12:37 | 9,152 |
| lpc.c | 7/30/2007 12:37 | 4,297 |
| lpc.h | 7/30/2007 12:37 | 1,213 |
| lsp.c | 7/30/2007 12:37 | 12,343 |
| lsp.h | 7/30/2007 12:37 | 1,188 |
| Makefile.am | 7/30/2007 12:37 | 1,434 |
| Makefile.in | 7/30/2007 12:37 | 24,020 |
| mapping0.c | 7/30/2007 12:37 | 27,593 |
| masking.h | 7/30/2007 12:37 | 40,214 |
| mdct.c | 7/30/2007 12:37 | 14,682 |
| mdct.h | 7/30/2007 12:37 | 2,029 |
| misc.h | 7/30/2007 12:37 | 1,816 |
| os.h | 7/30/2007 12:37 | 3,858 |
| psy.c | 7/30/2007 12:37 | 32,544 |
| psy.h | 7/30/2007 12:37 | 4,999 |
| psytune.c | 7/30/2007 12:37 | 14,015 |
| registry.c | 7/30/2007 12:37 | 1,765 |
| registry.h | 7/30/2007 12:37 | 1,275 |

APPENDIX A-continued

| [File/Folder] | [Date] | [Size in Bytes] |
|---|---|---|
| res0.c | 7/30/2007 12:37 | 23,425 |
| scales.h | 7/30/2007 12:37 | 2,707 |
| sharedbook.c | 7/30/2007 12:37 | 19,722 |
| smallft.c | 7/30/2007 12:37 | 22,207 |
| smallft.h | 7/30/2007 12:37 | 1,281 |
| synthesis.c | 7/30/2007 12:37 | 4,918 |
| tone.c | 7/30/2007 12:37 | 985 |
| vorbisenc.c | 7/30/2007 12:37 | 33,170 |
| vorbisfile.c | 7/30/2007 12:37 | 57,589 |
| window.c | 7/30/2007 12:37 | 130,660 |
| window.h | 7/30/2007 12:37 | 1,142 |
| F:\patent\player\3rdparty\libvorbis-1.1.2\lib\books | | |
| Makefile.am | 7/30/2007 12:37 | 93 |
| Makefile.in | 7/30/2007 12:37 | 14,790 |
| F:\patent\player\3rdparty\libvorbis-1.1.2\lib\books\coupled | | |
| Makefile.am | 7/30/2007 12:37 | 91 |
| Makefile.in | 7/30/2007 12:37 | 9,391 |
| res_books_stereo.h | 7/30/2007 12:37 | 639,246 |
| F:\patent\player\3rdparty\libvorbis-1.1.2\lib\books\floor | | |
| floor_books.h | 7/30/2007 12:37 | 43,099 |
| Makefile.am | 7/30/2007 12:37 | 86 |
| Makefile.in | 7/30/2007 12:37 | 9,380 |
| F:\patent\player\3rdparty\libvorbis-1.1.2\lib\books\uncoupled | | |
| Makefile.am | 7/30/2007 12:37 | 94 |
| Makefile.in | 7/30/2007 12:37 | 9,400 |
| res_books_uncoupled.h | 7/30/2007 12:37 | 269,189 |
| F:\patent\player\3rdparty\libvorbis-1.1.2\lib\modes | | |
| floor_all.h | 7/30/2007 12:37 | 7,165 |
| Makefile.am | 7/30/2007 12:37 | 290 |
| Makefile.in | 7/30/2007 12:37 | 9,564 |
| psych_11.h | 7/30/2007 12:37 | 2,356 |
| psych_16.h | 7/30/2007 12:37 | 6,211 |
| psych_44.h | 7/30/2007 12:37 | 34,052 |
| psych_8.h | 7/30/2007 12:37 | 4,043 |
| residue_16.h | 7/30/2007 12:37 | 4,826 |
| residue_44.h | 7/30/2007 12:37 | 9,883 |
| residue_44u.h | 7/30/2007 12:37 | 9,034 |
| residue_8.h | 7/30/2007 12:37 | 3,164 |
| setup_11.h | 7/30/2007 12:37 | 2,714 |
| setup_16.h | 7/30/2007 12:37 | 3,234 |
| setup_22.h | 7/30/2007 12:37 | 2,856 |
| setup_32.h | 7/30/2007 12:37 | 3,100 |
| setup_44.h | 7/30/2007 12:37 | 2,842 |
| setup_44u.h | 7/30/2007 12:37 | 2,030 |
| setup_8.h | 7/30/2007 12:37 | 2,815 |
| setup_X.h | 7/30/2007 12:37 | 4,287 |
| F:\patent\player\3rdparty\libvorbis-1.1.2\macos | | |
| decoder_example.mcp | 7/30/2007 12:37 | 101,395 |
| encoder_example.mcp | 7/30/2007 12:37 | 104,822 |
| libvorbis.mcp | 7/30/2007 12:37 | 112,488 |
| libvorbis.mcp.exp | 7/30/2007 12:37 | 900 |
| libvorbisenc.mcp | 7/30/2007 12:37 | 117,591 |
| libvorbisenc.mcp.exp | 7/30/2007 12:37 | 168 |
| libvorbisfile.mcp | 7/30/2007 12:37 | 113,821 |
| libvorbisfile.mcp.exp | 7/30/2007 12:37 | 503 |
| vorbis.mcp | 7/30/2007 12:37 | 87,525 |
| F:\patent\player\3rdparty\libvorbis-1.1.2\macos\compat | | |
| strdup.c | 7/30/2007 12:37 | 305 |
| F:\patent\player\3rdparty\libvorbis-1.1.2\macos\compat\sys | | |
| types.h | 7/30/2007 12:37 | 422 |
| F:\patent\player\3rdparty\libvorbis-1.1.2\macosx | | |
| Info.plist | 7/30/2007 12:37 | 1,003 |
| F:\patent\player\3rdparty\libvorbis-1.1.2\macosx\English.lproj | | |
| InfoPlist.strings | 7/30/2007 12:37 | 142 |
| F:\patent\player\3rdparty\libvorbis-1.1.2\macosx\Vorbis.xcodeproj | | |
| project.pbxproj | 7/30/2007 12:37 | 37,449 |
| F:\patent\player\3rdparty\libvorbis-1.1.2\vq | | |
| auxpartition.pl | 7/30/2007 12:37 | 1,122 |
| bookutil.c | 7/30/2007 12:37 | 19,186 |
| bookutil.h | 7/30/2007 12:37 | 1,818 |
| distribution.c | 7/30/2007 12:37 | 6,000 |
| huffbuild.c | 7/30/2007 12:37 | 4,860 |
| latticebuild.c | 7/30/2007 12:37 | 5,138 |
| latticehint.c | 7/30/2007 12:37 | 13,307 |
| latticepare.c | 7/30/2007 12:37 | 16,952 |
| latticetune.c | 7/30/2007 12:37 | 4,214 |
| Makefile.am | 7/30/2007 12:37 | 886 |

APPENDIX A-continued

| [File/Folder] | [Date] | [Size in Bytes] |
|---|---|---|
| Makefile.in | 7/30/2007 12:37 | 17,339 |
| residue__entropy | 7/30/2007 12:37 | 1,196 |
| vqgen.c | 7/30/2007 12:37 | 15,396 |
| vqgen.h | 7/30/2007 12:37 | 2,392 |
| vqsplit.c | 7/30/2007 12:37 | 18,063 |
| F:\patent\player\3rdparty\libvorbis-1.1.2\win32 | | |
| build__vorbisenc__dynamic.bat | 7/30/2007 12:37 | 613 |
| build__vorbisenc__dynamic__debug.bat | 7/30/2007 12:37 | 607 |
| build__vorbisenc__static.bat | 7/30/2007 12:37 | 598 |
| build__vorbisenc__static__debug.bat | 7/30/2007 12:37 | 592 |
| build__vorbisfile__dynamic.bat | 7/30/2007 12:37 | 616 |
| build__vorbisfile__dynamic__debug.bat | 7/30/2007 12:37 | 610 |
| build__vorbisfile__static.bat | 7/30/2007 12:37 | 601 |
| build__vorbisfile__static__debug.bat | 7/30/2007 12:37 | 595 |
| build__vorbis__dynamic.bat | 7/30/2007 12:37 | 565 |
| build__vorbis__dynamic__debug.bat | 7/30/2007 12:37 | 561 |
| build__vorbis__static.bat | 7/30/2007 12:37 | 550 |
| build__vorbis__static__debug.bat | 7/30/2007 12:37 | 546 |
| vorbis.def | 7/30/2007 12:37 | 1,054 |
| vorbis.dsw | 7/30/2007 12:37 | 1,966 |
| vorbisenc.def | 7/30/2007 12:37 | 217 |
| vorbisenc__dynamic.dsp | 7/30/2007 12:37 | 5,079 |
| vorbisenc__static.dsp | 7/30/2007 12:37 | 3,254 |
| vorbisfile.def | 7/30/2007 12:37 | 576 |
| vorbisfile__dynamic.dsp | 7/30/2007 12:37 | 5,020 |
| vorbisfile__static.dsp | 7/30/2007 12:37 | 3,297 |
| vorbis__dynamic.dsp | 7/30/2007 12:37 | 7,594 |
| vorbis__static.dsp | 7/30/2007 12:37 | 5,832 |
| F:\patent\player\3rdparty\libvorbis-1.1.2\win32\VS2003 | | |
| F:\patent\player\3rdparty\libvorbis-1.1.2\win32\VS2003\libvorbis | | |
| libvorbis.vcproj | 7/30/2007 12:37 | 12,321 |
| F:\patent\player\3rdparty\libvorbis-1.1.2\win32\VS2003\libvorbisfile | | |
| libvorbisfile.def | 7/30/2007 12:37 | 516 |
| libvorbisfile.vcproj | 7/30/2007 12:37 | 4,024 |
| F:\patent\player\3rdparty\libvorbis-1.1.2\win32\VS2003\vorbisdec | | |
| vorbisdec.vcproj | 7/30/2007 12:37 | 7,352 |
| F:\patent\player\3rdparty\libvorbis-1.1.2\win32\VS2003\vorbisenc | | |
| vorbisenc.vcproj | 7/30/2007 12:37 | 7,346 |
| F:\patent\player\3rdparty\on2Vp6__7SDK | | |
| on2plugin7test.cpp | 7/30/2007 12:36 | 63,352 |
| on2plugin7test.dsp | 7/30/2007 12:36 | 4,631 |
| on2plugin7test.plg | 7/30/2007 12:36 | 1,388 |
| on2plugin7test.sln | 7/30/2007 12:36 | 896 |
| on2plugin7test.vcproj | 7/30/2007 12:36 | 4,730 |
| on2plugin7test__2005.sln | 7/30/2007 12:36 | 892 |
| on2plugin7test__2005.vcproj | 7/30/2007 12:36 | 5,802 |
| on2vp7sdk.dsw | 7/30/2007 12:36 | 551 |
| readme.txt | 7/30/2007 12:36 | 3,287 |
| F:\patent\player\3rdparty\on2Vp6__7SDK\bin | | |
| callwaiting.bmp | 7/30/2007 12:36 | 11,574 |
| comp.avi | 7/30/2007 12:36 | 465,920 |
| decomp.avi | 7/30/2007 12:36 | 1,427,968 |
| f22reset.bmp | 7/30/2007 12:36 | 230,454 |
| jim.avi | 7/30/2007 12:36 | 10,718,208 |
| jimcraw.avi | 7/30/2007 12:36 | 21,431,808 |
| test.bmp | 7/30/2007 12:36 | 230,454 |
| tmnplay.exe | 7/30/2007 12:36 | 49,152 |
| _bnd.yuv | 7/30/2007 12:36 | 5,875,200 |
| _jim.yv12 | 7/30/2007 12:36 | 10,252,800 |
| F:\patent\player\3rdparty\on2Vp6__7SDK\debug | | |
| F:\patent\player\3rdparty\on2Vp6__7SDK\Docs | | |
| On2VP7Plugin | 7/30/2007 12:36 | 529,525 |
| On2__VP6__SDK.pdf | 7/30/2007 12:36 | 351,756 |
| F:\patent\player\3rdparty\on2Vp6__7SDK\include | | |
| CompOptions.hpp | 7/30/2007 12:36 | 5,539 |
| on2plugmsgs.h | 7/30/2007 12:36 | 1,239 |
| on2vfw.h | 7/30/2007 12:36 | 14,141 |
| on2vpplugin.h | 7/30/2007 12:36 | 15,313 |
| on2windows.h | 7/30/2007 12:36 | 5,329 |
| F:\patent\player\3rdparty\on2Vp6__7SDK\lib | | |
| on2vpplugin6__7.lib | 7/30/2007 12:36 | 1,187,894 |
| on2vpplugin6__7__2005.lib | 7/30/2007 12:36 | 1,165,226 |
| vp7dec__s.lib | 7/30/2007 12:36 | 77,640 |
| vp7dec__sd.lib | 7/30/2007 12:36 | 85,252 |
| F:\patent\player\3rdparty\on2Vp6__7SDK\release | | |
| F:\patent\player\engine | | |

APPENDIX A-continued

| [File/Folder] | [Date] | [Size in Bytes] |
|---|---|---|
| Allocator.cpp | 7/30/2007 12:36 | 3,085 |
| Allocator.h | 7/30/2007 12:36 | 2,490 |
| AudioRenderer.h | 7/30/2007 12:36 | 335 |
| AVIDemuxer.cpp | 7/30/2007 12:36 | 6,785 |
| AVIDemuxer.h | 7/30/2007 12:36 | 5,843 |
| base.h | 7/30/2007 12:36 | 764 |
| Buffer.h | 7/30/2007 12:36 | 2,117 |
| BufferQueue.cpp | 7/30/2007 12:36 | 890 |
| BufferQueue.h | 7/30/2007 12:36 | 1,201 |
| Clock.cpp | 7/30/2007 12:36 | 2,067 |
| Clock.h | 7/30/2007 12:36 | 885 |
| Context.cpp | 7/30/2007 12:36 | 256 |
| Context.h | 7/30/2007 12:36 | 1,292 |
| Debug.cpp | 7/30/2007 12:36 | 463 |
| Debug.h | 7/30/2007 12:36 | 316 |
| DXSoundRenderer.cpp | 7/30/2007 12:36 | 9,685 |
| DXSoundRenderer.h | 7/30/2007 12:36 | 1,071 |
| engine.h | 7/30/2007 12:36 | 411 |
| Event.h | 7/30/2007 12:36 | 448 |
| exceptions.h | 7/30/2007 12:36 | 1,388 |
| FileOutput.cpp | 7/30/2007 12:36 | 681 |
| FileOutput.h | 7/30/2007 12:36 | 552 |
| FileSource.cpp | 7/30/2007 12:36 | 1,172 |
| FileSource.h | 7/30/2007 12:36 | 669 |
| Filter.cpp | 7/30/2007 12:36 | 1,925 |
| Filter.h | 7/30/2007 12:36 | 4,153 |
| filters.h | 7/30/2007 12:36 | 552 |
| Framer.cpp | 7/30/2007 12:36 | 1,259 |
| Framer.h | 7/30/2007 12:36 | 470 |
| GDIRenderer.cpp | 7/30/2007 12:36 | 7,652 |
| GDIRenderer.h | 7/30/2007 12:36 | 3,084 |
| GraphWindow.cpp | 7/30/2007 12:36 | 3,252 |
| GraphWindow.h | 7/30/2007 12:36 | 1,032 |
| HttpSource.cpp | 7/30/2007 12:36 | 1,974 |
| HttpSource.h | 7/30/2007 12:36 | 660 |
| JittrSource.cpp | 7/30/2007 12:36 | 1,502 |
| JittrSource.h | 7/30/2007 12:36 | 441 |
| Lock.h | 7/30/2007 12:36 | 686 |
| Log.cpp | 7/30/2007 12:36 | 4,139 |
| Log.h | 7/30/2007 12:36 | 2,380 |
| Object.h | 7/30/2007 12:36 | 656 |
| OggDecoder.cpp | 7/30/2007 12:36 | 3,205 |
| OggDecoder.h | 7/30/2007 12:36 | 1,122 |
| Player.cpp | 7/30/2007 12:36 | 9,142 |
| Player.h | 7/30/2007 12:36 | 1,388 |
| PullBuffer.cpp | 7/30/2007 12:36 | 2,177 |
| PullBuffer.h | 7/30/2007 12:36 | 835 |
| Pump.cpp | 7/30/2007 12:36 | 298 |
| Pump.h | 7/30/2007 12:36 | 377 |
| PushBuffer.cpp | 7/30/2007 12:36 | 1,233 |
| PushBuffer.h | 7/30/2007 12:36 | 455 |
| Renderer.h | 7/30/2007 12:36 | 280 |
| Semaphore.h | 7/30/2007 12:36 | 463 |
| Stat.cpp | 7/30/2007 12:36 | 1,462 |
| Stat.h | 7/30/2007 12:36 | 1,751 |
| stdafx.cpp | 7/30/2007 12:36 | 260 |
| stdafx.h | 7/30/2007 12:36 | 886 |
| SubBuffer.h | 7/30/2007 12:36 | 948 |
| Thread.cpp | 7/30/2007 12:36 | 3,116 |
| Thread.h | 7/30/2007 12:36 | 1,402 |
| Time.cpp | 7/30/2007 12:36 | 386 |
| Time.h | 7/30/2007 12:36 | 205 |
| Timer.h | 7/30/2007 12:36 | 518 |
| types.h | 7/30/2007 12:36 | 731 |
| VideoRenderer.h | 7/30/2007 12:36 | 602 |
| VP7Decoder.cpp | 7/30/2007 12:36 | 2,973 |
| VP7Decoder.h | 7/30/2007 12:36 | 945 |
| Waitable.h | 7/30/2007 12:36 | 605 |
| F:\patent\player\win32 | | |
| player.sln | 7/30/2007 12:36 | 4,089 |
| F:\patent\player\win32\encoder | | |
| F:\patent\player\win32\engine | | |
| engine.vcproj | 7/30/2007 12:36 | 8,481 |
| F:\patent\player\win32\filters | | |
| F:\patent\player\win32\ieplugin | | |
| dlldata.c | 7/30/2007 12:36 | 845 |
| JittrPlayer.cpp | 7/30/2007 12:36 | 493 |

APPENDIX A-continued

| [File/Folder] | [Date] | [Size in Bytes] |
|---|---|---|
| JittrPlayer.inf | 7/30/2007 12:36 | 220 |
| JittrPlayer.js | 7/30/2007 12:36 | 833 |
| JittrPlayer.rc | 7/30/2007 12:36 | 2,879 |
| JittrPlayer.rgs | 7/30/2007 12:36 | 127 |
| JittrPlayer.vcproj | 7/30/2007 12:36 | 6,279 |
| JittrPlayerCtrl.bmp | 7/30/2007 12:36 | 246 |
| JittrPlayerCtrl.cpp | 7/30/2007 12:36 | 2,412 |
| JittrPlayerCtrl.h | 7/30/2007 12:36 | 5,980 |
| JittrPlayerCtrl.htm | 7/30/2007 12:36 | 875 |
| JittrPlayerps.def | 7/30/2007 12:36 | 205 |
| JittrPlayerPS.vcproj | 7/30/2007 12:36 | 4,077 |
| package.bat | 7/30/2007 12:36 | 533 |
| resource.h | 7/30/2007 12:36 | 543 |
| stdafx.cpp | 7/30/2007 12:36 | 207 |
| stdafx.h | 7/30/2007 12:36 | 1,514 |
| F:\patent\player\win32\ieplugin\sign | | |
| jittrprivatekey.pfx | 7/30/2007 12:36 | 3,758 |
| mycredentials.spc | 7/30/2007 12:36 | 6,784 |
| signtool.exe | 7/30/2007 12:36 | 327,360 |
| F:\patent\player\win32\npplugin | | |
| F:\patent\player\win32\ogg | | |
| ogg.vcproj | 7/30/2007 12:36 | 4,255 |
| F:\patent\player\win32\standalone | | |
| Resource.h | 7/30/2007 12:36 | 1,271 |
| small.ico | 7/30/2007 12:36 | 23,558 |
| standalone.cpp | 7/30/2007 12:36 | 7,335 |
| standalone.h | 7/30/2007 12:36 | 39 |
| standalone.ico | 7/30/2007 12:36 | 23,558 |
| standalone.rc | 7/30/2007 12:36 | 3,117 |
| standalone.vcproj | 7/30/2007 12:36 | 4,424 |
| stdafx.cpp | 7/30/2007 12:36 | 208 |
| stdafx.h | 7/30/2007 12:36 | 1,400 |
| F:\patent\player\win32\tools | | |
| buildinfo.exe | 7/30/2007 12:36 | 13,824 |
| F:\patent\player\win32\vorbis | | |
| vorbis.vcproj | 7/30/2007 12:36 | 7,512 |
| F:\patent\qa | | |
| F:\patent\qa\cc | | |
| build-adserver.xml | 7/30/2007 12:37 | 830 |
| build-httpdz.xml | 7/30/2007 12:37 | 4,793 |
| build-iacd.xml | 7/30/2007 12:37 | 1,428 |
| build-install.xml | 7/30/2007 12:37 | 1,371 |
| build-jittrm.xml | 7/30/2007 12:37 | 1,600 |
| build-player.xml | 7/30/2007 12:37 | 1,620 |
| BuildCCTree.py | 7/30/2007 12:37 | 1,256 |
| config.xml | 7/30/2007 12:37 | 16,325 |
| RunCruiseControl.bat | 7/30/2007 12:37 | 653 |
| StartServer.py | 7/30/2007 12:37 | 2,773 |
| UpdateAdserver.py | 7/30/2007 12:37 | 2,166 |
| UpdateInstaller.py | 7/30/2007 12:37 | 11,469 |
| UpdatePlayer.py | 7/30/2007 12:37 | 4,016 |
| util.py | 7/30/2007 12:37 | 1,134 |
| UtilityServer.py | 7/30/2007 12:37 | 291 |
| F:\patent\qa\cc\lib | | |
| commons-lang-2.0.jar | 7/30/2007 12:37 | 169,763 |
| jakarta-regexp-1.3.jar | 7/30/2007 12:37 | 25,429 |
| jsch-0.1.32.jar | 7/30/2007 12:37 | 171,658 |
| svnant.jar | 7/30/2007 12:37 | 44,028 |
| svnClientAdapter.jar | 7/30/2007 12:37 | 175,111 |
| svnjavahl.jar | 7/30/2007 12:37 | 42,210 |
| F:\patent\qa\cc\linux | | |
| build-httpdz.xml | 7/30/2007 12:37 | 3,197 |
| build-iacd.xml | 7/30/2007 12:37 | 528 |
| config.xml | 7/30/2007 12:37 | 5,467 |
| runcc.sh | 7/30/2007 12:37 | 278 |
| ServerBuilt.py | 7/30/2007 12:37 | 1,122 |
| StartServer.py | 7/30/2007 12:37 | 2,765 |
| UpdateHttpdz.py | 7/30/2007 12:37 | 3,012 |
| F:\patent\qa\cc\tools | | |
| bjam.exe | 7/30/2007 12:37 | 225,280 |
| makensis.exe | 7/30/2007 12:37 | 471,552 |
| signtool.exe | 7/30/2007 12:37 | 327,360 |
| F:\patent\qa\httpdz | | |
| doit.sh | 7/30/2007 12:37 | 74 |
| stress__httpdz.py | 7/30/2007 12:37 | 5,397 |
| F:\patent\qa\iacd | | |
| startnodes.py | 7/30/2007 12:37 | 1,107 |

APPENDIX A-continued

| [File/Folder] | [Date] | [Size in Bytes] |
|---|---|---|
| wget.py | 7/30/2007 12:37 | 440 |
| F:\patent\qa\iacd\continuous | | |
| nightly.py | 7/30/2007 12:37 | 7,708 |
| F:\patent\qa\iacd\doc | | |
| IACD_regression_harness.txt | 7/30/2007 12:37 | 4,067 |
| iacd_test_cases.txt | 7/30/2007 12:37 | 19,583 |
| iacd_test_plan.txt | 7/30/2007 12:37 | 2,743 |
| F:\patent\qa\iacd\harness | | |
| jittr.py | 7/30/2007 12:37 | 4,042 |
| mail.py | 7/30/2007 12:37 | 1,056 |
| options.py | 7/30/2007 12:37 | 2,166 |
| reporting.py | 7/30/2007 12:37 | 4,013 |
| runtests.py | 7/30/2007 12:37 | 3,659 |
| testcase.py | 7/30/2007 12:37 | 673 |
| testrun.py | 7/30/2007 12:37 | 1,950 |
| utils.py | 7/30/2007 12:37 | 1,109 |
| F:\patent\qa\iacd\harness\config | | |
| nodes.dat | 7/30/2007 12:37 | 896 |
| pubKeyFile.txt | 7/30/2007 12:37 | 320 |
| F:\patent\qa\iacd\harness\util | | |
| expthand.exe | 7/30/2007 12:37 | 51,200 |
| pskill.exe | 7/30/2007 12:37 | 187,184 |
| F:\patent\statsd | | |
| iacd_stats_db_schema.xml | 7/30/2007 12:37 | 25,668 |
| F:\patent\statsd\docs | | |
| F:\patent\statsd\src | | |

What is claimed is:

1. A method comprising:
   identifying, using a processor, a location of the a client device in response to a video request message received from the client device, wherein identifying the location of the client device comprises:
   pinging a number of overlay nodes; and
   determining the location of the client device to be the same as a location of an overlay node with a quickest ping response of the number of overlay nodes pinged;
   identifying, using said processor, a location of one or more overlay nodes nearest to the client device;
   generating network organization information including identification of said nearest overlay nodes; and
   publishing the network organization information to the client device.

2. The method of claim 1, further comprising determining whether the received video request message is a first video request message from the client device.

3. The method of claim 2, further comprising installing a service module on the client device if the received video request message is the first video request message.

4. The method of claim 1, wherein at least one of the overlay nodes comprises a second client device for issuing a video request message.

5. The method of claim 1, further comprising streaming a first portion of requested video data to the client device for viewing by a user of the client device.

6. The method of claim 5, further comprising performing a subsection algorithm on the requested video data to separate the video data into a plurality of subsection portions so that one or more remaining subsection portions of the video data are streamed to the client device from at least two different nodes.

7. The method of claim 6, wherein the subsection portions of the video are streamed to the client device in optimal order so that the video is viewed by the user in an uninterrupted manner, and wherein the optimal order is based on at least one of an available bandwidth of the client device, download speed capability of the client device, and available bitrate range of the client device.

8. The method of claim 1, in which the client device selectively accesses one or more of the overlay nodes without using a Domain Name Service (DNS) or Hyper Text Transfer Protocol (HTTP) redirects.

9. The method of claim 1, wherein generating network organization information comprises identifying some overlay nodes at random without reference to proximity to the client device in addition to the overlay nodes nearest the client device to increase diversity of overlay node access by the client device.

10. The method of claim 1, wherein generating network organization information comprises:
    identifying infrastructure nodes in addition to the overlay nodes; and
    delivering video to the client device in response to a video request message using both overlay streaming and infrastructure streaming.

11. The method of claim 1, further comprising identifying an overload condition of resource contention between the nodes.

12. The method of claim 1, further comprising identifying a location of one or more network servers in the network nearest to the client device.

13. The method of claim 1, further comprising:
    identifying one or more interests of a user of the client device;
    obtaining an advertisement related to the one or more interests of the user;
    interrupting a video stream to the client device at an interrupt point to stream the advertisement to the client device; and
    continuing streaming of the video stream to the client device.

14. A system comprising:

a processor;

a computer readable medium in the form of a volatile or non-volatile media on which are stored computer readable instructions which, when executed by the processor, causes said processor to:

identify a location of a client device in response to a video request message received from the client device, wherein identify a location of the client device comprises:

pinging a number of overlay nodes; and determining the location of the client device to be the same as a location of an overlay node with a quickest ping response of the number of overlay nodes pinged;

identify a location of one or more overlay nodes nearest to the client device;

generate network topology information including identification of said nearest overlay nodes; and publish the network topology information to the client device.

15. The system of claim 14, in which the network topology information allows the client device to stream video from any of said overlay nodes without using a Domain Name Service (DNS) or Hyper Text Transfer Protocol (HTTP) redirects.

16. The system of claim 14, in which at least one of the overlay nodes comprises a second client device for issuing video request message.

17. The system of claim 14, in which said stored computer readable instructions, when executed by the processor, further cause the processor to perform a subsection algorithm on requested video data identified by the video request message so as to separate the requested video data into a plurality of subsection portions so that one or more remaining subsection portions of the requested video data are streamed to the client device from at least two different overlay nodes.

18. The system of claim 14, in which generating network topology information comprises identifying some overlay nodes at random without reference to proximity to the client device in addition to the overlay nodes nearest the client device to increase diversity of overlay node access by the client device.

19. The system of claim 14, in which said stored computer readable instructions, when executed by the processor, further cause the processor to:

identify one or more interests of a user of the client device;

obtain an advertisement related to the one or more interests of the user;

interrupt a video stream to the client device at an interrupt point to stream the advertisement to the client device; and continue streaming of the video stream to the client device.

* * * * *

UNITED STATES PATENT AND TRADEMARK OFFICE
CERTIFICATE OF CORRECTION

PATENT NO.         : 7,761,900 B2                                       Page 1 of 1
APPLICATION NO.    : 11/830824
DATED              : July 20, 2010
INVENTOR(S)        : Aaron Crayford It is certified that error appears in the above-identified patent and that said Letters Patent is hereby corrected as shown below:

Column 97, Line 30, Claim 1, change "identifying, using a processor, a location of the a client" to
-- identifying, using a processor, a location of a client --

Signed and Sealed this

Thirty-first Day of August, 2010

David J. Kappos
*Director of the United States Patent and Trademark Office*